United States Patent
Nakai et al.

(10) Patent No.: US 10,114,273 B2
(45) Date of Patent: Oct. 30, 2018

(54) DEVELOPER SPREADING DEVICE, PRINTER, AND DIGITAL CAMERA WITH PRINTER

(71) Applicant: FUJIFILM Corporation, Tokyo (JP)

(72) Inventors: Yuki Nakai, Kanagawa (JP); Kenji Sugiyama, Kanagawa (JP); Kenji Kobayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/892,021

(22) Filed: Feb. 8, 2018

(65) Prior Publication Data
US 2018/0231874 A1 Aug. 16, 2018

(30) Foreign Application Priority Data

Feb. 10, 2017 (JP) ................. 2017-022850

(51) Int. Cl.
| | |
|---|---|
| G03B 17/53 | (2006.01) |
| G03B 17/50 | (2006.01) |
| G03B 17/26 | (2006.01) |
| G03B 27/32 | (2006.01) |
| G03C 3/02 | (2006.01) |
| G03C 8/44 | (2006.01) |
| G03D 9/00 | (2006.01) |

(52) U.S. Cl.
CPC ............ *G03B 17/53* (2013.01); *G03B 17/26* (2013.01); *G03B 17/50* (2013.01); *G03B 27/32* (2013.01); *G03C 3/02* (2013.01); *G03C 8/44* (2013.01); *G03D 9/00* (2013.01)

(58) Field of Classification Search
None
See application file for complete search history.

(56) References Cited

U.S. PATENT DOCUMENTS

| | | | | |
|---|---|---|---|---|
| 3,930,264 | A * | 12/1975 | Asano | ........... G03B 17/26 396/30 |
| 6,195,508 | B1 * | 2/2001 | Katayama | ........ G03B 17/32 396/32 |

(Continued)

FOREIGN PATENT DOCUMENTS

| | | |
|---|---|---|
| JP | H07244334 A | 9/1995 |
| JP | 2000-089354 A | 3/2000 |

(Continued)

OTHER PUBLICATIONS

Extended European Search Report (EESR) dated Mar. 18, 2018, from corresponding EP Appl No. 18155638.2, 9 pp.

*Primary Examiner* — William B Perkey
(74) *Attorney, Agent, or Firm* — Studebaker & Brackett PC

(57) ABSTRACT

A case that accommodates a film unit and a film cover includes a pair of light shielding grooves formed in both sides of an exposure opening and an inner wall surface facing the film cover. The film cover includes outer light shielding ribs as a pair of light shielding ribs inserted into a pair of light shielding grooves. A transport roller pair that transports the film unit or the film cover discharged from the case includes a capstan roller including a pair of roller members and a rotational shaft which holds the roller members. A first distance which is a space between inner edges of the pair of roller members is greater than a second distance which is a space between outer edges of the pair of outer light shielding ribs.

7 Claims, 58 Drawing Sheets

(56) References Cited

U.S. PATENT DOCUMENTS

| | | | |
|---|---|---|---|
| 2002/0097383 A1* | 7/2002 | Futakami | G03B 17/52 355/41 |
| 2006/0067659 A1* | 3/2006 | Takeshita | B41J 3/36 396/36 |
| 2018/0231874 A1* | 8/2018 | Nakai | G03B 17/53 |
| 2018/0231893 A1* | 8/2018 | Sugiyama | G03F 7/2057 |

FOREIGN PATENT DOCUMENTS

| | | |
|---|---|---|
| JP | 2004157167 A | 6/2004 |
| JP | 2007-240971 A | 9/2007 |

\* cited by examiner

DEVELOPER SPREADING DEVICE, PRINTER, AND DIGITAL CAMERA WITH PRINTER

CROSS-REFERENCE TO RELATED APPLICATION

This application claims priority under 35 USC 119 from Japanese Patent Application No. 2017-022850, filed 10 Feb. 2017, the disclosure of which is incorporated by reference herein.

BACKGROUND OF THE INVENTION

1. Field of the Invention

The present invention relates to a developer spreading device, a printer, and a digital camera with a printer.

2. Description of the Related Art

A digital camera with a printer that records an image on a sheet type recording medium, for example, a mono-sheet type instant film having a developer pod has been known. An imaging unit and a printer are built in a digital camera with a printer described in JP2007-240971. The imaging unit includes an imaging optical system and a solid-state imaging device, photoelectrically converts a subject image formed on the solid-state imaging device, performs digital conversion, and acquires digital image data. The printer records an image by exposing a film unit based on the image data. The exposed film unit is ejected from a film ejection port, and an image appears on one surface after a predetermined time elapses.

The printer includes an exposure head that irradiates the film unit with light for exposing the film unit and a developer spreading device that spreads a developer into the film unit by crushing the developer pod. In the developer spreading device, the film unit is discharged from an instant film pack within a film pack room, a pair of transport rollers transports the film unit to spreading rollers while pinching both side edge portions of the film unit, and the spreading rollers crush the developer pod. In the instant film pack, an exposure opening which is lighttightly blocked by a film cover and a discharge port from which the film unit or the film cover is discharged are formed in a case that accommodates the film unit and the film cover.

In a camera with a printer described in JP2000-089354 (corresponding to U.S. Pat. No. 6,195,508B1), a pair of light shielding ribs that extends in a narrow strip shape among the discharge direction is formed in both side edge portions of the film cover in order to prevent external light from being incident within the instant film pack. The instant film pack is shielded from light by inserting the light shielding ribs into light shielding grooves formed in the case.

Even in the digital camera with a printer described in JP2007-240971, it is necessary to form the pair of light shielding ribs in both the side edge portions of the film cover in order to prevent the external light from being incident within the instant film pack. However, in a case where the film cover is transported, the transport rollers are detached from the light shielding ribs after the transport rollers are attached to the light shielding ribs once in some cases. For example, in a case where the transport rollers are detached from the light shielding ribs, an ejection error of the film cover occurs in some cases like a case where a balance of a holding force of both the side edge portions of the film cover using the transport rollers is lost or the film cover is not ejected from the film ejection port by moving in a direction different from an ejection direction.

SUMMARY OF THE INVENTION

An object of the present invention is to provide a developer spreading device, a printer, and a digital camera with a printer which are capable of preventing an ejection error of a film cover.

A developer spreading device according to the present invention comprises a film pack room, a transport roller pair, and a spreading roller pair. An instant film pack is loaded into the film pack room. The instant film pack includes a plurality of film units, a case, and a film cover. The film unit includes a developer pod containing a developer. The case includes an exposure opening and a slit-shaped discharge port, and accommodates the plurality of film units laminated on top of each other. The film cover lighttightly blocks the exposure opening by covering an exposure surface of the film unit, and is ejected through the discharge port. The transport roller pair transports the film unit or the film cover discharged through the discharge port while pinching both side edge portions of the film unit or the film cover. The spreading roller pair is disposed on a downstream side of the transport roller pair in a transport direction perpendicular to a width direction of the exposure surface, and spreads the developer into the film unit by crushing the developer pod. The case includes a pair of light shielding grooves formed in both sides of the exposure opening and an inner wall surface facing the film cover. The film cover includes a pair of light shielding ribs which is inserted into the pair of light shielding grooves and extends in a discharge direction in a case where the film cover is discharged through the discharge port. The transport roller pair includes a capstan roller that includes a pair of roller members and a rotational shaft which holds the roller members, and a first distance which is a space between inner edges of the pair of roller members is greater than a second distance which is a space between outer edges of the pair of light shielding ribs.

It is preferable that the first distance is greater than a width of the exposure surface of the film unit.

It is preferable that the pair of roller members pinch both the side edge portions of the film cover in the width direction of the exposure surface by 0.5 mm or more.

It is preferable that the pair of roller members pinches portions of both the side edge portions of the film unit which are positioned outside the developer pod in the width direction of the exposure surface.

It is preferable that a plurality of protrusions is formed on a circumferential surface of the roller member.

A printer according to the present invention comprises the developer spreading device and an exposure head. The exposure head is disposed on an upstream side of the developer spreading device in the transport direction, and irradiates the exposure surface of the film unit transported by the transport roller pair with line-shaped print light parallel to the width direction of the exposure surface.

A digital camera with a printer according to the present invention comprises the printer, and an imaging unit. The imaging unit includes an imaging optical system, captures a subject image, and outputs image data to the printer.

According to the present invention, it is possible to prevent an ejection error of a film cover.

DESCRIPTION OF THE PREFERRED EMBODIMENTS

First Embodiment

Figure 1:
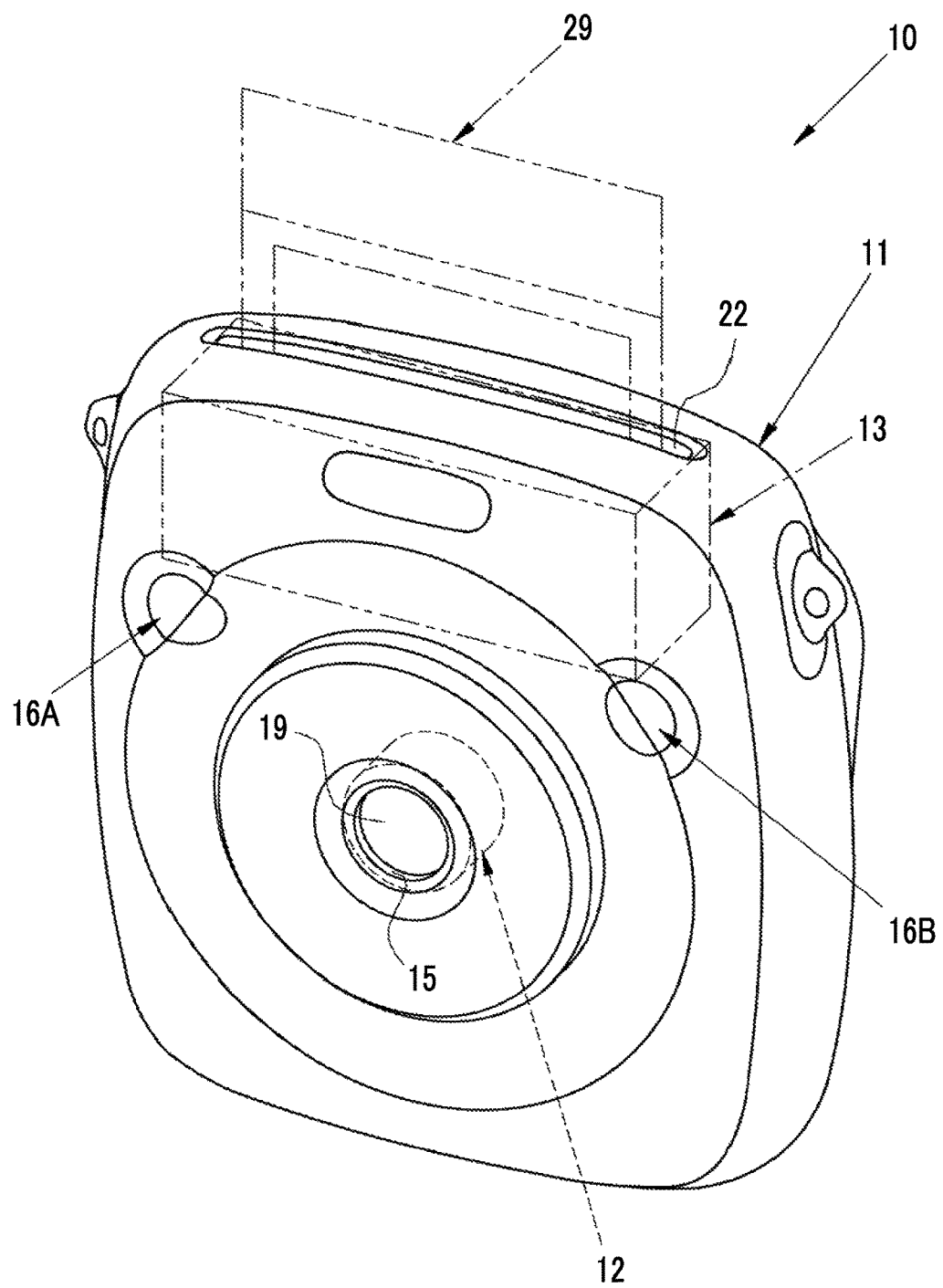
FIG. 1 is a front perspective view of a digital camera with a printer.

In FIG. 1, a digital camera 10 with a printer according to the present invention includes a camera body 11, an imaging unit 12, and a printer unit 13. An imaging window 15 and two release switches 16A and 16B are provided on a front surface of the camera body 11.

Figure 2:
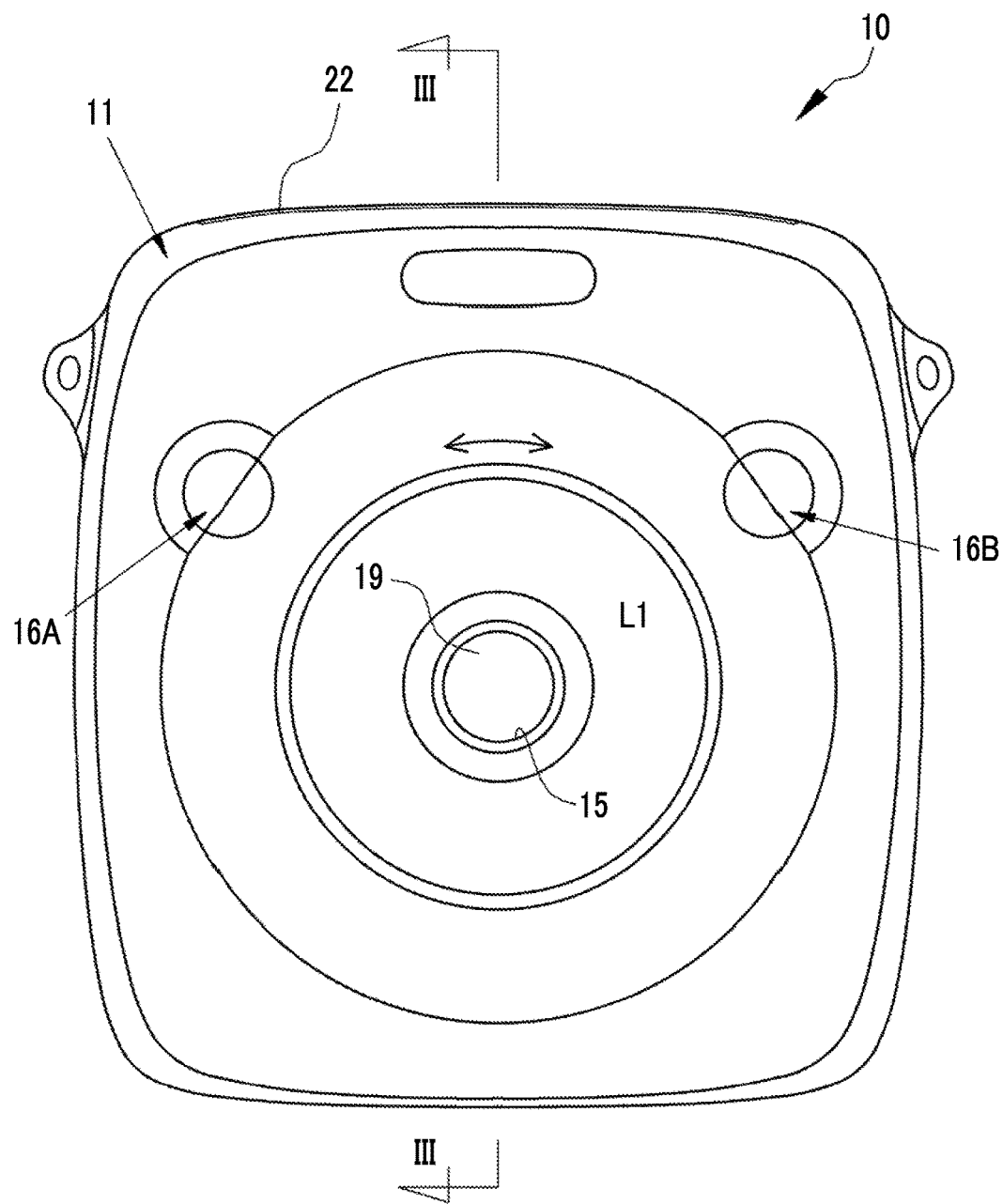
FIG. 2 is a front view of the digital camera with a printer.

As shown in FIG. 2, the camera body 11 has a substantially square shape in front view. A film unit 29 (see FIG. 7) as a recording medium used in the digital camera 10 with a printer has a substantially square shape.

The imaging window 15 is disposed in the center on the front surface of the camera body 11. The imaging window 15 exposes an imaging optical system 19 (see FIG. 3) constituting the imaging unit 12.

Figure 3:
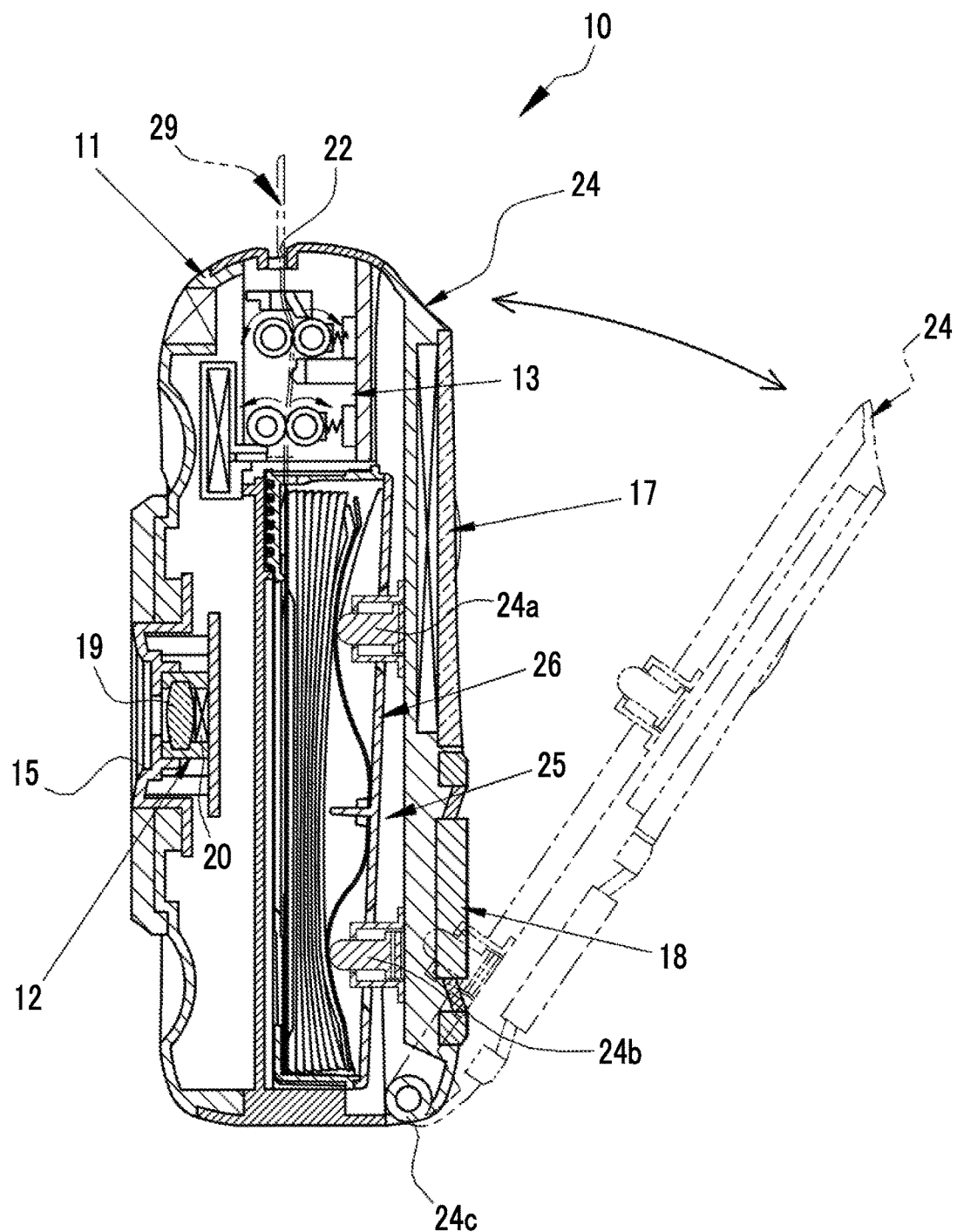
FIG. 3 is a sectional view taken along line III-III of FIG. 2.

As shown in FIG. 3, the imaging optical system 19 and a solid-state imaging device 20 are provided in the imaging unit 12. For example, the solid-state imaging device 20 is a complementary metal-oxide-semiconductor (CMOS) image sensor, and includes a light receiving surface constituted by a plurality of pixels (not shown) arranged in a two-dimensional matrix shape. Each pixel includes a photoelectric conversion element, photoelectrically converts a subject image formed on the light receiving surface by the imaging optical system 19, and generates an imaging signal.

The solid-state imaging device 20 includes signal processing circuits (all not shown) a noise removal circuit, an auto gain controller, and an A/D conversion circuit. The noise removal circuit performs noise removal process on the imaging signal. The auto gain controller amplifies a level of the imaging signal to an optimum value. The A/D conversion circuit converts the imaging signal into a digital signal, and outputs the digital signal to a built-in memory (not shown) from the solid-state imaging device 20. An output signal of the solid-state imaging device 20 is image data (so-called RAW data) having one color signal for each pixel.

The solid-state imaging device 20 is driven by pressing at least one of the release switch 16A or 16B, and the subject image is captured.

A film ejection port 22 is formed in a top surface of the camera body 11. The film unit 29 on which an image is printed is ejected from the film ejection port 22.

A loading cover 24 is attached to a rear surface of the camera body 11 through a hinge portion 24c. The hinge portion 24c supports the loading cover 24 such that the loading cover capable of moving rotationally between an opened position and a closed position. As represented by a dashed double-dotted line, the loading cover 24 opens a film pack room 25 within the camera body 11 in the opened position. As represented by a solid line, the loading cover 24 covers the film pack room 25 in the closed position. An instant film pack 26 is loaded within the film pack room 25. A pair of press members 24a and 24b is formed on an inner surface of the loading cover 24.

Figure 4:
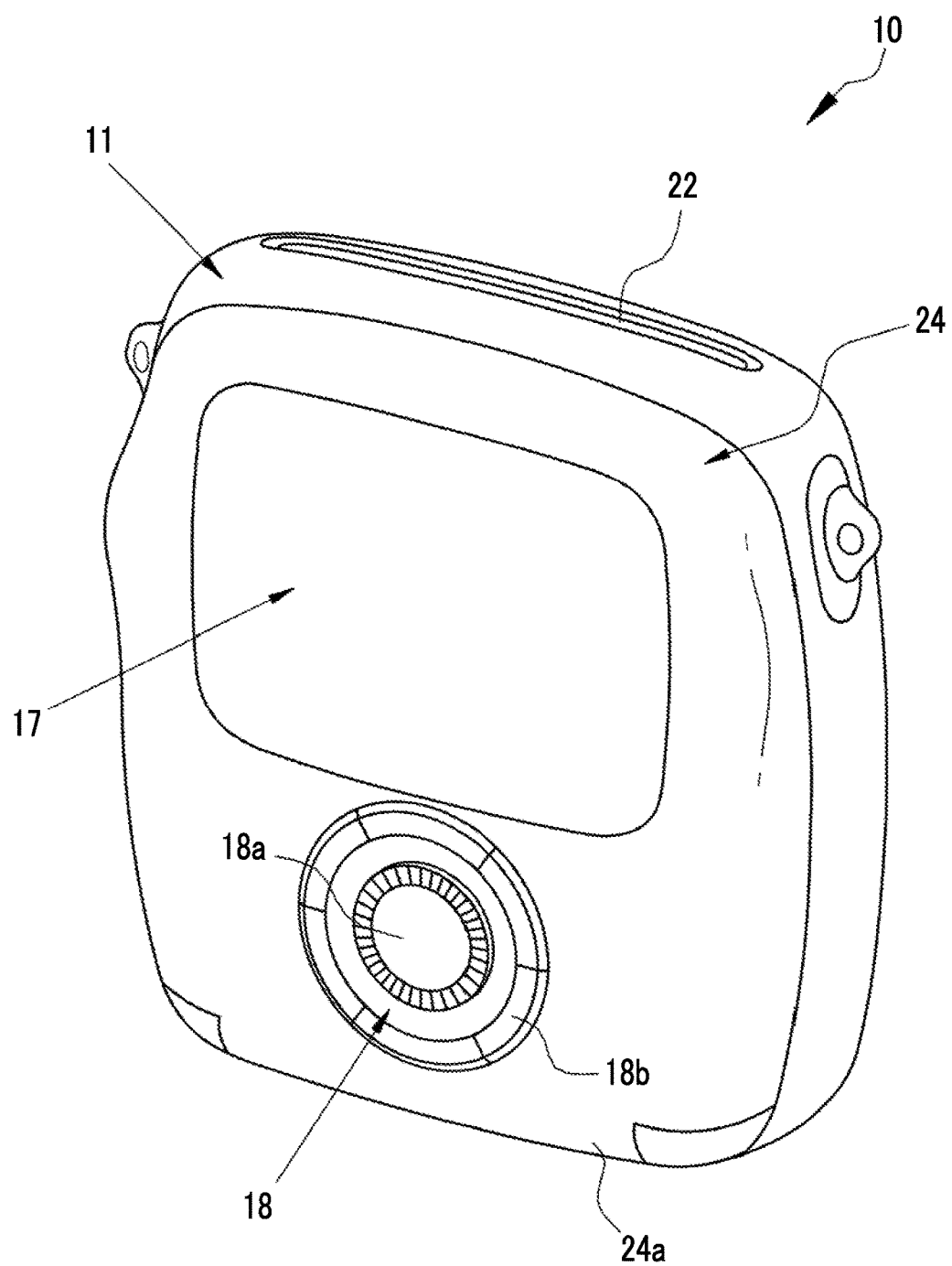
FIG. 4 is a rear perspective view of the digital camera with a printer.

As shown in FIG. 4, a rear display unit 17 and an operation unit 18 are provided on an outer surface of the loading cover 24, that is, a rear surface of the camera body 11. The rear display unit 17 is, for example, a liquid crystal display (LCD) panel. Image data items corresponding one frame output from the solid-state imaging device 20 are sequentially input into the rear display unit 17, and are displayed as a live preview image.

A photographer presses at least one of the release switch 16A or 16B, and thus, capturing is started. Image data items are acquired from the solid-state imaging device 20 through the capturing. An image processing unit (not shown) performs known image processing on the image data items, and then the image data items are compressed. Examples of the image processing include matrix operation, demosaicing, γ correction, luminance conversion, color difference conversion, and resizing. The image data items on which the image processing and compression are performed is recorded in a built-in memory (not shown) such as a flash memory provided within the camera body 11.

In a case where a menu switch 18a of the operation unit 18 is pressed, the image is played and displayed on the rear display unit 17 based on the image data items recorded in the built-in memory. In a case where an image desired to be printed is displayed on the rear display unit 17, the photographer presses a print switch 18b of the operation unit 18, and a printing process using the printer unit 13 is started.

Figure 5:
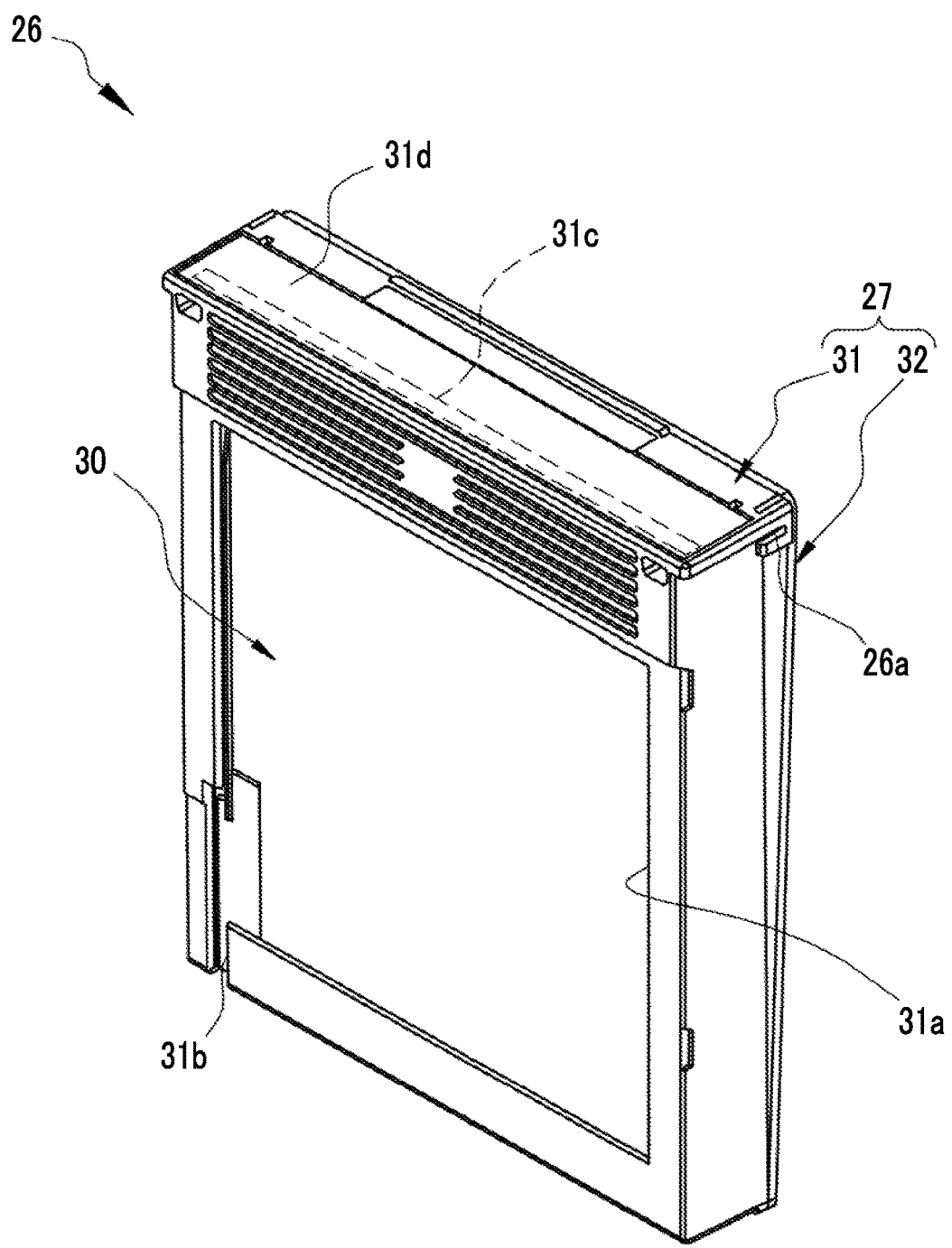
FIG. 5 is a perspective view of an instant film pack.
Figure 6:
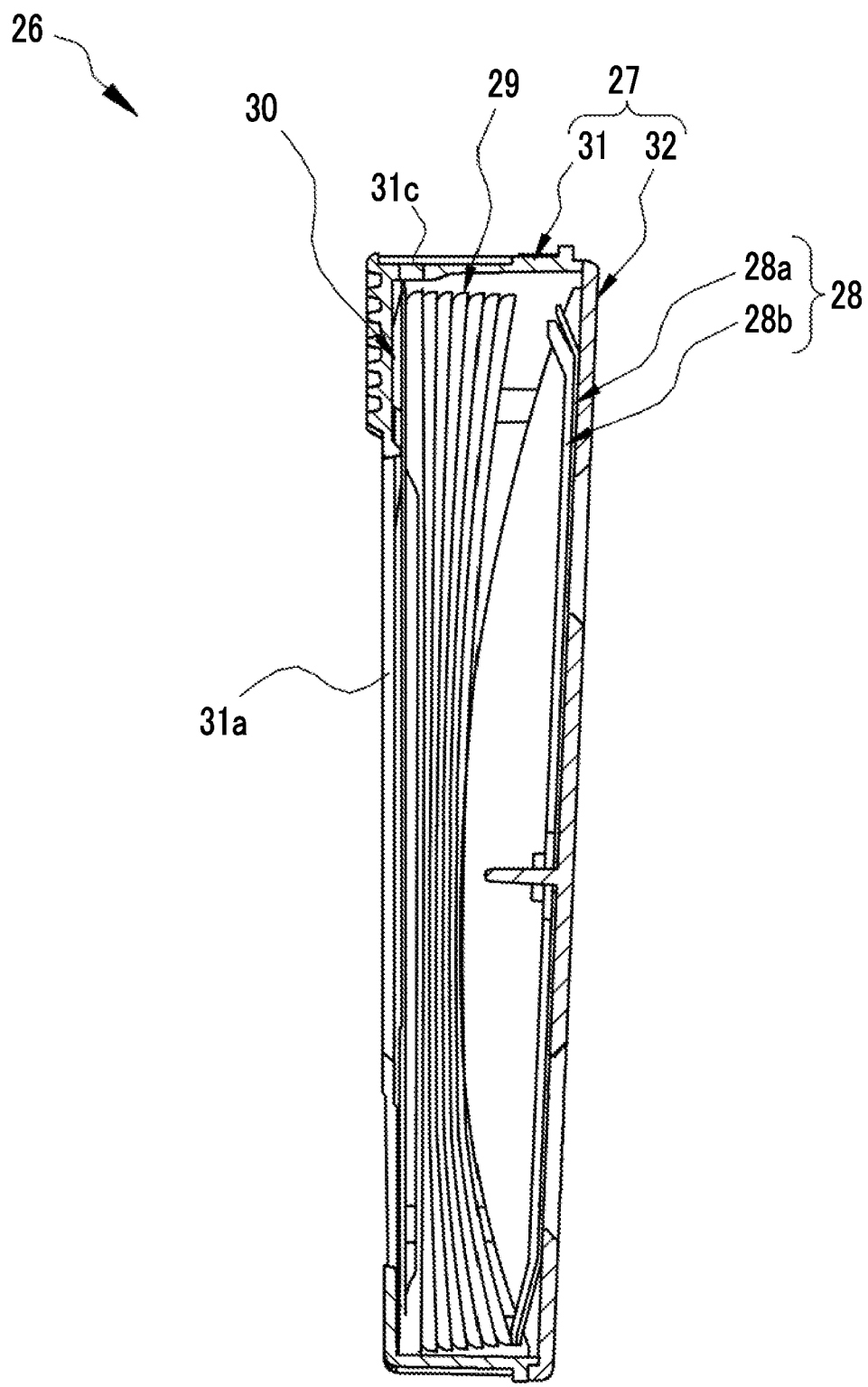
FIG. 6 is a sectional view of the instant film pack.

In FIGS. 5 and 6, the instant film pack 26 includes a case 27, a film unit press plate 28, the film unit 29, and a film cover 30.

As shown in FIG. 6, the case 27 accommodates a plurality of film units 29 and one film cover 30 while the film units and the film cover are laminated. The case 27 is made of a material such as a thermoplastic resin or a paper resin acquired by mixing the thermoplastic resin with cellulose. The case 27 includes a box-shaped case member 31, and a cover 32 that covers an opening formed in a rear surface of the case member 31.

Figure 7:
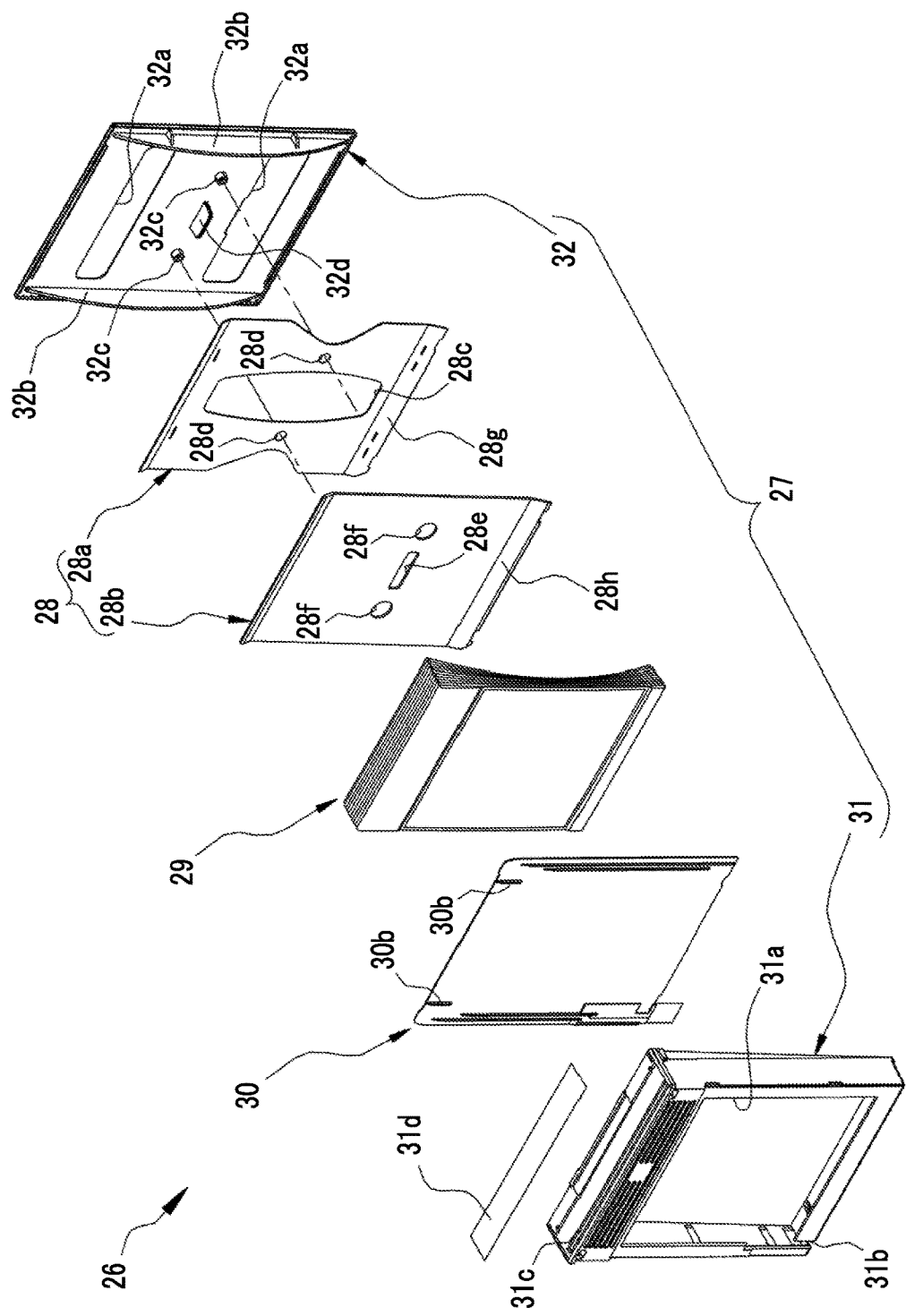
FIG. 7 is an exploded perspective view of the instant film pack.

As shown in FIG. 7, an exposure opening 31a for exposing the film unit 29 is formed in the case member 31. In the following description, a surface of the instant film pack 26 in which the exposure opening 31a is formed is a "front surface", a surface opposite to the "front surface" is a "rear surface", a surface facing the film ejection port 22 of the camera body 11 is a "top surface", and a surface opposite to the "top surface" is a "bottom surface". The film cover 30 is overlapped before the film unit 29 initially set in the exposure opening 31a within the case member 31. Accordingly, the exposure opening 31a is lighttightly blocked by the film cover 30. A cut-off portion 31b into which a known claw member 57 (see FIGS. 17 and 18) formed at the camera is inserted is formed in a lower portion of the exposure opening 31a.

A discharge port 31c is formed in a top surface of the case member 31. The discharge port 31c is formed in a slit shape. The film units 29 or the film cover 30 are discharged one by one outwards from the instant film pack 26 by the claw member 57 inserted into the cut-off portion 31b of the case member 31 through the discharge port 31c.

A light shielding seal 31d is pasted onto the case member 31 so as to close the discharge port 31c from the outside. The light shielding seal 31d is formed as a flexible sheet. The light shielding seal 31d is pasted onto one edge of a long side of the discharge port 31c so as not to hinder the film unit or the film cover in a case where the film unit 29 or the film cover 30 passes through the discharge port 31c.

Figure 8:
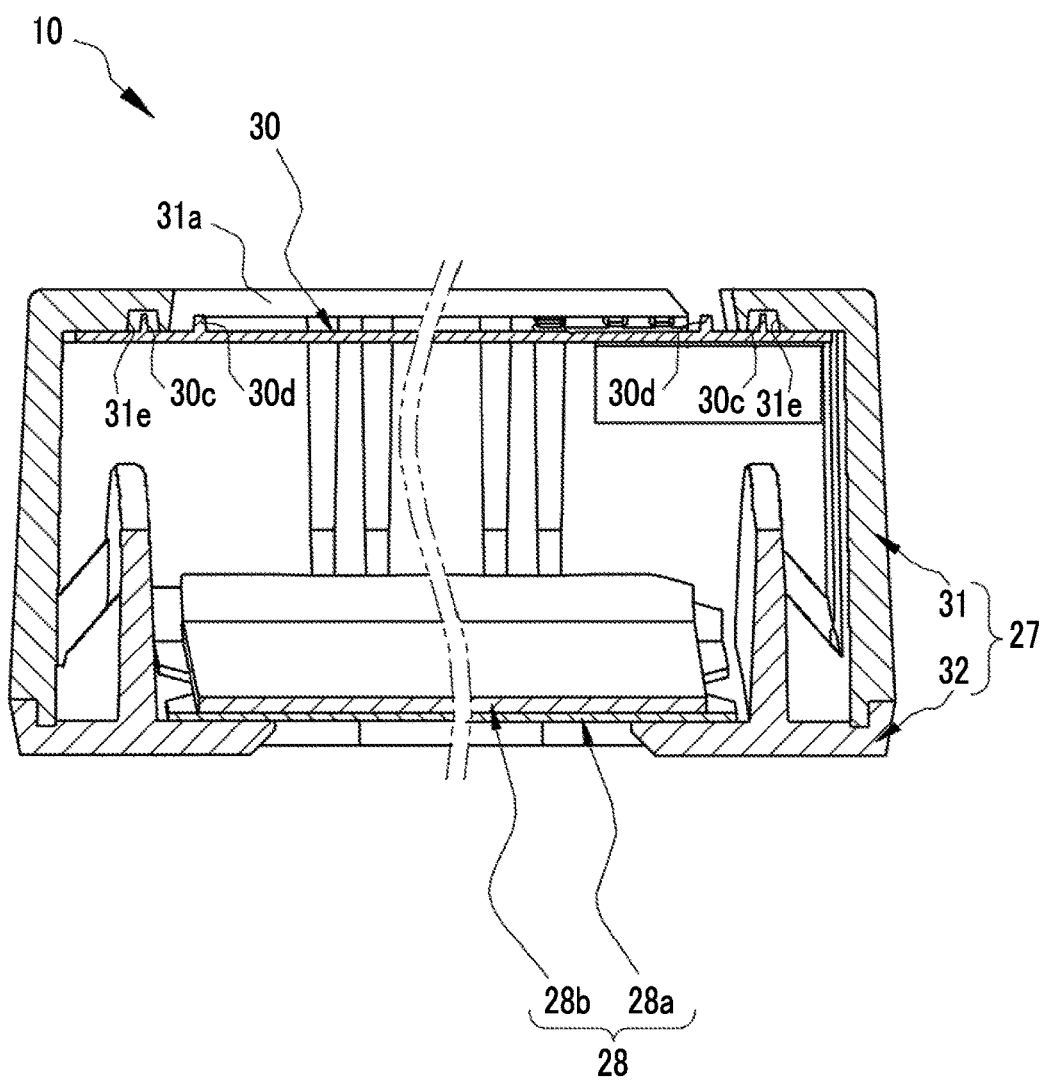
FIG. 8 is a sectional view of the instant film pack.

As shown in FIG. 8, in the case member 31, a pair of light shielding grooves 31e is formed in positions corresponding to both sides of the exposure opening 31a and an inner wall surface facing the film cover 30. A pair of outer light shielding ribs 30c of the film cover 30 to be described below is inserted into the pair of light shielding grooves 31e.

As shown in FIG. 7, the cover 32 includes a pair of openings 32a, a pair of unit support protrusions 32b, a pair of caulking pins 32c, and a support piece 32d. The pair of openings 32a is formed so as to be vertically spaced apart from each other with a predetermined space, and is openings into which the press members 24a and 24b formed at the camera are inserted in a case where the instant film pack is loaded into the camera.

The pair of unit support protrusions 32b are formed at both side edge portions of the cover 32 so as to be vertically long, and each has an arc shape of which a center portion protrudes toward the exposure opening 31a. The unit support protrusions 32b touch both side edge portions on a rear surface of the film unit 29 positioned in the last layer, and push up the film unit 29 by each having the arc shape of which the center portion protrudes toward the exposure opening 31a. Accordingly, a gap between the film cover 30 and the exposure opening 31a is prevented from being formed.

The pair of caulking pins 32c is used for attaching the film unit press plate 28. The support piece 32d supports the center portion of the film unit 29 positioned in the last layer from behind, and prevents the film unit 29 from being bent in which the center portion thereof is curved toward the cover 32.

The film unit press plate 28 includes two elastic sheets 28a and 28b made of a synthetic resin. The sheet 28a is pressed by the press members 24a and 24b in a case where the loading cover 24 closes the film pack room, and is curved so as to protrude toward the cover 32. An opening 28c and a pair of holes 28d are formed in the sheet 28a. The opening 28c is formed in the center portion of the sheet 28a so as to be vertically long, and the support piece 32d is inserted into this opening. The pair of caulking pins 32c is inserted into the pair of holes 28d, and the pair of holes is used for attaching the film unit press plate 28 to the cover 32.

An opening 28e and a pair of holes 28f are formed in the sheet 28b. The opening 28e is formed in the center portion of the sheet 28b, and the support piece 32d is inserted into this opening. The pair of caulking pins 32c is inserted into the pair of holes 28f. A lower end portion 28h of the sheet 28b is attached to a lower end portion 28g of the sheet 28a. Accordingly, the sheet 28b prevents the sheet 28a from being slack, and prevents light leak from the pair of openings 32a. The sheet 28b pushes up the film unit 29 in a substantially planar manner in a case where the sheet 28a is elastically bent by the press members 24a and 24b. As a result, the film cover 30 positioned in the foremost layer or the film unit 29 is pressed rearwards on the front surface of the case member 31.

Figure 9:
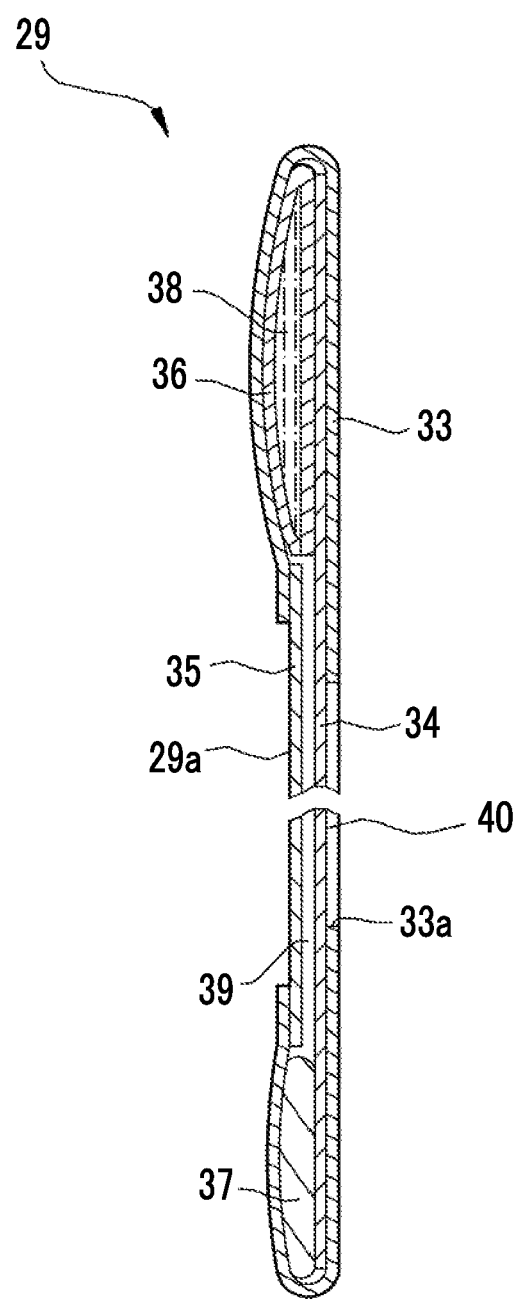
FIG. 9 is a sectional view of a film unit.

As shown in FIG. 9, the film unit 29 includes a mask sheet 33, a photosensitive sheet 34, a cover sheet 35, a developer pod 36, and a trap portion 37, and is a so-called mono-sheet type film. The mask sheet 33 is formed as a sheet made of a thin synthetic resin, and includes a screen opening 33a. A photosensitive layer, a diffusion reflective layer, and an image reception layer are formed in the photosensitive sheet 34. The cover sheet 35 includes an exposure surface 29a facing an exposure head 51 to be described below.

The developer pod 36 is formed in a substantially bag shape, and contains a developer 38 therein. The developer pod 36 is pasted onto an end portion of the photosensitive sheet 34 close to the discharge port 31c, and is wrapped by an end portion of the mask sheet 33. Both ends of the developer pod 36 are spaced apart from both ends of the film unit 29 with predetermined spaces in a width direction of the exposure surface 29a.

Figure 10:
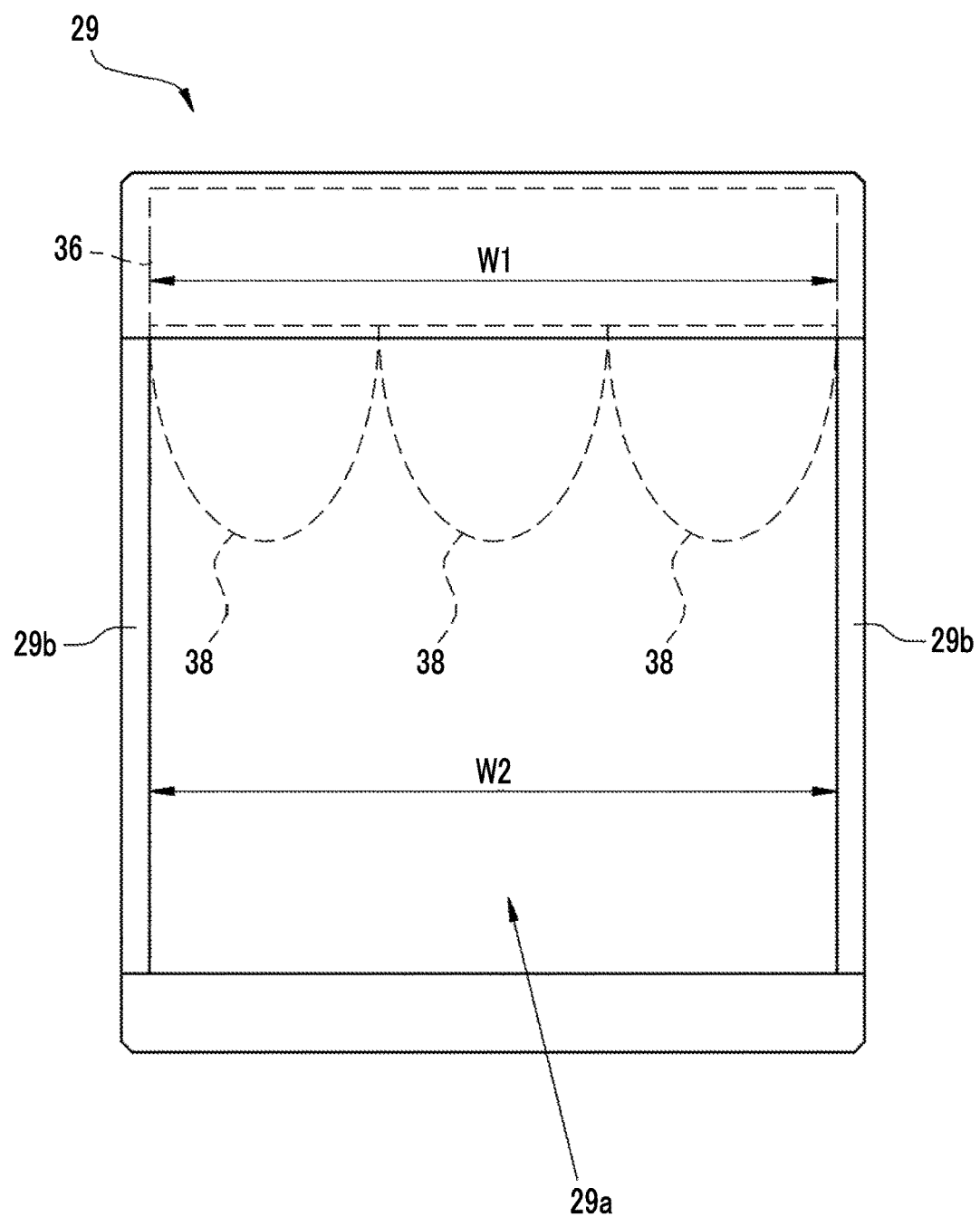
FIG. 10 is a front view of the film unit.

As shown in FIG. 10, a width W1 of the developer pod 36 is equal to a width W2 of the exposure surface 29a. In this example, a case where the widths are equal to each other includes a case where the widths are substantially equal to each other. Portions of the film unit 29 which are positioned outside both ends of the developer pod 36 in the width direction of the exposure surface 29a are side edge portions 29b. As shown in FIG. 9, the trap portion 37 is pasted onto an end portion of the photosensitive sheet 34 opposite to the discharge port 31c, and is similarly wrapped by the end portion of the mask sheet 33.

As will be described in detail later, the film unit 29 irradiates the photosensitive layer with a print light at the time of printing, and thus, the photosensitive layer is exposed. The developer pod 36 is torn at the time of development, and the developer 38 flows and is spread into a gap 39 between the photosensitive sheet 34 and the cover sheet 35. An image acquired through the exposure of the photosensitive layer is reversed by the diffusion reflective layer, and is transferred to the image reception layer. By doing this, a positive image appears on a positive image observation surface 40 of the photosensitive sheet 34 exposed through the screen opening 33a.

Figure 11:
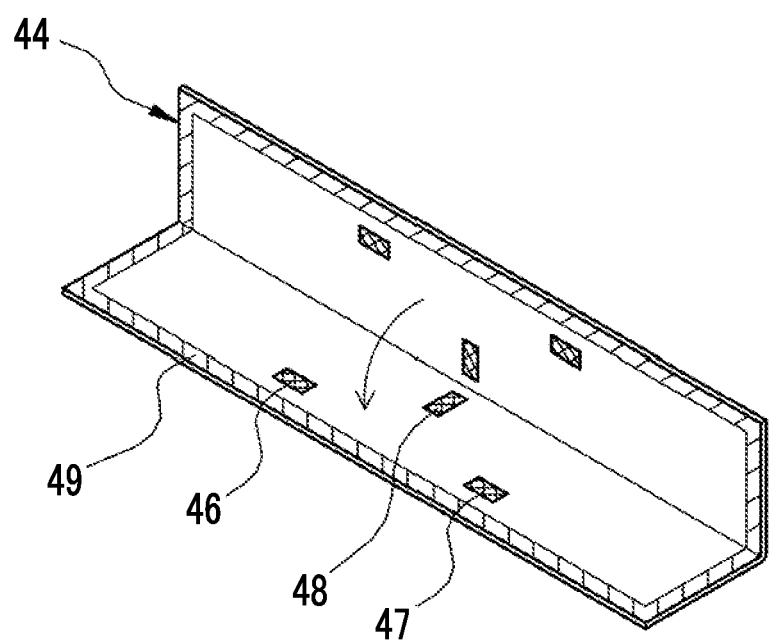
FIG. 11 is a perspective view of a developer pod in a state in which a packaging material is opened.

As shown in FIG. 11, the developer pod 36 is formed by using a packaging material 44, and contains the developer 38 (see FIG. 9). The packaging material 44 is acquired by pasting aluminum foil into a paper support and applying an adhesive to the aluminum foil pasted onto the paper support. As depicted by mosaic hatching in the diagram, middle seals 46 to 48 are formed near the center of the developer pod 36. As depicted by hatching in the diagram, a weak seal 49 is formed in an outlet portion through which the developer 38 leaks. The outlet portion that is pasted by the weak seal 49 is pasted with adhesive strength weaker than those of the middle seals 46 to 48.

The middle seals 46 and 47 paste positions in which the developer pod 36 is divided into three in the width direction of the film unit 29 and which are close to the outlet of the developer 38. The middle seals 48 paste a position which is the center in the width direction of the film unit 29 and is opposite to the outlet of the developer 38.

The middle seals 46 to 48 have a function of controlling the spreading of the developer 38. Specifically, the middle seals 46 to 48 spread the developer 38 into the gap 39 (see FIG. 9) from the developer pod 36 as depicted by a dashed line of FIG. 10 in a case where the weak seal 49 is broken through crushing using a spreading roller pair 54 to be described below and the developer 38 leaks from the outlet portion in three divided positions.

Figure 12:
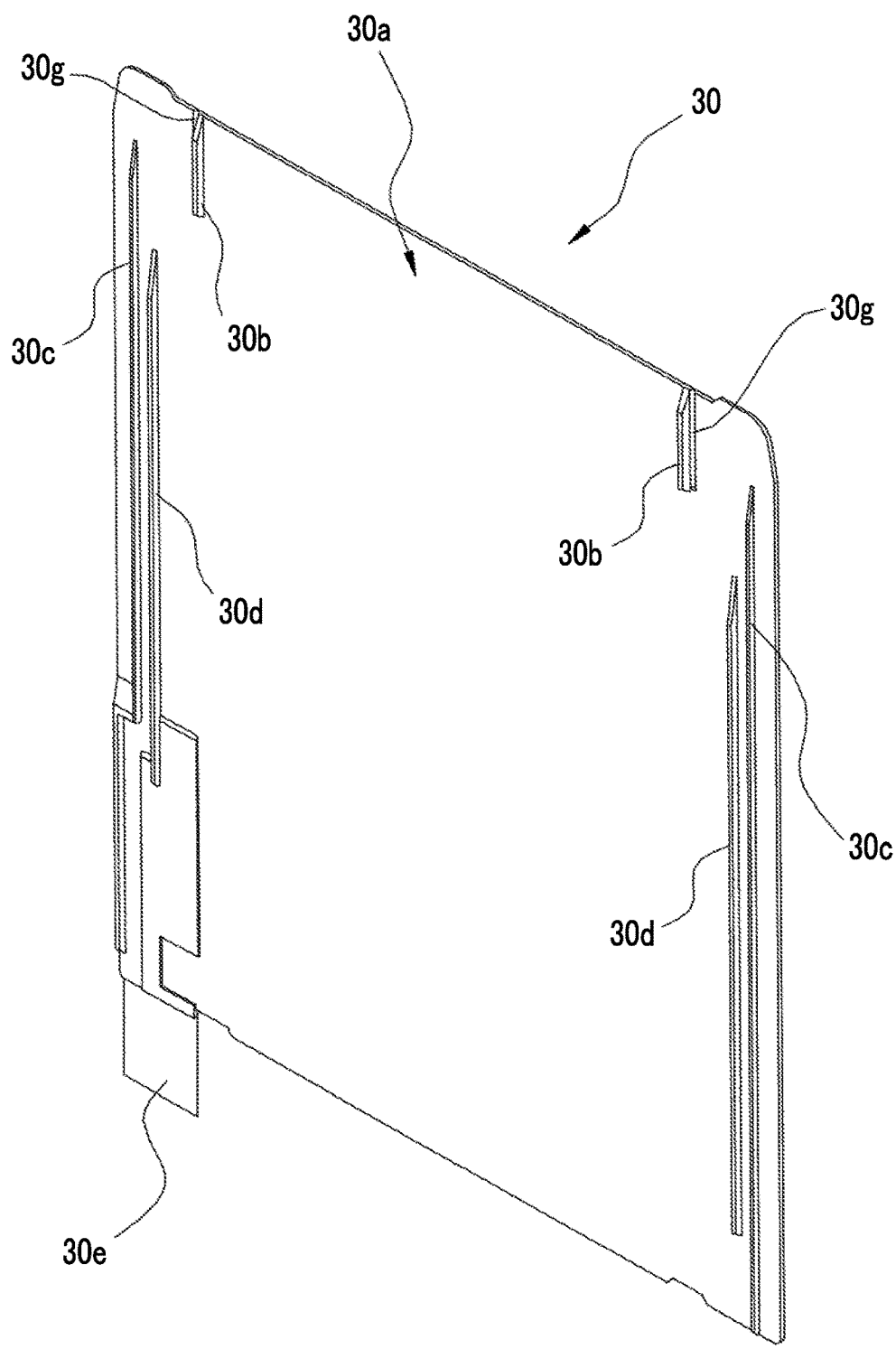
FIG. 12 is a perspective view of a film cover.
Figure 13:
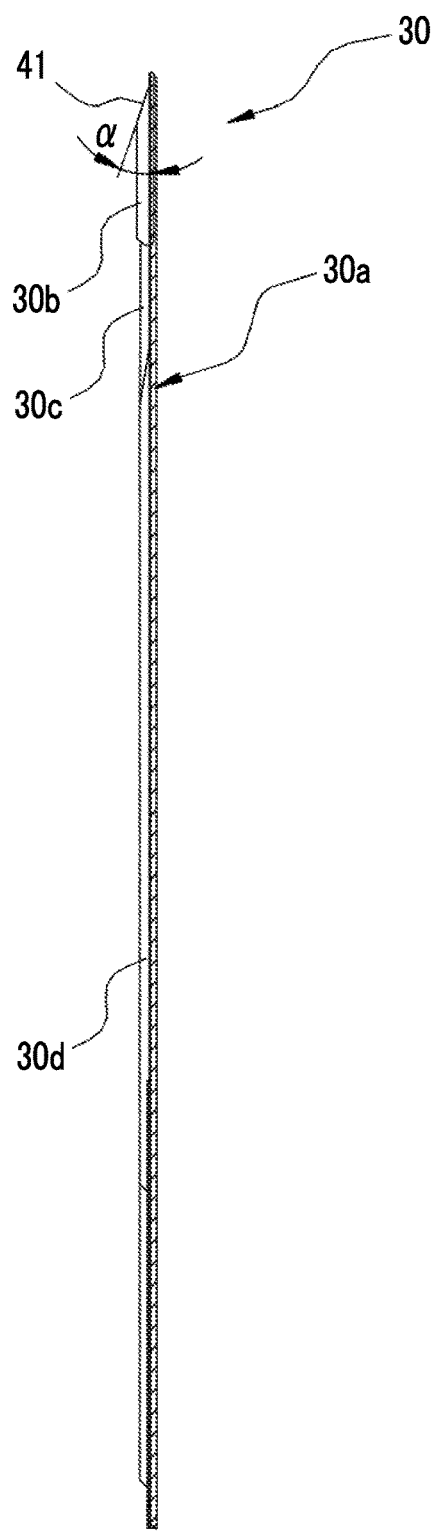
FIG. 13 is a sectional view of the film cover.

As shown in FIGS. 12 and 13, the film cover 30 is formed as a sheet thinner than the film unit 29, and has light shielding properties and flexibility. The film cover 30 is a molded item made of a synthetic resin, and is made, for example, of polystyrene containing carbon black.

The film cover 30 includes a cover member 30a, a pair of accompanying prevention ribs 30b, a pair of outer light shielding ribs 30c, a pair of inner light shielding ribs 30d, a light shielding film 30e, and bending guide grooves 30g as bending guide portions.

The accompanying prevention ribs 30b, the outer light shielding ribs 30c, the inner light shielding ribs 30d, and the bending guide grooves 30g as the bending guide portions are integrally formed on a front surface of the cover member 30a facing the exposure opening 31a (see FIG. 7). The outer light shielding ribs 30c and the inner light shielding ribs 30d are positioned closer to proximal ends than the accompanying prevention ribs 30b in a discharge direction in a case where the film cover 30 is discharged through the discharge port 31c. The light shielding film 30e is pasted onto a rear surface of the cover member 30a.

The cover member 30a has a width enough to close at least the exposure opening 31a, and the width is 72.2 mm in the present embodiment.

The accompanying prevention ribs 30b are arranged in parallel with the discharge direction from a distal end in the discharge direction of the film cover 30. The accompanying prevention ribs 30b prevent the film unit 29 positioned in the next layer from being discharged together in a case where the film cover 30 is discharged through the discharge port 31c. Thus, the accompanying prevention ribs 30b are formed so as to protrude from positions which are the distal end portion on the front surface of the cover member 30a facing the exposure opening 31a and are both side edge portions with a height equal to the gap of the discharge port 31c, and prevent the film unit 29 positioned in the topmost layer from being ejected. A case where the height is equal to the gap of the discharge port 31c includes a case where the height of the accompanying prevention ribs is substantially equal to the gap.

Figure 14:
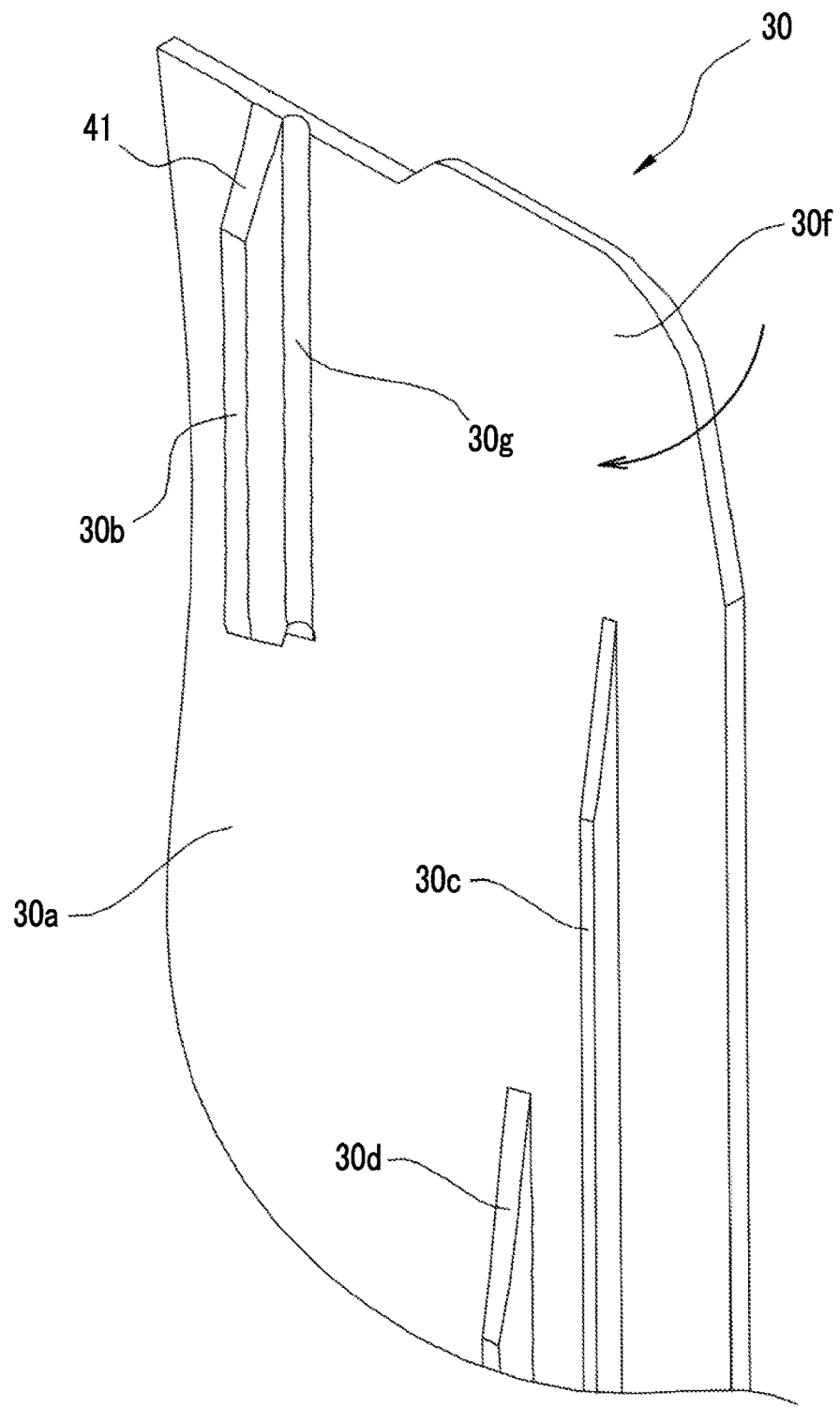
FIG. 14 is a perspective view showing bending guide grooves.

As shown in FIGS. 13 and 14, a tilt surface 41 of which a protruding height gradually decreases toward the distal end from the proximal end of the cover member 30a is formed at each accompanying prevention rib 30b. It preferable that the tilt surface 41 has a tilt angle α of 7° to 30° (which is equal to greater than 7° and is equal to or less than 30°, and "~" includes an upper limit and a lower limit in the following description) with respect to the cover member 30a. The tilt angle α is set in the above-described range, and thus, the distal end of the film cover 30 can smoothly pass without rapidly increasing a load of a motor that rotates the spreading roller pair 54 in a case where the distal end of the film cover 30 passes between the spreading roller pair (see FIG. 17) 54.

As shown in FIG. 14, the bending guide groove 30g guides bending so as to tilt a portion which is at the distal end portion of the film cover 30 and is on the outside of the accompanying prevention rib 30b in the protruding direction of the accompanying prevention rib 30b. The bending guide groove 30g is formed on the outside of the accompanying prevention rib 30b in a width direction of the cover member 30a along the accompanying prevention rib 30b.

A sectional shape of the bending guide groove 30g is not particularly limited, and may be a triangle shape, a square shape, and other sectional shape in addition to an arc shape. The bending guide groove 30g may be continuously formed along the accompanying prevention rib 30b, and may also be intermittently formed along the accompanying prevention rib 30b. The bending guide groove 30g is formed so as to be close to the accompanying prevention rib 30b, but may be formed, for example, in a surface opposite to the accompanying prevention rib 30b although not shown. In this case, the bending guide groove may guide bending so as to tilt the portion outside the accompanying prevention rib 30b in the protruding direction of the accompanying prevention rib 30b by using the groove.

Figure 15A:
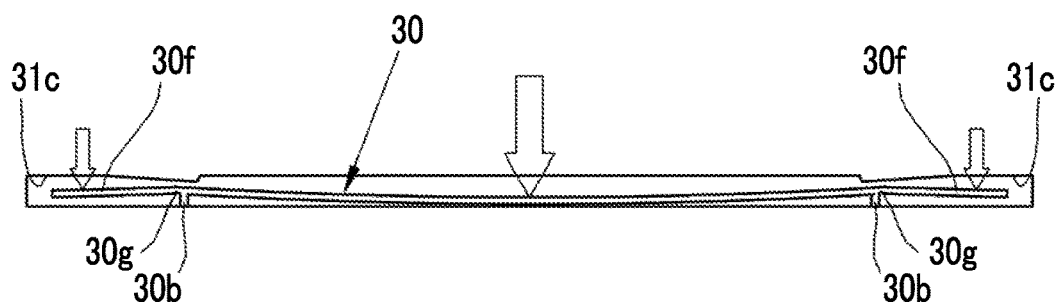
FIG. 15A is a front view showing a discharge port and a film cover which includes bending guide grooves according to the present invention.
Figure 15B:
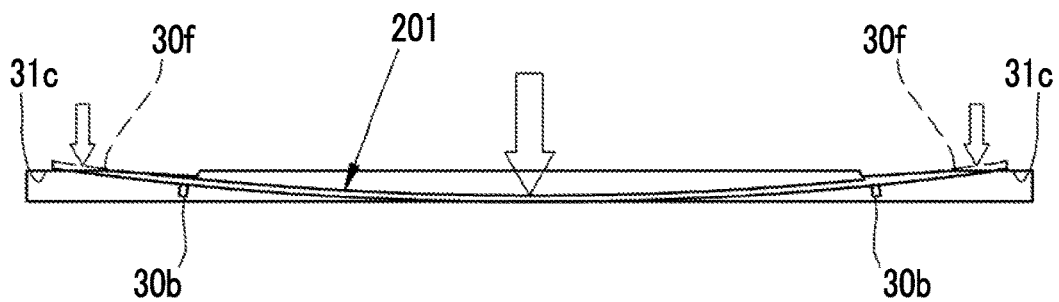
FIG. 15B is a front view showing a discharge port and a film cover which does not have the bending guide grooves according to the present invention.

FIGS. 15A and 15B are diagrams for describing an ejection effect of the film cover 30 through the discharge port 31c using the bending guide grooves 30g, and show the relationship between a distortion state of film covers 30 and 201 and the discharge port 31c. FIG. 15A shows the film cover 30 which includes the bending guide groove 30g according to the present invention, and FIG. 15B shows a film cover 201 which does not include the bending guide grooves 30g.

The exposure surface of the instant film pack 26 having the square size according to the present invention has an area greater than that of the instant film pack according to the related art. Thus, a distortion amount at which the center portion of the film cover protrudes in a spherical shape is also large at the time of molding the film cover 30. In addition, as shown in FIG. 15B, the film cover 201 is pressed through the pressing using the press members 24a and 24b within the instant film pack 26 such that the center portion thereof is strongly pressed and both side edge portions thereof are weakly pressed as represented by an arrow. Accordingly, in a case where the bending guide grooves 30g are not formed, since both side edge portions 30f of the cover member 30a are stopped by the discharge port 31c, there is a concern that an error will occur in the discharge of the film cover 30. In contrast, in the film cover 30 having the bending guide grooves 30g as shown in FIG. 15A, both the side edge portions 30f are bent in a direction in which a bending deformation at the time of molding the film cover is relaxed by the bending guide grooves 30g. Thus, both the side edge portions 30f are not stopped by the discharge port 31c, and thus, the film cover 30 can be smoothly ejected through the discharge port 31c.

Figure 16:
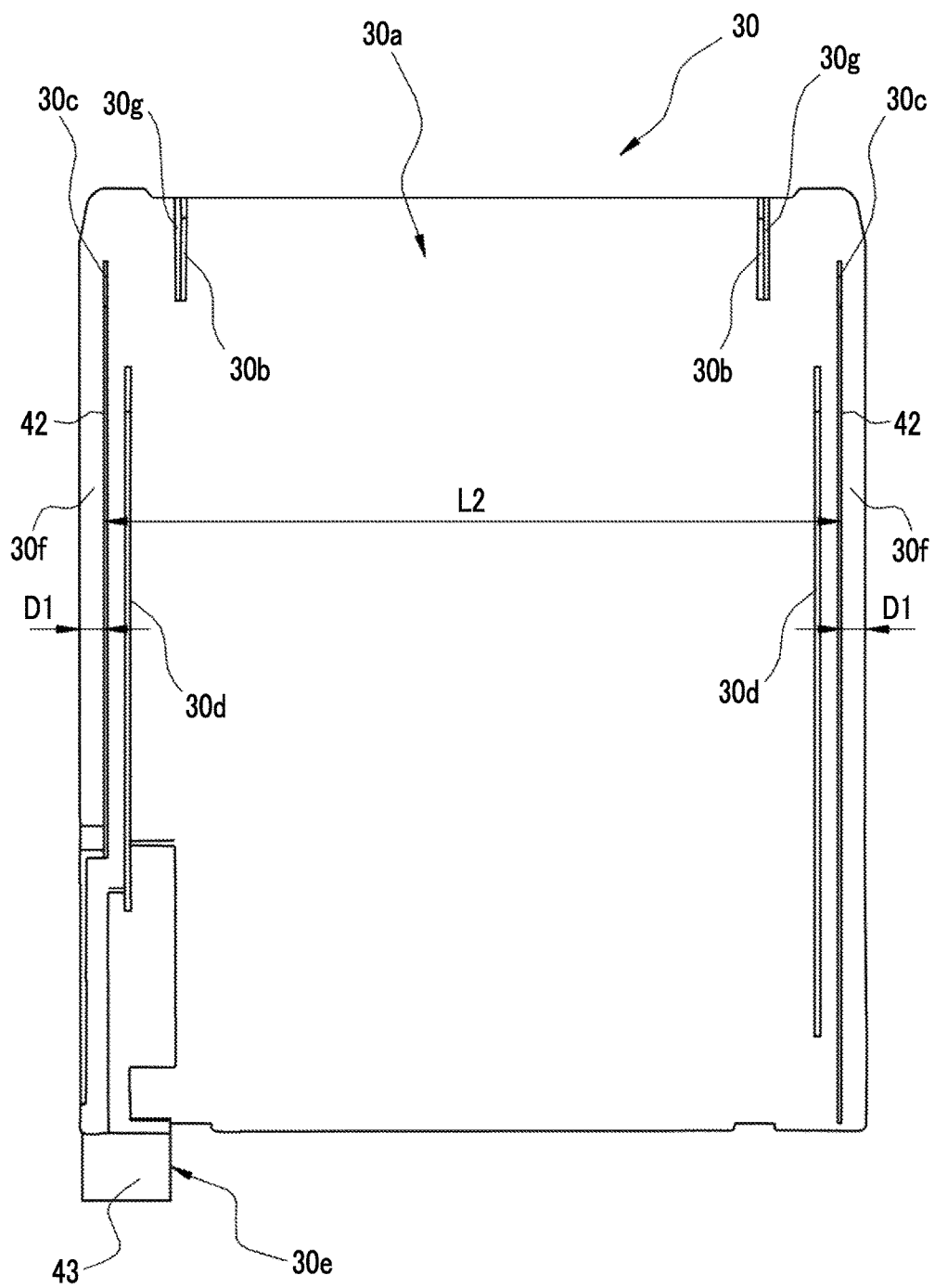
FIG. 16 is a plan view of the film cover.

As shown in FIG. 16, the pair of outer light shielding ribs 30c is arranged in parallel with each other in a width direction perpendicular to the discharge direction of the film cover 30, and extends in a narrow strip shape along the discharge direction. The outer light shielding ribs 30c corresponding to "light shielding ribs" in the claims.

The outer light shielding ribs 30c are formed so as to be spaced apart from one end in the width direction of the film cover 30 with a predetermined space. Portions ranging from an edge of the film cover 30 in the width direction to outer edges 42 of the outer light shielding ribs 30c, that is, portions which are positioned outside the outer edges 42 of the outer light shielding ribs 30c are the side edge portions 30f of the film cover 30. Both the side edge portions 30f of the film cover 30 face both the side edge portions 29b of the film unit 29, and do not face portions of the film unit which are positioned inside both the side edge portions 29b. Accordingly, in a case where the film unit 29 is transported by a capstan roller 61 to be described below, only both the side edge portions 29b of the film unit 29 are pinched, and the developer pod 36 is prevented from being crushed. Widths D1 of both the side edge portions 30f are 2.3 mm in the present embodiment.

A second distance L2 which is a space between the outer edges 42 of the pair of outer light shielding ribs 30c is 67.6 mm in the present embodiment. The outer edges 42 of the outer light shielding rib 30c is an edge positioned outside in the width direction of the film cover 30.

The pair of inner light shielding ribs 30d is positioned inside the pair of outer light shielding ribs 30c in the width direction of the film cover 30. The pair of inner light shielding ribs 30d is arranged in parallel with each other, and extends in a narrow strip shape along the discharge direction. The pair of inner light shielding ribs 30d faces both side edges of the exposure opening 31a.

As shown in FIG. 8, in a state in which the instant film pack 26 is accommodated in the case member 31, the outer light shielding ribs 30c are inserted into the light shielding grooves 31e, and the inner light shielding ribs 30d are positioned near both the side edges of the exposure opening 31a. Accordingly, a labyrinth structure is built by the light shielding grooves 31e, the outer light shielding ribs 30c, and the inner light shielding ribs 30d. Even in a case where the film cover 30 is deformed in a thickness direction and the gap between the film cover 30 and the exposure opening 31a is formed, external light is prevent from being incident within the instant film pack 26 through the gap. In FIG. 8, the film unit 29 is not shown for simplicity of illustration.

As shown in FIG. 16, the light shielding film 30e is provided at a lower end of the cover member 30a with which the claw member 57 (see FIG. 17) engages. The light shielding film 30e is formed in a striped shape, and is pasted onto such that a part 43 thereof protrudes from the lower end of the cover member 30a. The protruding part 43 is bent in an L shape toward the front surface of the cover member 30a. A width of at least the part 43 of the light shielding film 30e is greater than a width of the cut-off portion 31b formed on the case member 31. The cut-off portion 31b is blocked from the inside by the part 43 of the light shielding film 30e, external light is prevent from being incident on the inside of the instant film pack 26 through the cut-off portion 31b.

Although not shown, a distal-end light shielding flap made of a synthetic resin film having light shielding properties is attached to the center portion of the upper end of the cover member 30a. The distal-end light shielding flap is bent toward the film unit 29, and blocks the center portion of the discharge port 31c within the case 27. Accordingly, the film cover 30 or the film unit 29 is prevented from being blown away through the discharge port 31c due to impact in a case where the instant film pack 26 fell onto the floor.

Figure 17:
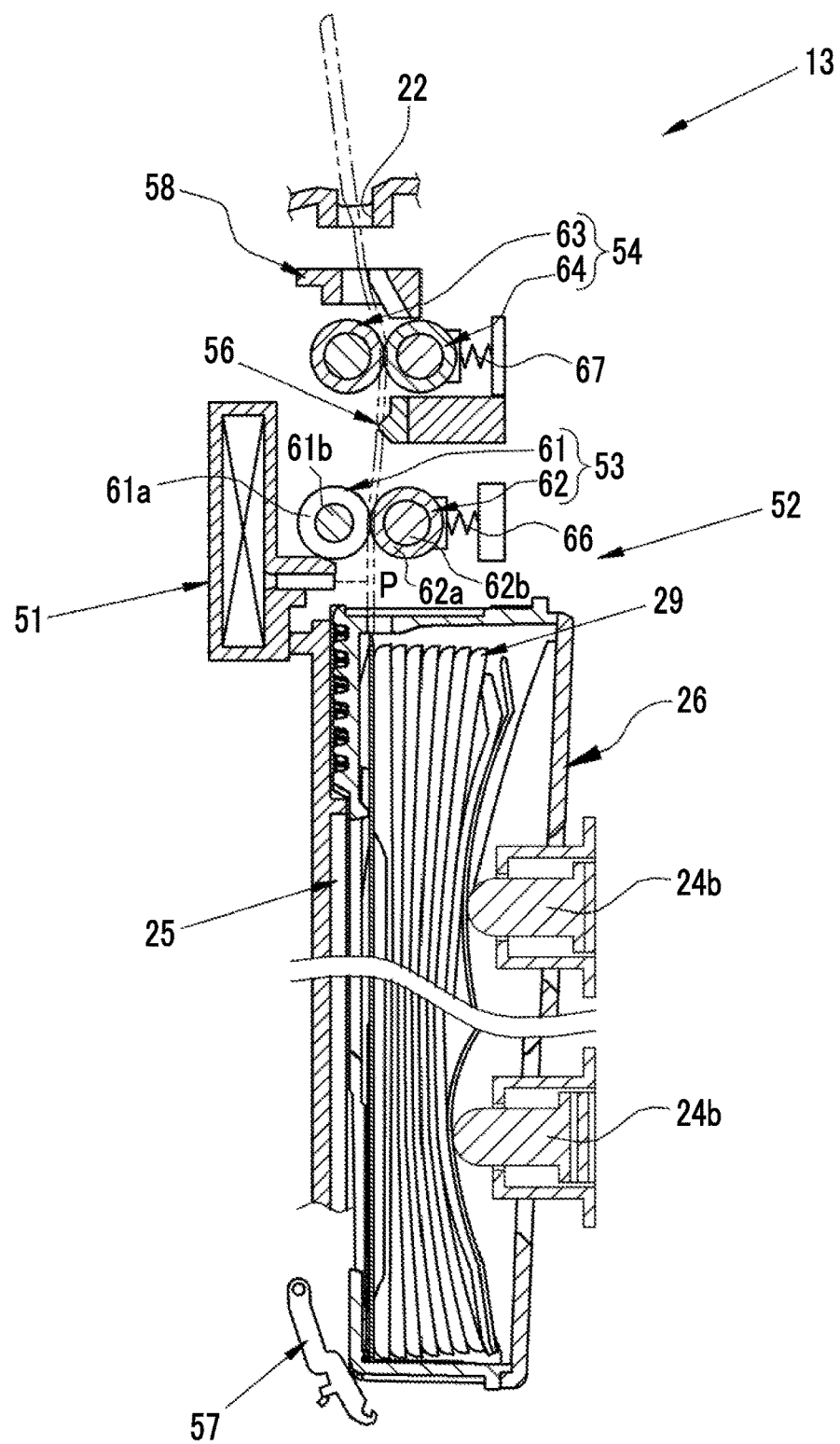
FIG. 17 is a sectional view of a printer unit.
Figure 18:
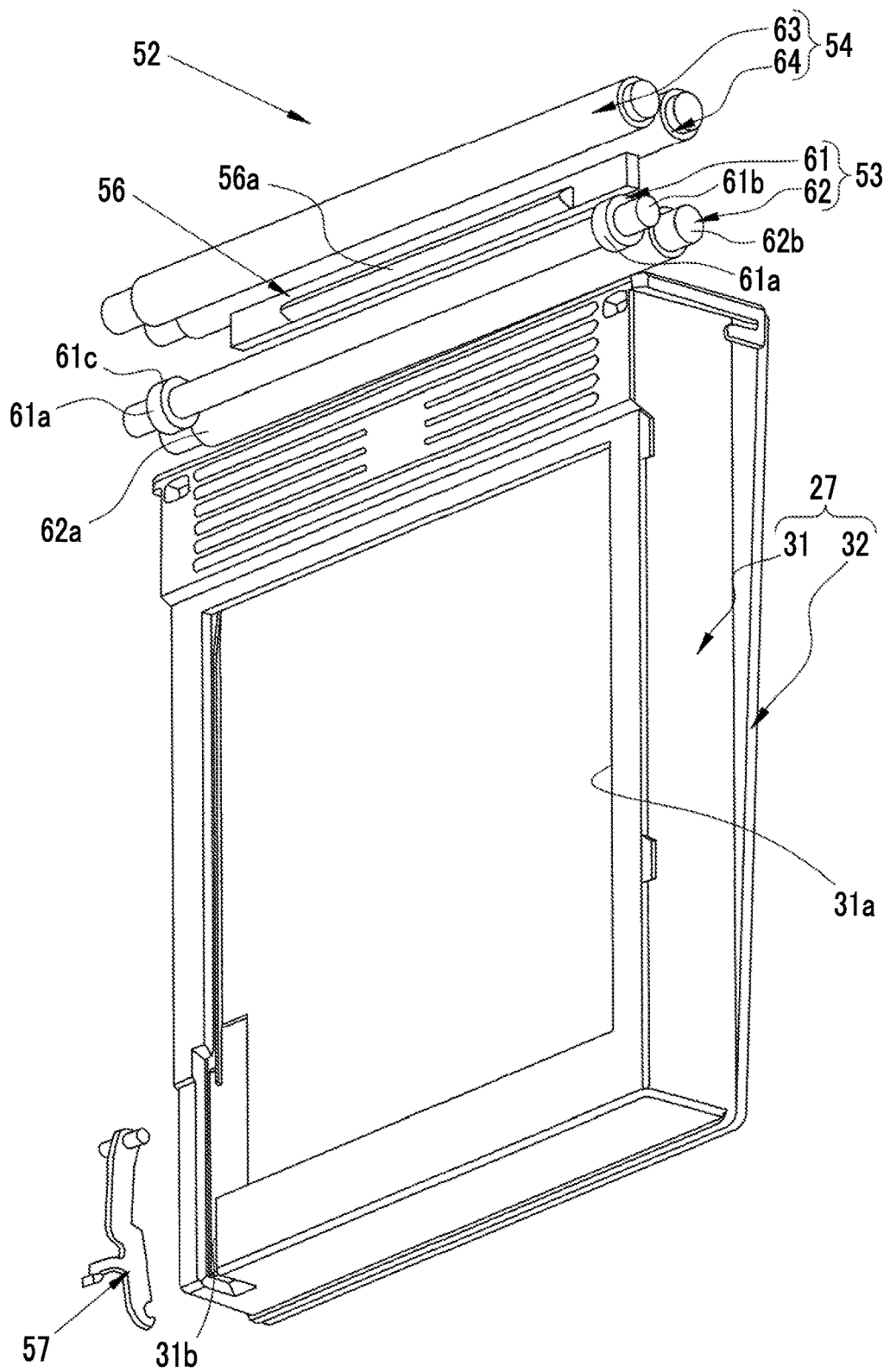
FIG. 18 is a perspective view of the printer unit.

As shown in FIGS. 17 and 18, the printer unit 13 includes the exposure head 51 and a developer spreading device 52. For example, the exposure head 51 includes a light source, a liquid crystal shutter, and a lens.

The exposure head 51 is disposed in a position facing a transport path of the film unit 29 on an upstream side of the developer spreading device 52 in a transport direction of the film unit 29. The exposure head 51 irradiates the exposure surface 29a with line-shaped print light parallel to the width direction of the film unit 29. The transport direction is a direction perpendicular to the width direction of the exposure surface 29a.

The developer spreading device 52 includes a transport roller pair 53, the spreading roller pair 54, a spreading control member 56, a film pack room 25 (see FIGS. 3 and 17), the claw member 57, a claw member driving mechanism (not shown), and an ejection guide 58.

The claw member 57 is inserted into the cut-off portion 31b of the case member 31 by the claw member driving mechanism, and presses the film cover 30 or the foremost film unit 29. Accordingly, the film cover 30 or the foremost film unit 29 is discharged outwards from the instant film pack 26 through the discharge port 31c.

The transport roller pair 53 and the spreading roller pair 54 are driven so as to be rotated by a motor (not shown), and transport the film cover 30 and the film unit 29 while pinching the film cover and the film unit. The transport roller pair 53 includes the capstan roller 61 and a pinch roller 62. The capstan roller 61 and the pinch roller 62 are arranged in a position in which these rollers pinch a transport path of the film unit 29.

The capstan roller 61 is disposed on a side (a left side of the transport path in the diagram) facing the exposure surface 29a of the film unit 29. The capstan roller 61 includes a pair of cylindrical roller members 61a and a rotational shaft 61b that holds the roller members 61a. A spike (not shown) including a plurality of small protrusions is formed on a circumferential surface of the roller member 61a. A holding force of the roller member 61a is further improved by the protrusion. The number and shape of protrusions may be appropriately designed. The protrusion includes a small convex and a small concave formed by filing the circumferential surface of the roller member 61a.

Figure 19:
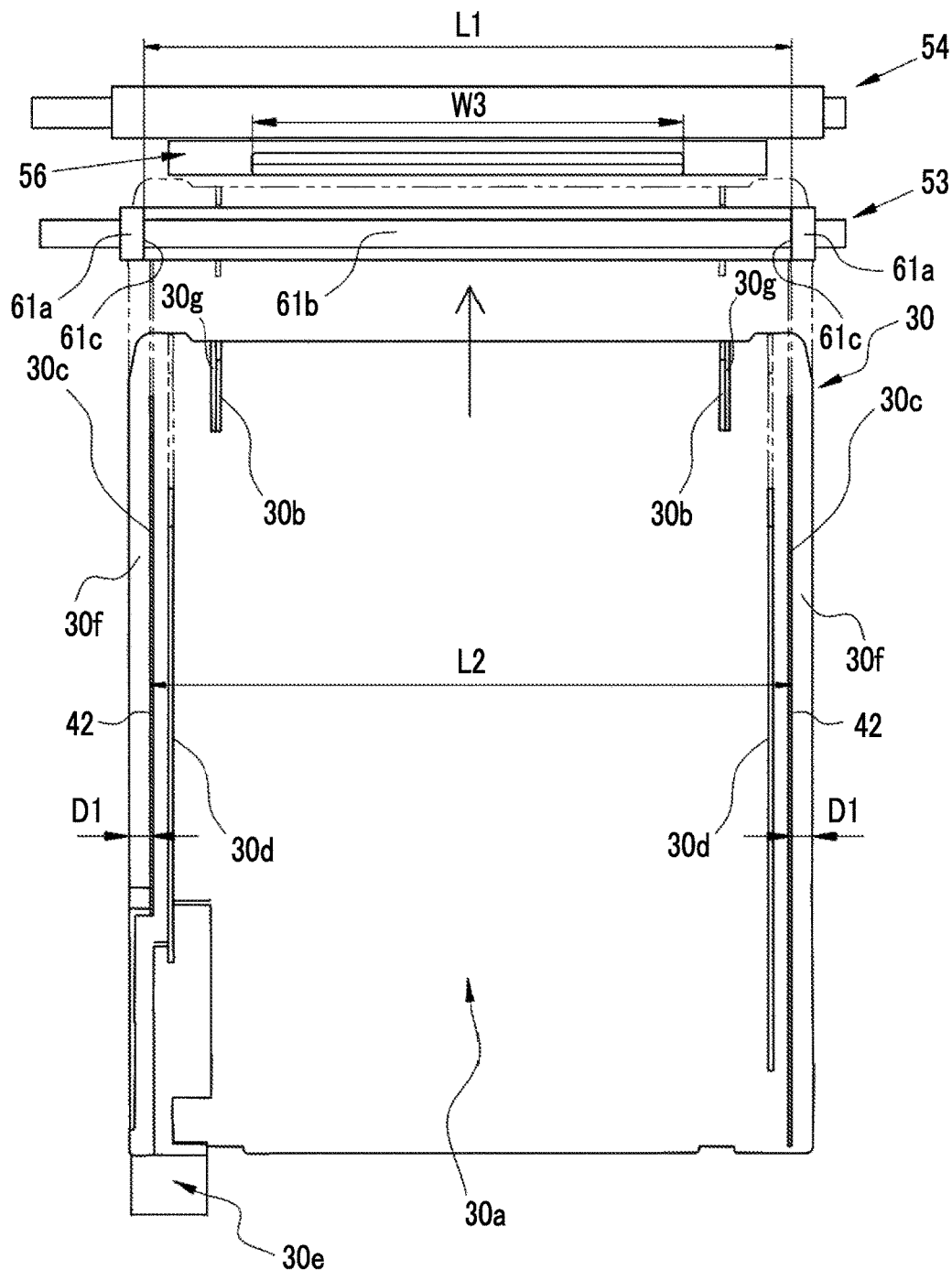
FIG. 19 is a plan view showing a state in which the film cover passes through the printer unit.
Figure 20:
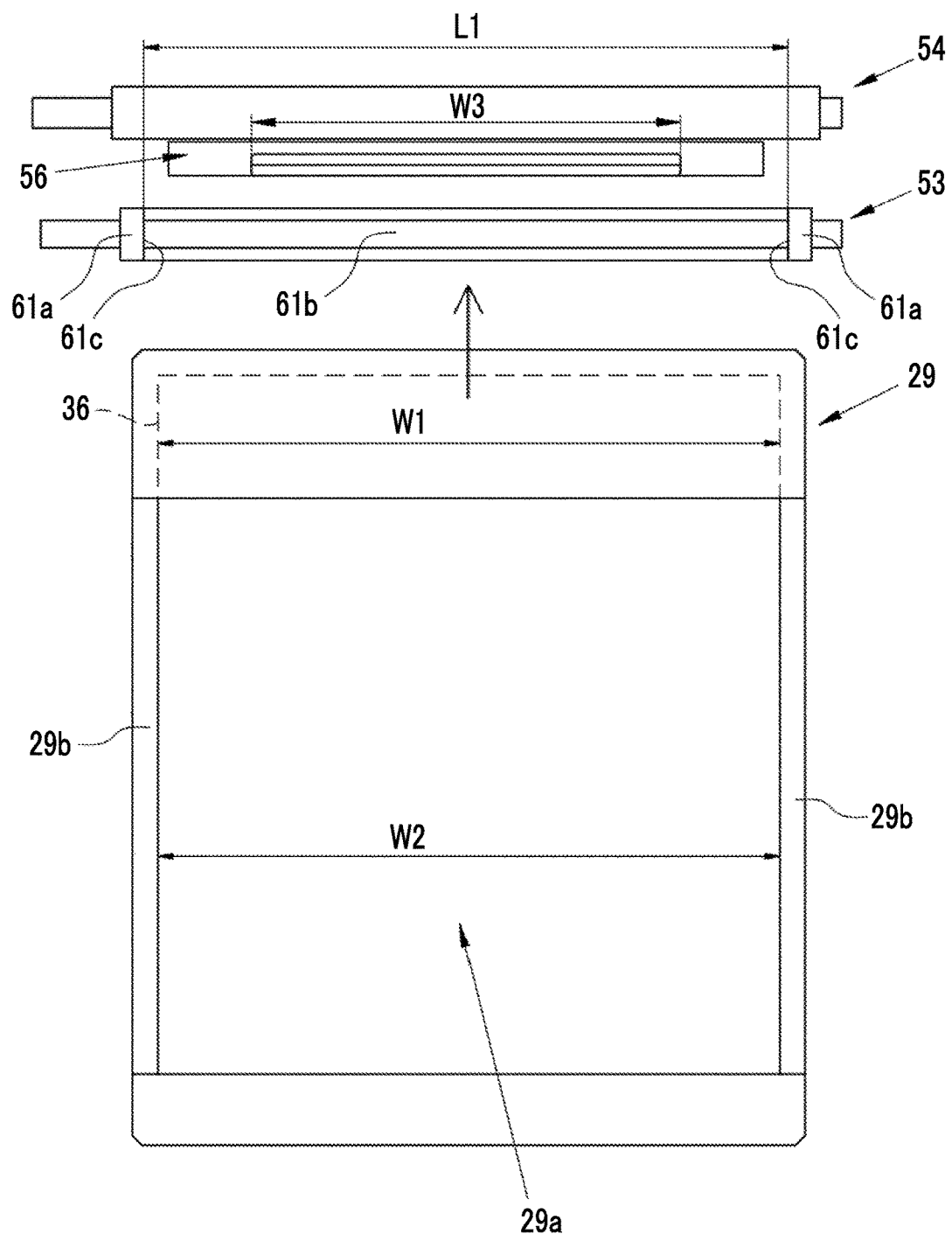
FIG. 20 is a plan view showing a state in which the film unit passes through the printer unit.

As shown in FIGS. 19 and 20, a first distance L1 which is a space between inner edges 61c of the pair of roller members 61a is longer than the second distance L2. Accordingly, since the transport roller pair 53 is not attached to the outer light shielding ribs 30c, the transport roller pair 53 is not detached from the outer light shielding ribs 30c, and thus, an ejection error of the film cover 30 is prevented. The holding force of the transport roller pair 53 that holds the film cover 30 is improved. Since a holding area of the transport roller pair 53 that holds the film cover 30 increases, a frictional force occurring between the transport roller pair and the film cover 30 also increases. Thus, it is possible to transport the film unit with a sufficient holding force even with low torque. The inner edges 61c of the pair of roller members 61a are edges positioned on the inside in an axial direction of the rotational shaft 61b.

As shown in FIG. 19, the pair of roller members 61a is arranged so as to pinch both the side edge portions 30f of the film cover 30 by 0.5 mm or more in the width direction of the exposure surface 29a. In other words, the pair of roller members 61a pinches both the side edge portions 30f in the width direction of the exposure surface 29a by at least 0.5 mm. Thus, in the present embodiment, the first distance L1 is greater than 67.6 mm and is equal to or less than 71.2 mm. Accordingly, both the side edge portions 30f of the film cover 30 are more reliably held by the pair of roller members 61a.

As shown in FIG. 20, the pair of roller members 61a is arranged in a position in which the pair of roller members is in slidingly contact with both the side edge portions 29b of the film unit 29, and pinches portions of both the side edge portions 29b of the film unit 29 which are positioned outside the developer pod 36 in the width direction of the exposure surface 29a. That is, the first distance L1 which is a space between the inner edges 61c of the pair roller members 61a is greater than the width W1 of the developer pod 36. Accordingly, the transport roller pair 53 can transport the film unit without tearing the developer pod 36 of the film unit 29.

Since the width W1 of the developer pod 36 and the width W2 of the exposure surface 29a are equal to each other, the first distance L1 is greater than the width W2 of the exposure surface 29a. Accordingly, the transport roller pair 53 can transport the film unit without pinching the exposure surface 29a of the film unit 29.

Figure 21:
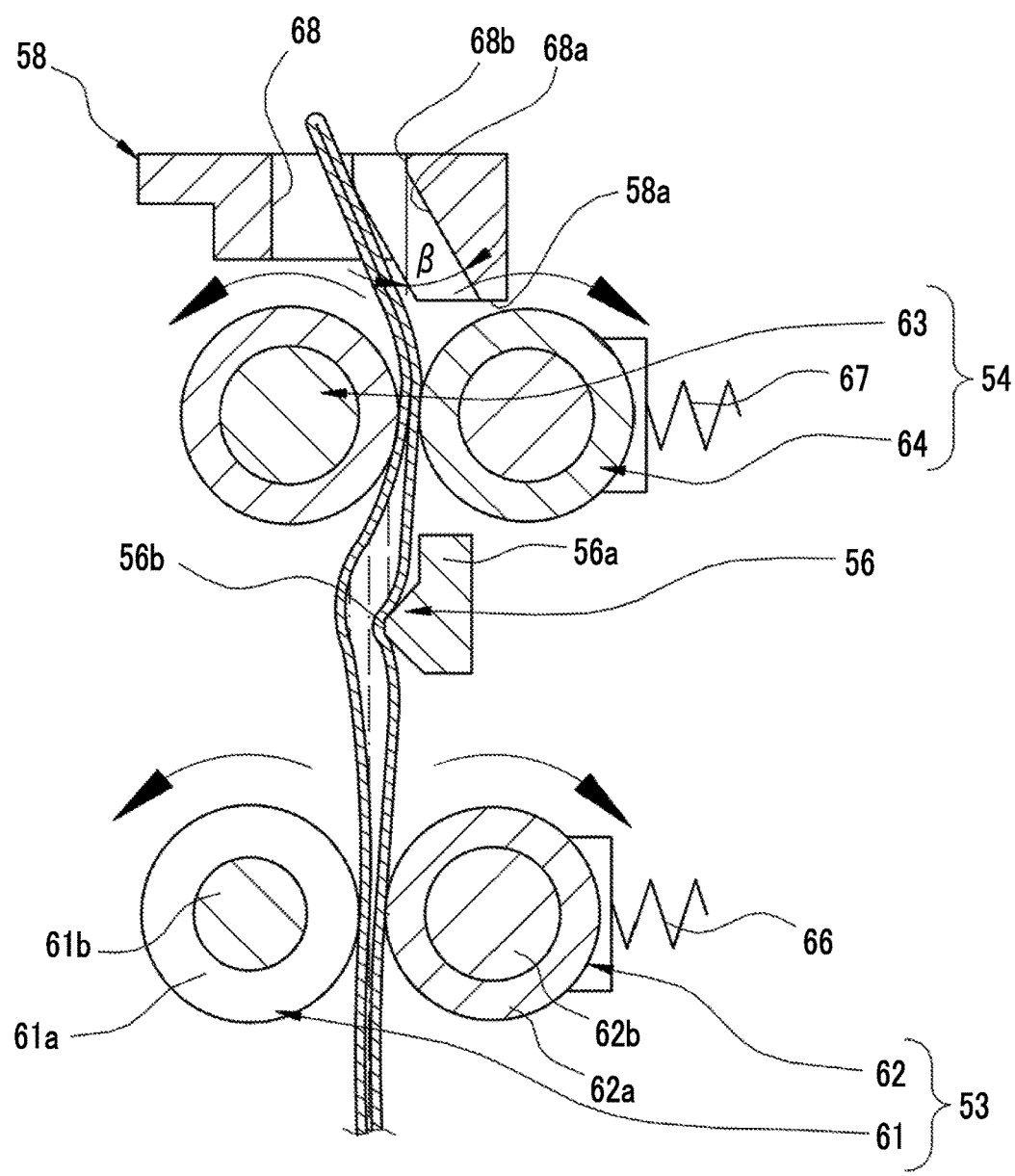
FIG. 21 is a sectional view showing a state in which the developer pod is crushed by a spreading roller pair.

As shown in FIG. 21, the pinch roller 62 is disposed on a side (a right side of the transport path in the diagram) facing the positive image observation surface 40 of the film unit 29. The pinch roller 62 includes a roller member 62a and a rotational shaft 62b. Both end portions of the roller member 62a are pressed toward the capstan roller 61 by springs 66 as press mechanisms.

The transport roller pair 53 transports the film unit toward the spreading roller pair 54 while pinching both the side edge portions 29b of the film unit 29 discharged from the instant film pack 26 by the claw member 57. An exposure position P in which the exposure head 51 exposes the film unit 29 with print light is positioned between the discharge port 31c of the instant film pack 26 and the transport roller pair 53. The exposure using the exposure head 51 is performed for a period during which the film unit is transmitted by the transport roller pair 53.

The exposure is started based on output signals from a detection sensor (not shown) that detects the passing of the distal end portion of the film unit 29 and a rotation speed detection sensor that detects a rotation speed of the capstan roller 61. Initially, the passing of the distal end portion is detected by the distal-end-portion passing detection sensor. The detection of the rotation speed is started by the rotation speed detection sensor based on the detection signal. In a case where the rotation speed reaches a predetermined value, the detection sensor detects that the exposure surface 29*a* of the film unit 29 is transported to a position facing the exposure head 51. Accordingly, the exposure using the exposure head 51 is started.

The exposure is performed by sequentially exposing line images on the film unit 29 by the exposure head 51 while moving the film unit 29 for each line. Accordingly, an image corresponding to a single screen is exposed on the photosensitive layer of the film unit 29. The film unit 29 is subsequently transported toward the spreading roller pair 54 by the transport roller pair 53.

The spreading roller pair 54 includes spreading rollers 63 and 64, and is arranged on a downstream side of the transport roller pair 53 in the transport direction. The spreading roller 63 is disposed on the side (the left side of the transport path in the diagram) facing the exposure surface 29*a* of the film unit 29. The spreading roller 64 is disposed on the side (the right side of the transport path in the diagram) facing the image observation surface of the film unit 29. Both end portions of the spreading roller 64 are pressed toward the spreading roller 63 by springs 67 as press mechanisms.

Although not shown, driving gears are attached to one-side shaft end portions of the spreading rollers 63 and 64, and both the driving gears mesh each other. The motor is connected to one of the driving gears through an intermediate gear. Thus, in a case where the motor rotates, the spreading rollers 63 and 64 are rotated in synchronization with the motor.

The spreading roller pair 54 transports the film unit 29 transported by the transport roller pair 53 toward the ejection guide 58 while pinching the film unit over the entire width. The film unit is pinched by the spreading roller pair 54, and thus, the developer pod 36 of the film unit 29 is crushed. Accordingly, the developer is spread into the gap 39 (see FIG. 8). The film unit 29 delivered from the spreading roller pair 54 is transported toward the ejection guide 58.

The spreading control member 56 is provided between the transport roller pair 53 and the spreading roller pair 54. The spreading control member 56 touches the positive image observation surface 40 of the transported film unit 29, and controls the distribution of the spreading developer by rubbing the positive image observation surface 40 of the film unit 29. The spreading control member 56 is disposed in a position in which a space between the transport roller pair 53 and the spreading roller pair 54 is substantially divided into two. Thus, the spreading control member 56 can control the developer spread into the gap 39 of the film unit 29 in the transport direction of the film unit 29.

The spreading control member 56 extends in a direction which is in parallel with the width direction of the film unit 29 being transported and is perpendicular to the transport direction of the film unit 29. The spreading control member 56 is formed integrally with a plate-shaped support member 56*a*, and is fixed to the camera body 11 through the support member 56*a*.

The spreading control member 56 protrudes toward the film unit 29 from a pinching position in which the spreading roller pair 54 pinches the film unit 29 on a cross-section which is perpendicular to the exposure surface 29*a* of the film unit 29 being transported and is in parallel with the transport direction. Specifically, the spreading control member 56 is formed in a mountain shape of which a dimension in the transport direction gradually decreases toward the film unit 29. Accordingly, the spreading control member 56 can reliably rub the positive image observation surface 40 of the film unit 29.

Figure 22A:
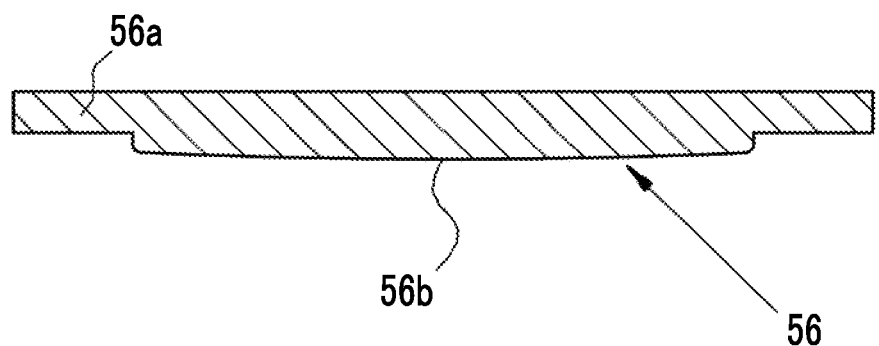
FIG. 22A is a sectional view showing an example of a shape of a distal end of a spreading control member.

As shown in FIG. 22A, the distal end of the spreading control member 56, that is, an end surface 56*b* at a top of the mountain shape is formed in a convex shape of which the center portion protrudes toward the film unit 29 on a cross-section of the film unit 29 in the width direction. Specifically, the end surface 56*b* is formed such that the center portion protrudes from distal ends of both side edges of the spreading control member 56 on the cross-section of the film unit 29 by 0.01 mm to 0.5 mm in the width direction. FIG. 22A shows a dimension in a thickness direction (a protruding direction of the spreading control member 56) with respect to a width direction of the spreading control member 56 for the sake of convenience in the description.

Figure 22B:
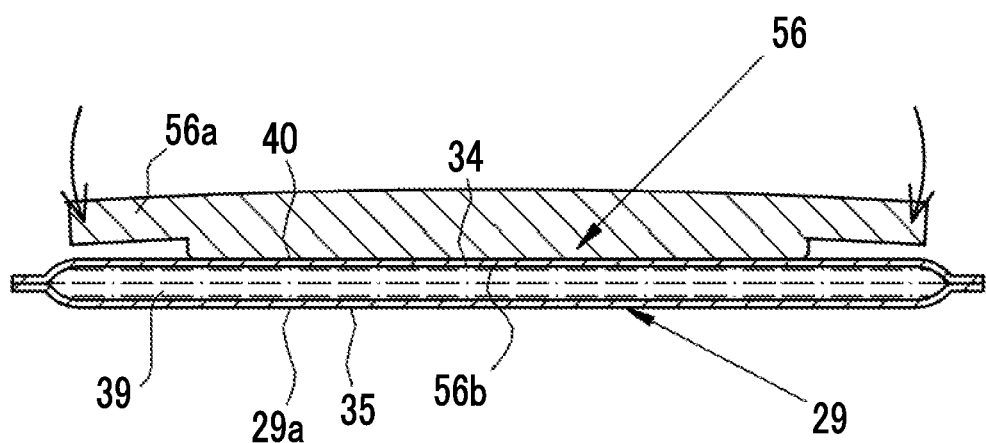
FIG. 22B is a sectional view showing an example of the shape of the distal end of the spreading control member.

Since most components of the camera body 11 including the spreading control member 56 are molded items made of a synthetic resin, the components are distorted in some cases. Particularly, both ends of the spreading control member 56 are distorted toward the film unit 29 in many cases as shown in FIG. 22B. However, since the spreading control member 56 is formed in the convex shape of which the center portion of the distal end protrudes toward the film unit 29 as described above, the spreading control member can press the film unit 29 with an equal pressing force in the width direction of the film unit 29. Accordingly, it is possible to control the developer 38 spread into the gap 39 of the film unit 29 over the width direction of the film unit 29. The developer 38 is spread into the gap 39 from the developer pod 36 in three divided positions, and the spreading control member 56 touches the film unit 29 with the equal pressing force. Thus, the developer 38 can be more equally spread in the width direction of the film unit 29.

Figure 23A:
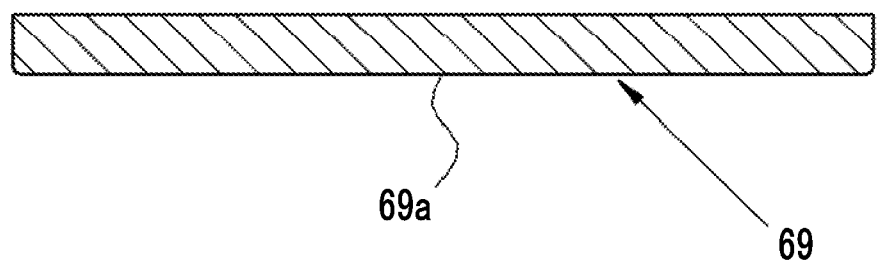
FIG. 23A is a sectional view showing an example of a shape of a distal end of a spreading control member according to the related art.
Figure 23B:
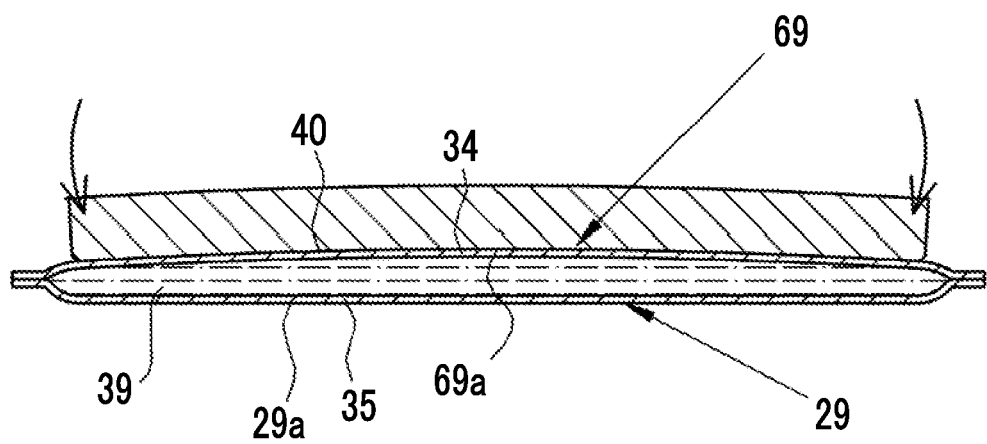
FIG. 23B is a sectional view showing an example of the shape of the distal end of the spreading control member according to the related art.

Meanwhile, as shown in FIG. 23A, an end surface 69*a* on a distal end of a spreading control member 69 according to the related art is formed in a flat shape. Thus, in a case where both ends of the spreading control member 69 are distorted toward the film unit 29 as shown in FIG. 23B, a pressure of the center portion against the film unit 29 is weak, and thus, the developer more easily flows in the center portion than both the end portions. Accordingly, since the developer does not reach four corners of the exposure surface 29*a*, development unevenness is caused. As stated above, the spreading control member 56 according to the present invention is formed in the convex shape of which the center portion of the distal end protrudes, the center portion and both the end portions can equally press the film unit 29.

Figure 24:
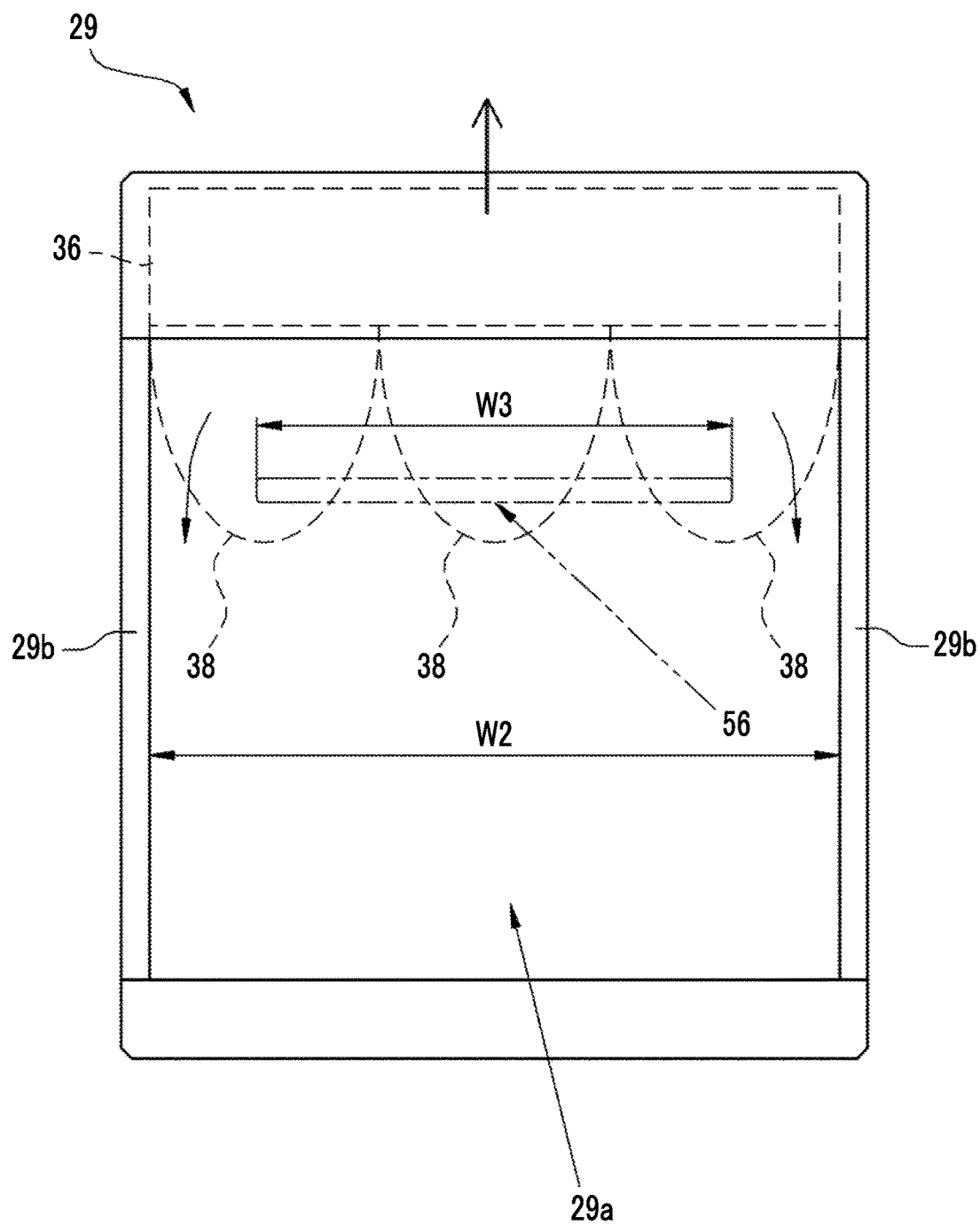
FIG. 24 is a front view showing a spreading state of the developer in a case where a width of the spreading control member falls in a predetermined range.
Figure 25:
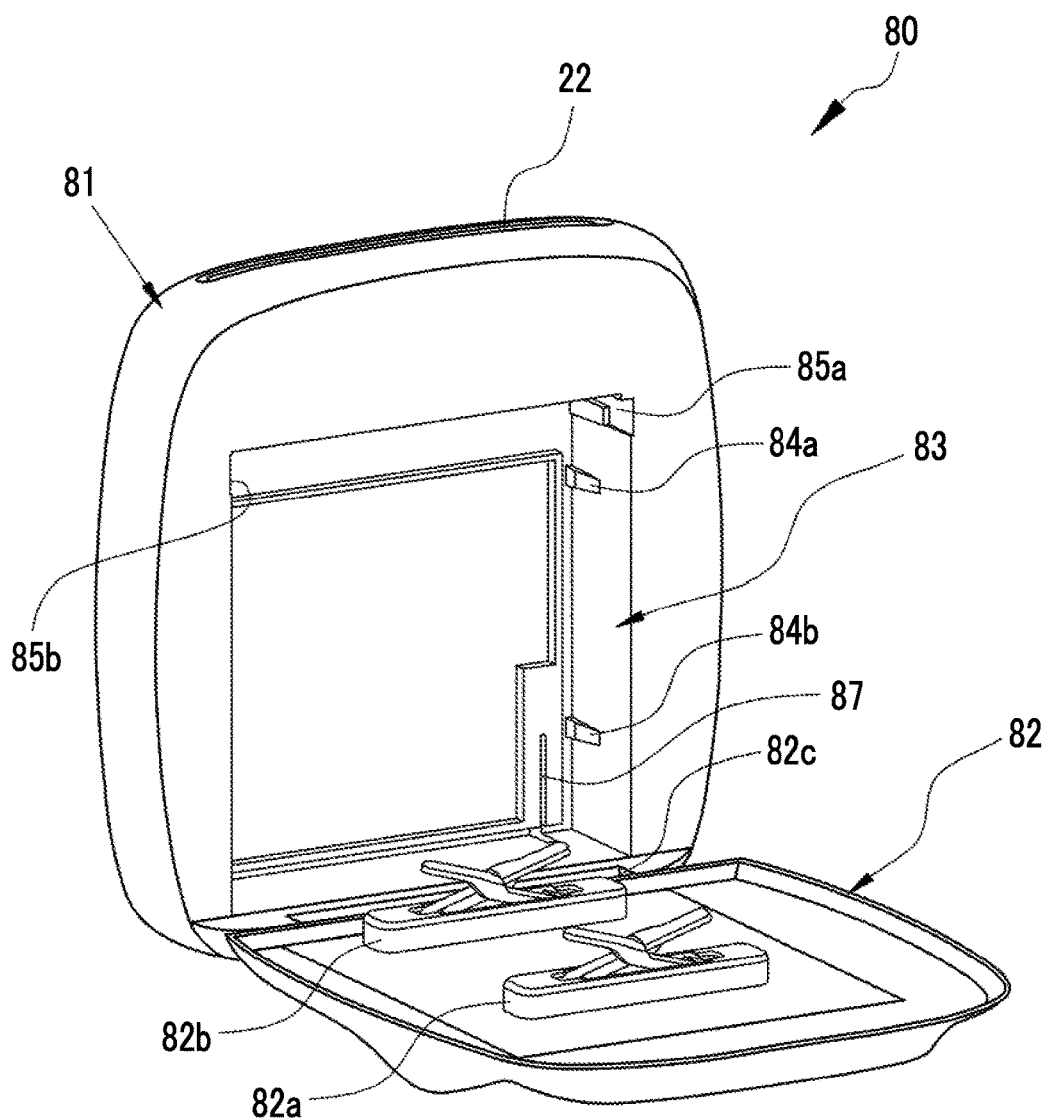
FIG. 25 is a perspective view of an external appearance of a digital camera with a printer according to a second embodiment when viewed from a rear surface, a plane, and a right side surface.
Figure 26:
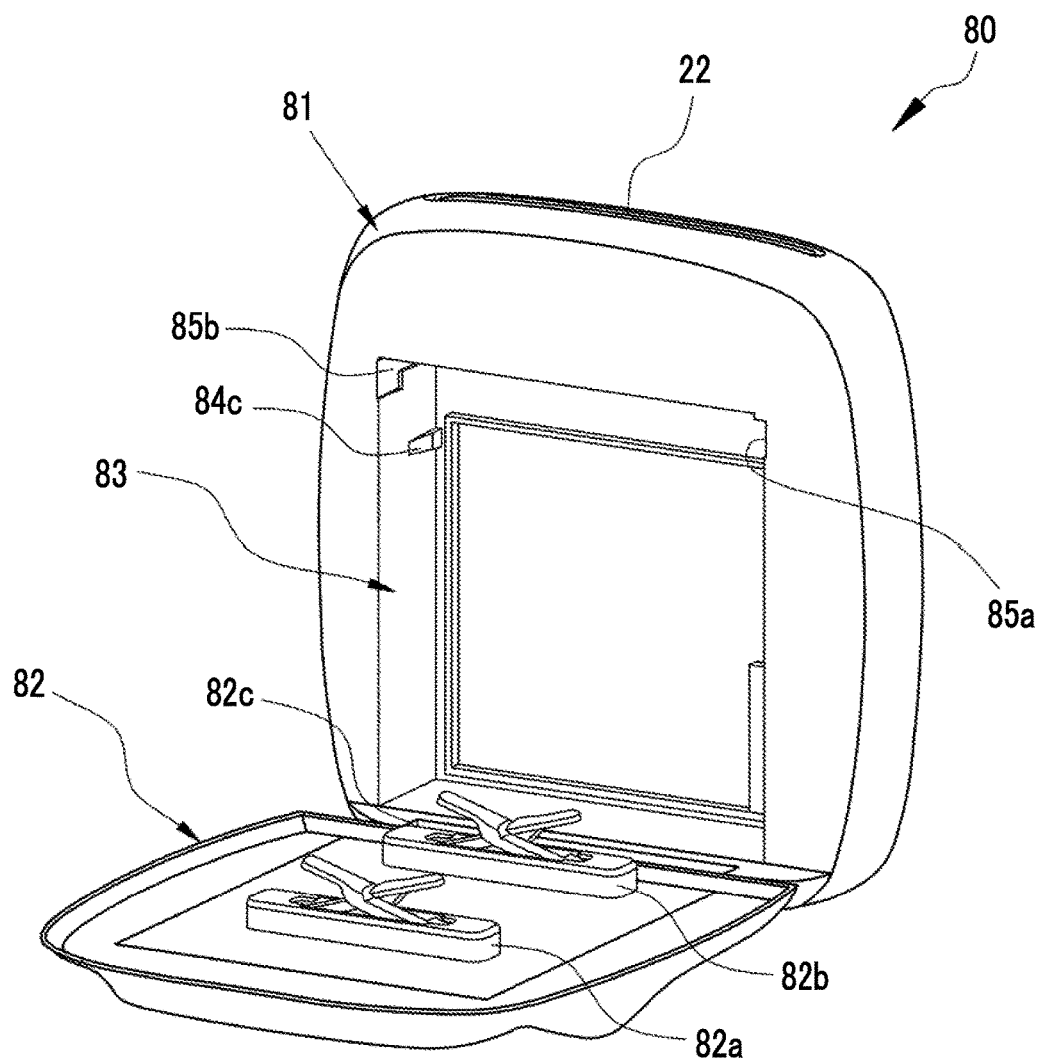
FIG. 26 is a perspective view of an external appearance of a digital camera with a printer according to a second embodiment when viewed from a rear surface, a plane, and a left side surface.
Figure 27:
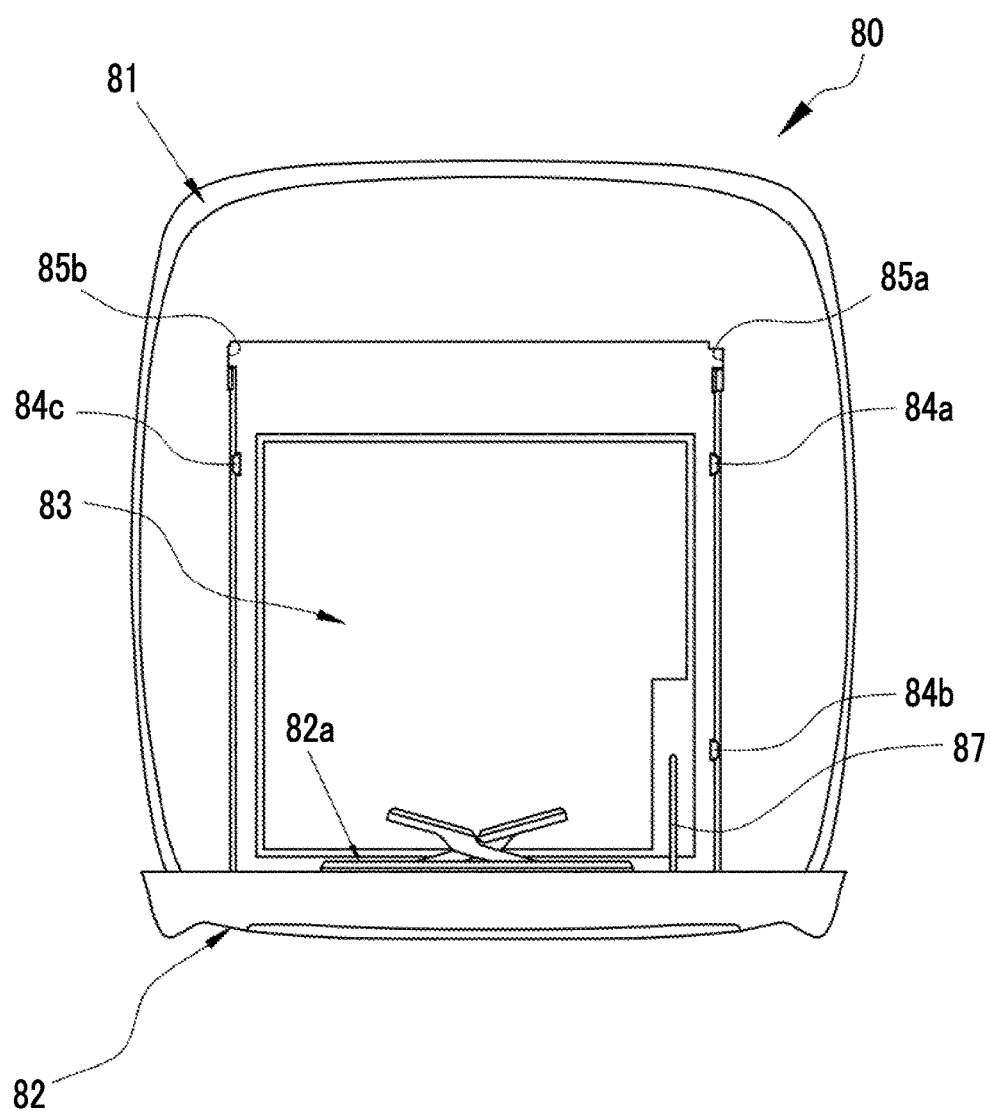
FIG. 27 is a rear view of the digital camera with a printer according to the second embodiment.
Figure 28:
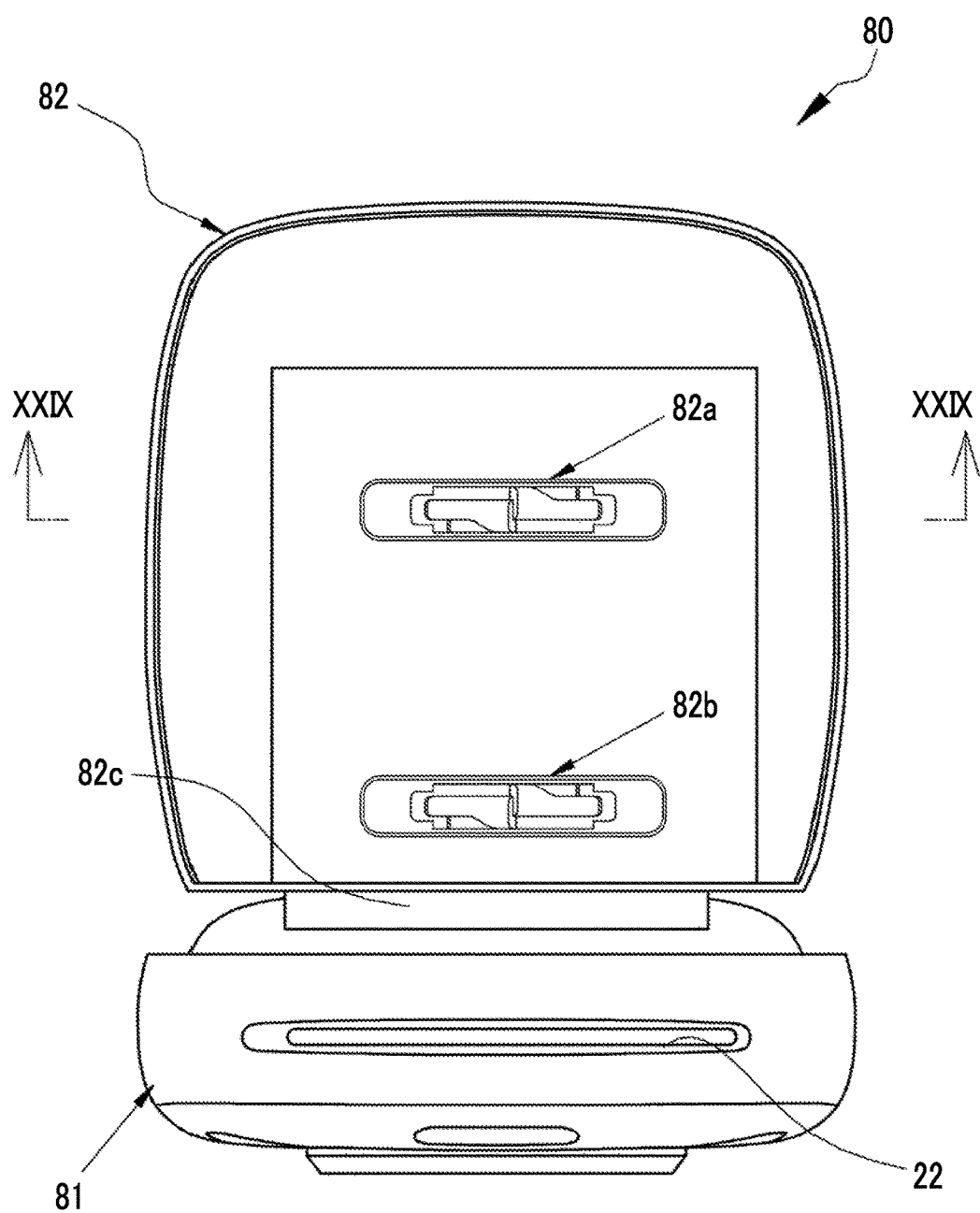
FIG. 28 is a plan view of the digital camera with a printer according to the second embodiment.

As shown in FIG. 24, a width W3 of the spreading control member 56 is less than the width W2 of the exposure surface 29*a*. Specifically, the width W3 of the spreading control member 56 is 70% to 95% of the width W2 of the exposure surface 29*a*. The width of the spreading control member 56 mentioned in this example is a width of the end surface 56*b* that controls the spreading of the developer by rubbing the positive image observation surface 40 of the film unit 29. The width W3 of the spreading control member 56 is less than the width W2 of the exposure surface 29*a*, and thus, the developer easily flows around the outside of the spreading control member 56 in the width direction of the exposure surface 29*a*. Accordingly, the developer is equally spread over the entire width of the exposure surface 29*a*. As described above, since the developer 38 is spread into the gap 39 of the film unit 29 by the spreading roller pair 54 and the distribution of the developer 38 is controlled in the transport direction by the spreading control member 56, the developer is equally spread to the four corners of the exposure surface 29a. Accordingly, it is possible to prevent the development unevenness of the film unit 29.

The ejection guide 58 includes a guide passage 68 that guides the distal end portion of the film unit 29 delivered from the spreading roller pair 54 towards the film ejection port 22. The ejection guide 58 is formed separately from the camera body 11, and is fixed to the camera body 11 through a support member (not shown). One guide surface of the guide passage 68 is a tilt surface 68a. A tilt angle β of the tilt surface 68a with respect to a proximal end surface 68b preferably ranges from 15° to 55°, and particularly preferably 25° to 45°. The tilt angle β is set in this range, and thus, both the side edge portions 30f of the film cover 30 are not stopped by an end surface 58a of the ejection guide 58 in a case where the distal end portion of the film cover 30 passes through the ejection guide 58. Accordingly, it is possible to eliminate the ejection error of the film cover 30. A development treatment is ended, and the film unit 29 delivered into the guide passage 68 by the spreading roller pair 54 is transported to the film ejection port 22 along the guide passage 68, and is ejected to the outside of the camera body 11.

As mentioned above, the distal end portion of the spreading control member 56 protrudes toward the film unit 29 from the pinching position in which the spreading roller pair 54 pinches the film unit 29. Thus, the film unit 29 is in contact with the spreading roller pair 54, the spreading control member 56, and the guide passage 68 of the ejection guide 58. Accordingly, the film unit 29 is curved in a gentle S shape. As a result, a sliding contact force of the film unit 29 and the spreading control member 56 increases, and the developer 38 is more effectively spread by the spreading control member 56.

In a case where the film cover 30 passes through the spreading roller pair 54, the spherical distortion of the film cover 30 is corrected through the pinching performed by the spreading roller pair 54. Since both the side edge portions 30f of the cover member 30a is further bent by the bending guide grooves 30g at the time of correction, the distal ends of both the side edge portions 30f are not stopped by the end surface 58a of the ejection guide 58, and the film cover 30 can be smoothly ejected.

Second Embodiment

In a second embodiment, film holding portions are formed in the loading cover, and position alignment protrusion portions and reversal loading prevention cut-off portions are formed at the film pack room. In the second embodiment, the exterior shape of the digital camera with a printer is the same as the front surface, the rear surface, the side surfaces, the planes, and the bottom surface of the digital camera with a printer according to the first embodiment, and the internal shapes of the loading cover and the film pack room are different from those of the digital camera with a printer according to the first embodiment. The same components as those used in the first embodiment will be assigned the same references, and thus, the description thereof will be omitted.

As shown in FIGS. 25 to 28, a digital camera 80 with a printer includes a camera body 81. Although not shown, the digital camera 80 with a printer includes the imaging unit 12 and the printer unit 13 which are the same as those of the digital camera 10 with a printer according to the first embodiment.

A loading cover 82 is attached to a rear surface of the camera body 81 through a hinge portion 82c. The hinge portion 82c supports the loading cover 82 such that the loading cover is capable of moving rotationally between an opened position and a closed position. The loading cover 82 opens a film pack room 83 within the camera body 81 in the opened position. The loading cover 82 covers the film pack room 83 in the closed position. The same instant film pack 26 as that of the first embodiment is loaded into the film pack room 83.

Position alignment protrusion portions 84a to 84c are formed on both side surfaces of the film pack room 83. The position alignment protrusion portions 84a to 84c are formed in wedge shapes of which a thickness gradually increases along a loading direction of the instant film pack 26, and prevent the instant film pack 26 from being loaded in a reverse direction.

The reversal loading prevention cut-off portions 85a and 85b are formed on both side surfaces of the film pack room 83. Each of the reversal loading prevention cut-off portions 85a and 85b are formed in L shapes. The reversal loading prevention cut-off portions 85a and 85b engage with protrusion portions 26a (see FIG. 5) formed on both side surfaces of the instant film pack 26, and thus, the reversal loading prevention cut-off portions together with the position alignment protrusion portions 84a to 84c prevent the instant film pack 26 from being loaded in the reverse direction.

A cut-off portion 87 is formed in the film pack room 83 in a position facing the cut-off portion 31b of the instant film pack 26. The cut-off portion 87 is continuously formed up to a bottom surface of the film pack room 83. The claw member 57 formed in the camera body 81 passes through the cut-off portion 87 and enters the inside of the instant film pack 26, and the film units 29 are discharged to the outside of the instant film pack 26 one by one.

A pair of film holding portions 82a and 82b is formed on the inner surface of the loading cover 82. Similarly to the press members 24a and 24b according to the first embodiment, in a case where the instant film pack 26 is loaded into the film pack room 83 and the loading cover 82 is positioned in the closed position, the film holding portions 82a and 82b pass through the openings 32a, are inserted into the instant film pack 26, and press the film unit press plate 28. Accordingly, the film unit 29 within the instant film pack 26 is pressed in a laminated direction.

Figure 29:
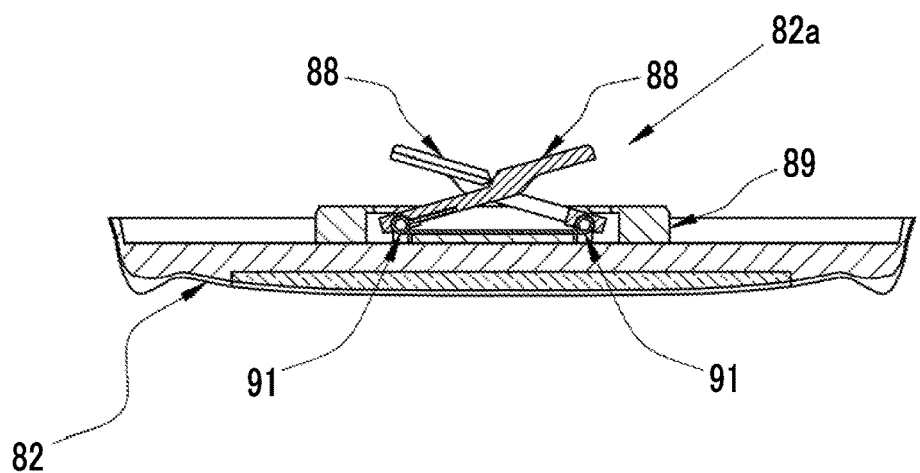
FIG. 29 is a sectional view taken along line XXIX-XXIX of FIG. 28.

As shown in FIG. 29, the film holding portion 82a includes a pair of press members 88, a holding frame 89, and springs 91. The holding frame 89 holds the press members 88, and is fixed to an inner wall surface of the loading cover 82. The film holding portion 82b has the same configuration as that of the film holding portion 82a.

Figure 30:
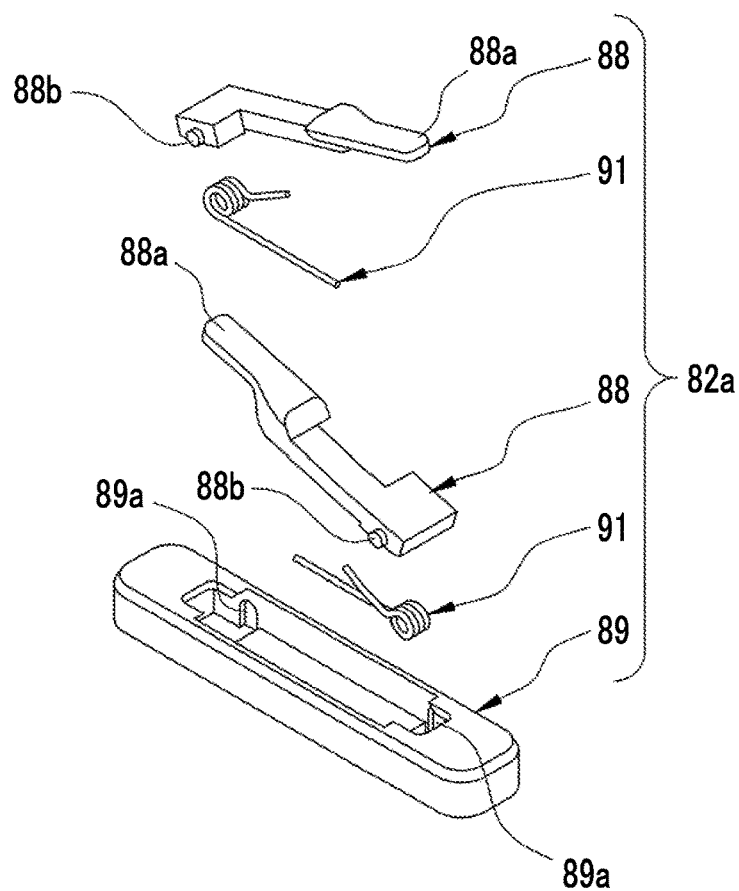
FIG. 30 is an exploded perspective view of film holding portions.
Figure 31:
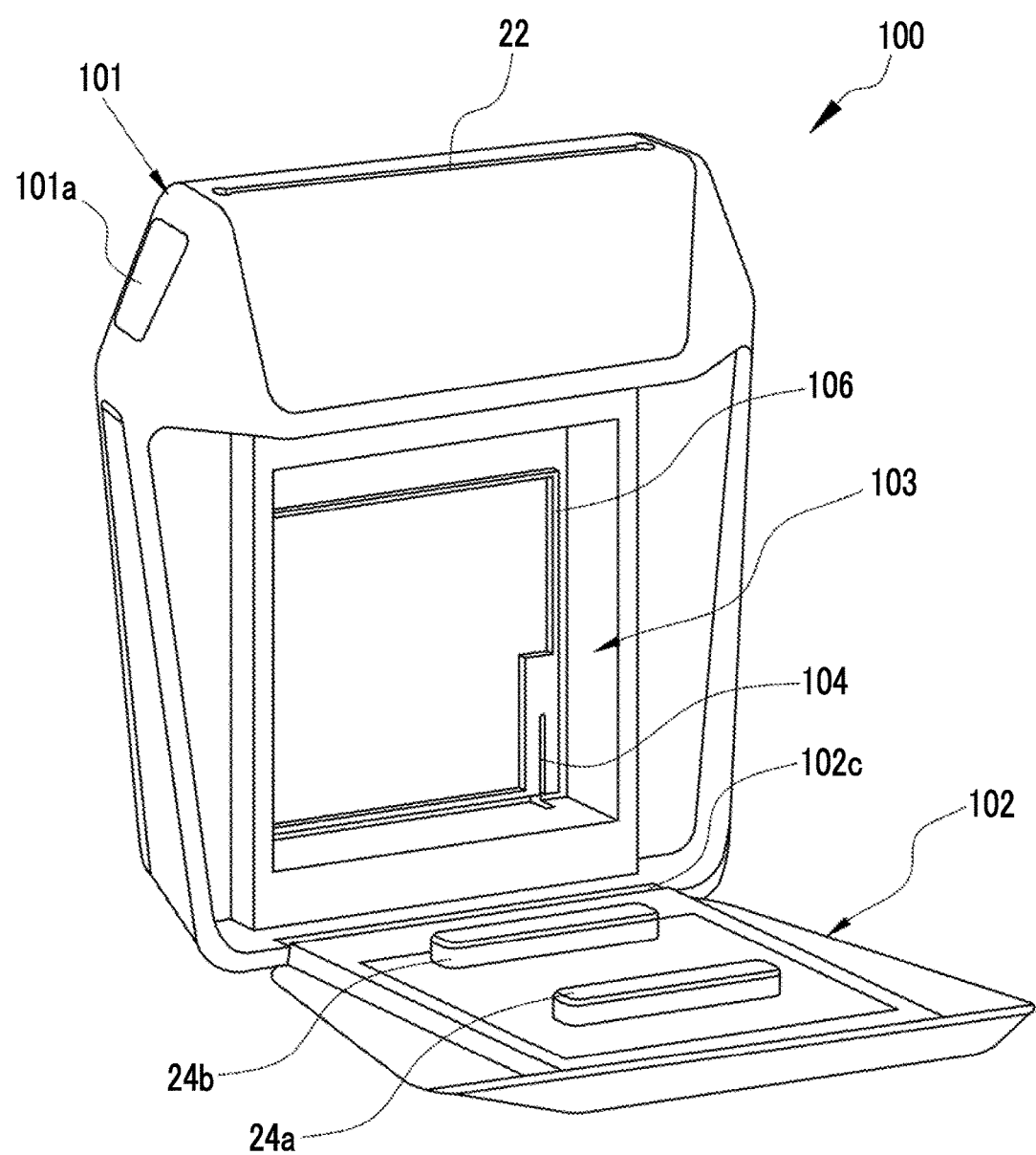
FIG. 31 is a perspective view of an external appearance of a printer according to a third embodiment when viewed from a rear surface, a plane, and a right side surface.
Figure 32:
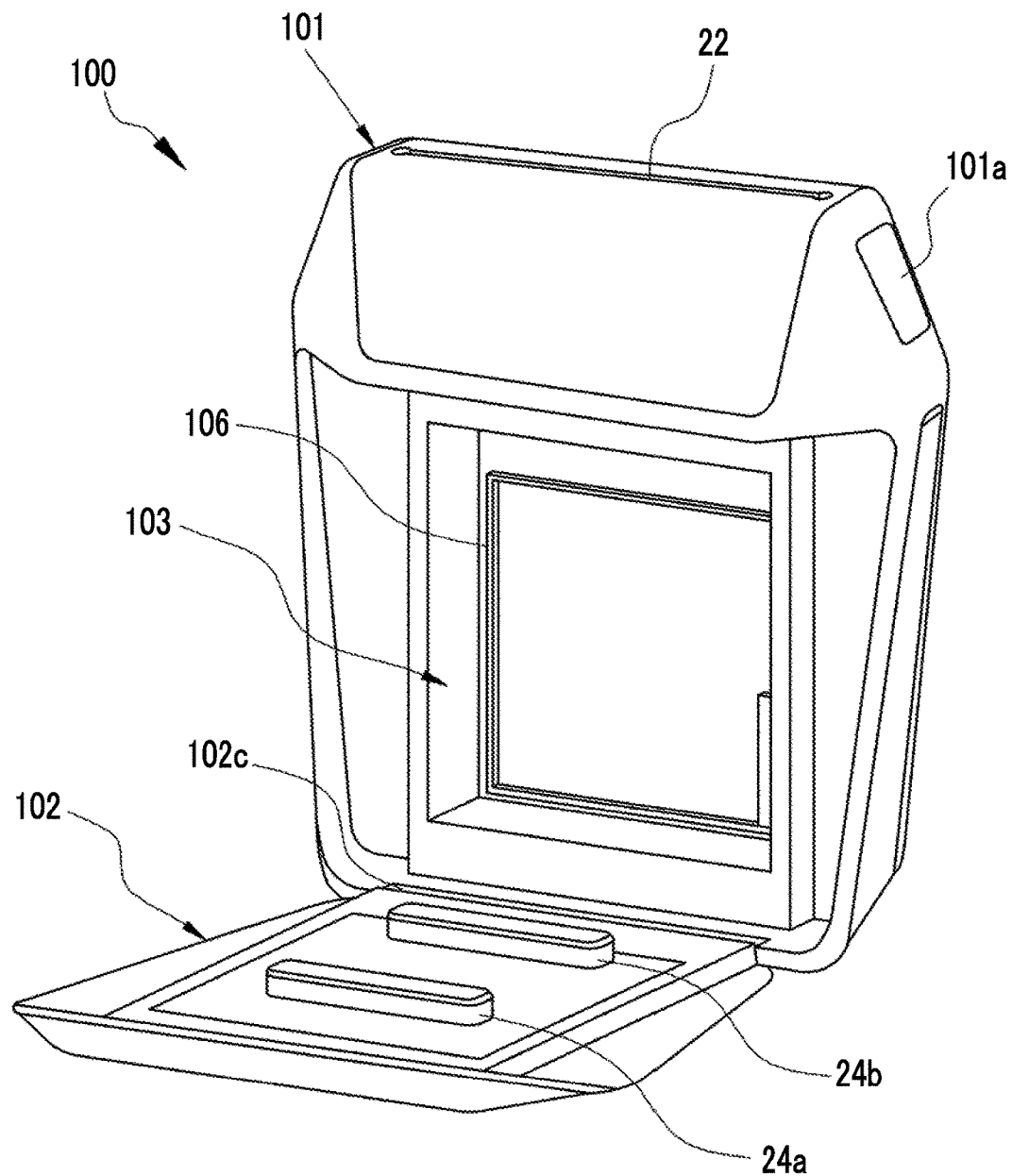
FIG. 32 is a perspective view of the external appearance of the printer according to the third embodiment when viewed from a rear surface, a plane, and a left side surface.
Figure 33:
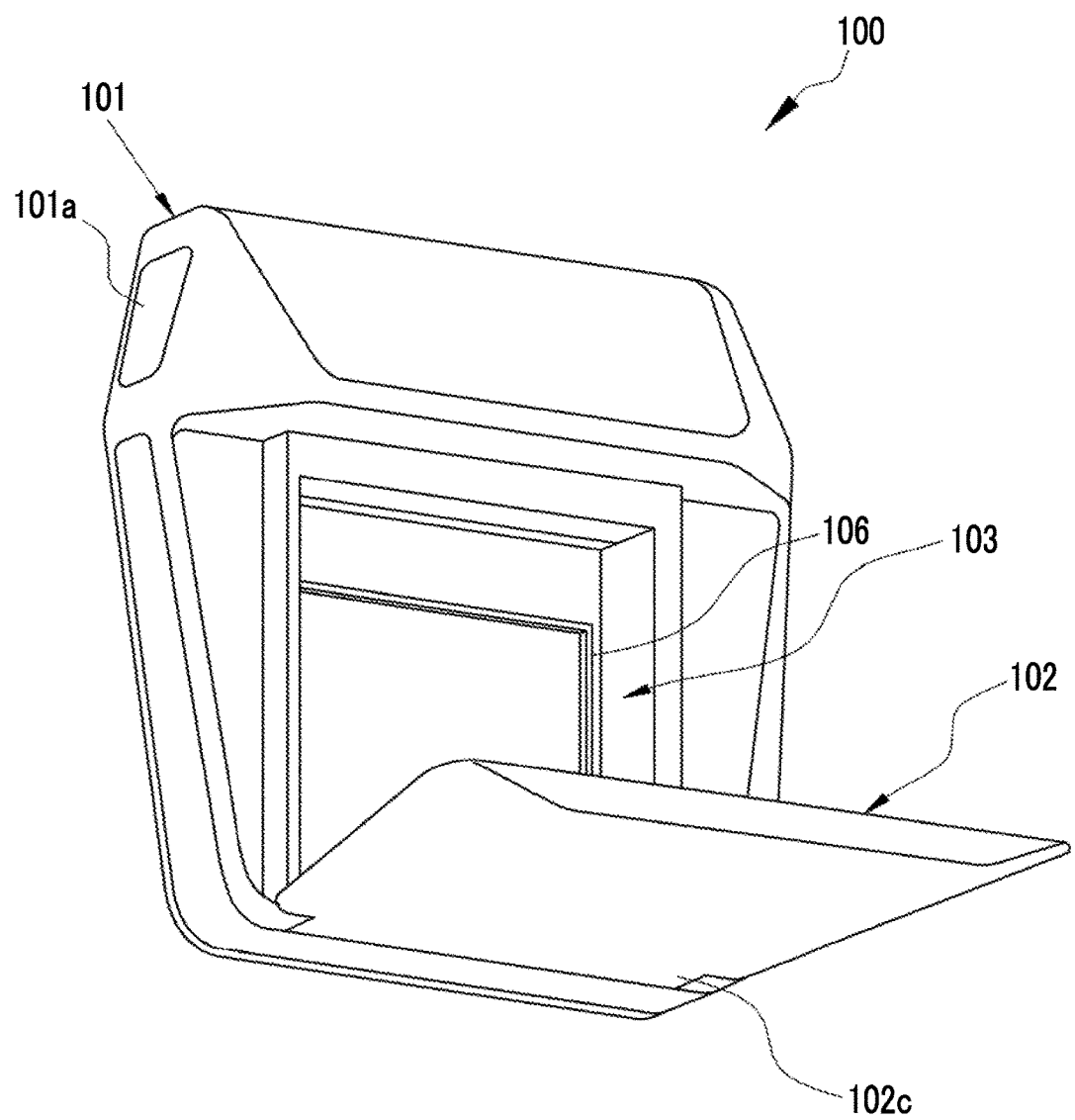
FIG. 33 is a perspective view of the external appearance of the printer according to the third embodiment when viewed from a rear surface, a bottom surface, and a right side surface.
Figure 34:
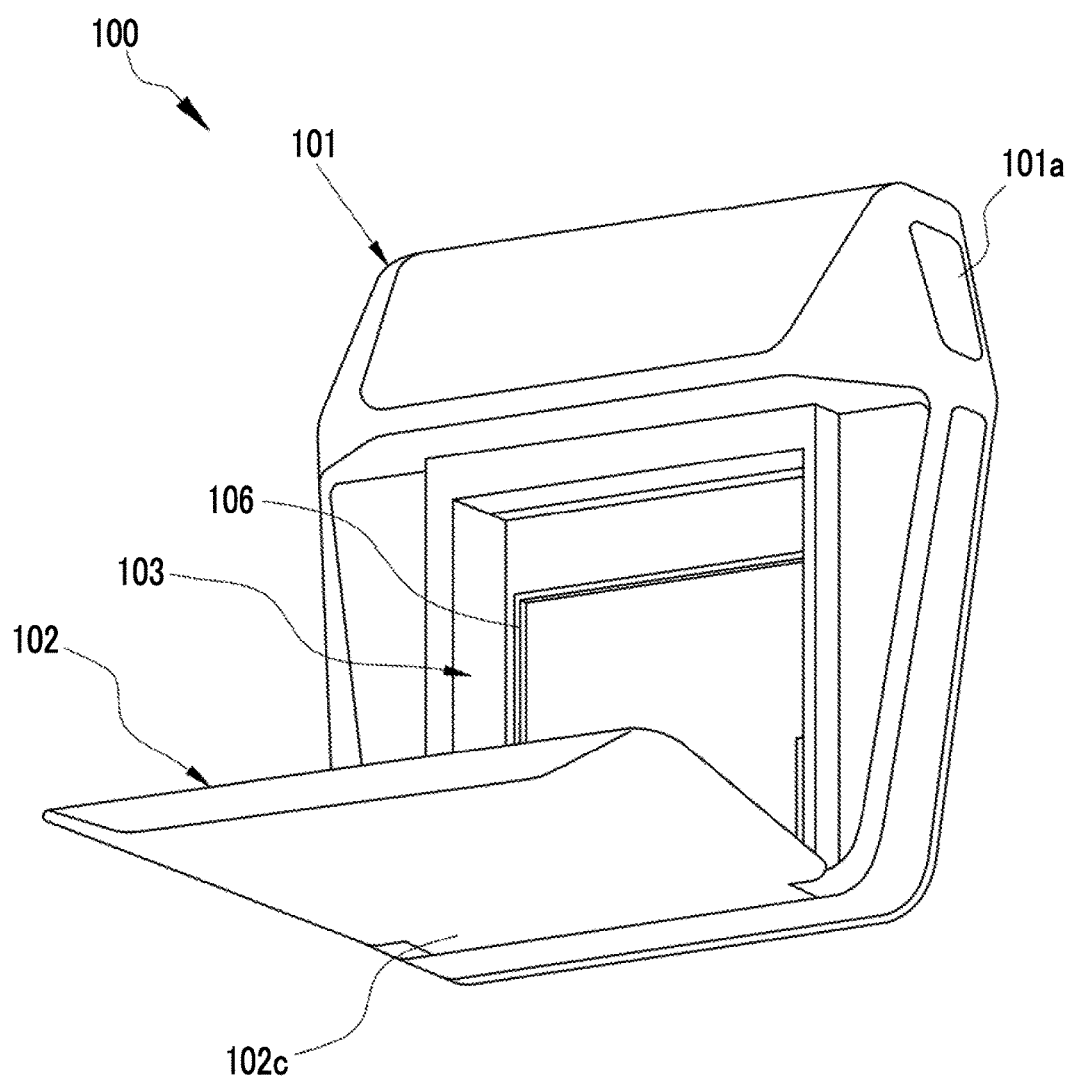
FIG. 34 is a perspective view of the external appearance of the printer according to the third embodiment when viewed from a rear surface, a bottom surface, and a left side surface.
Figure 35:
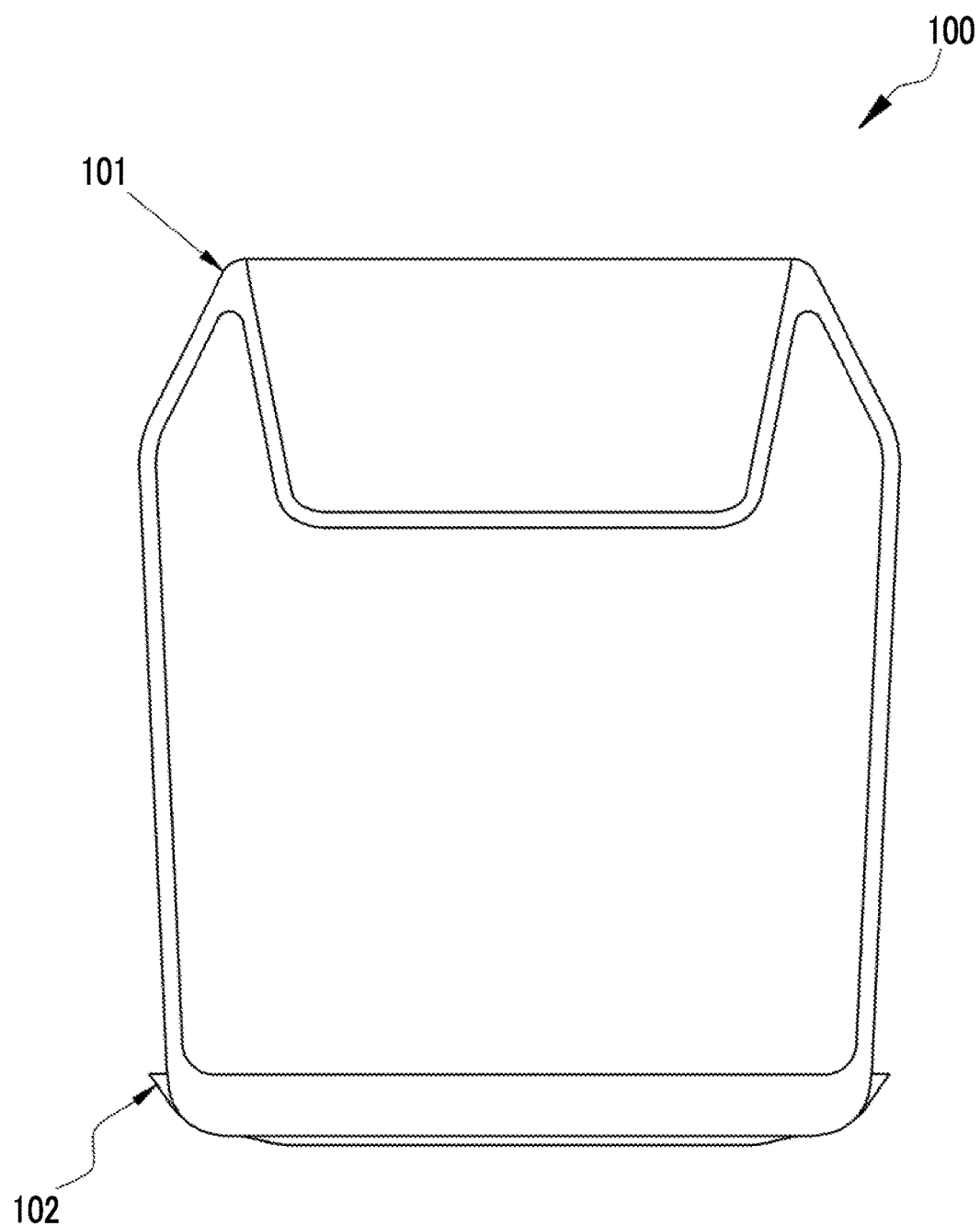
FIG. 35 is a front view of the printer according to the third embodiment.
Figure 36:
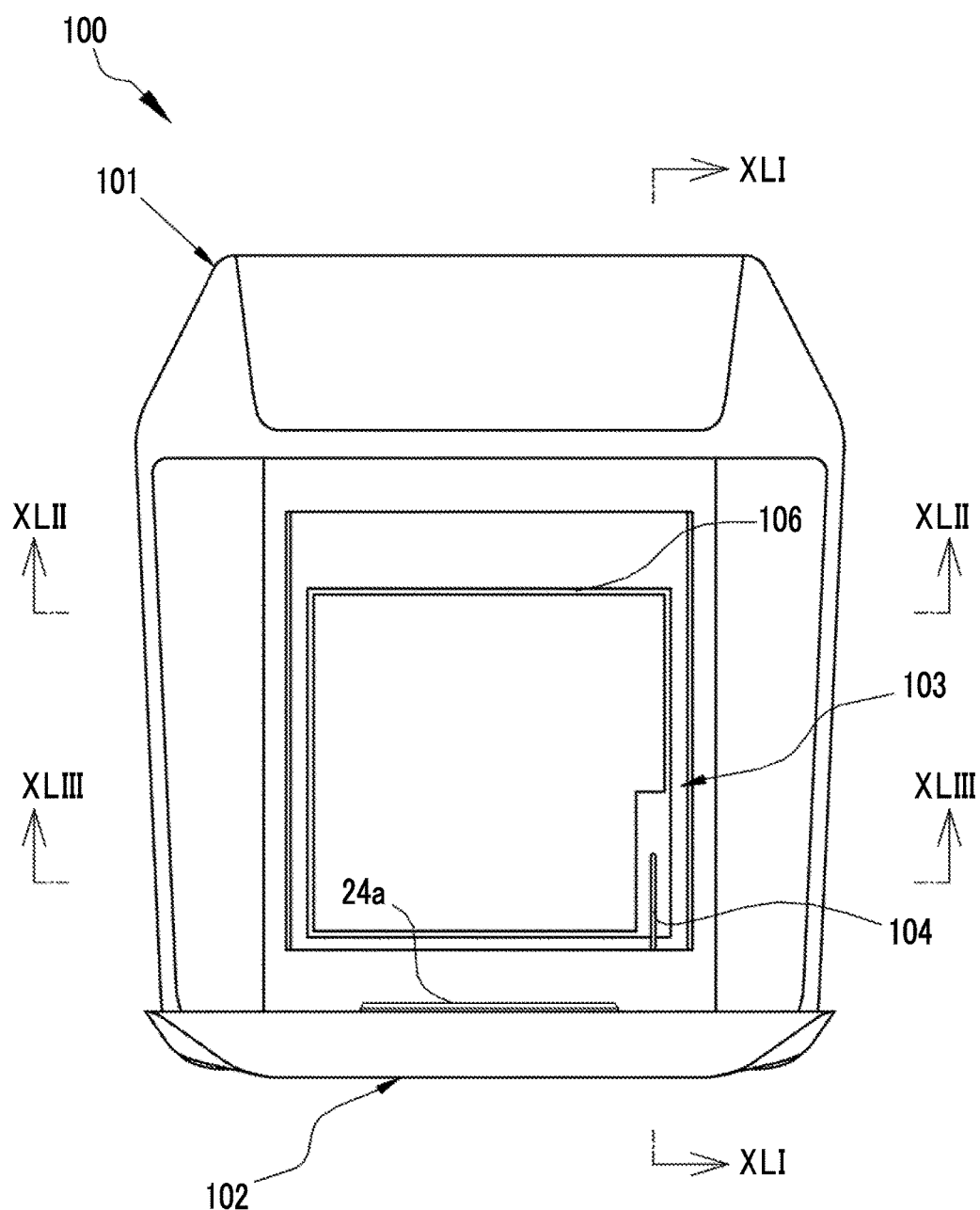
FIG. 36 is a rear view of the printer according to the third embodiment.
Figure 37:
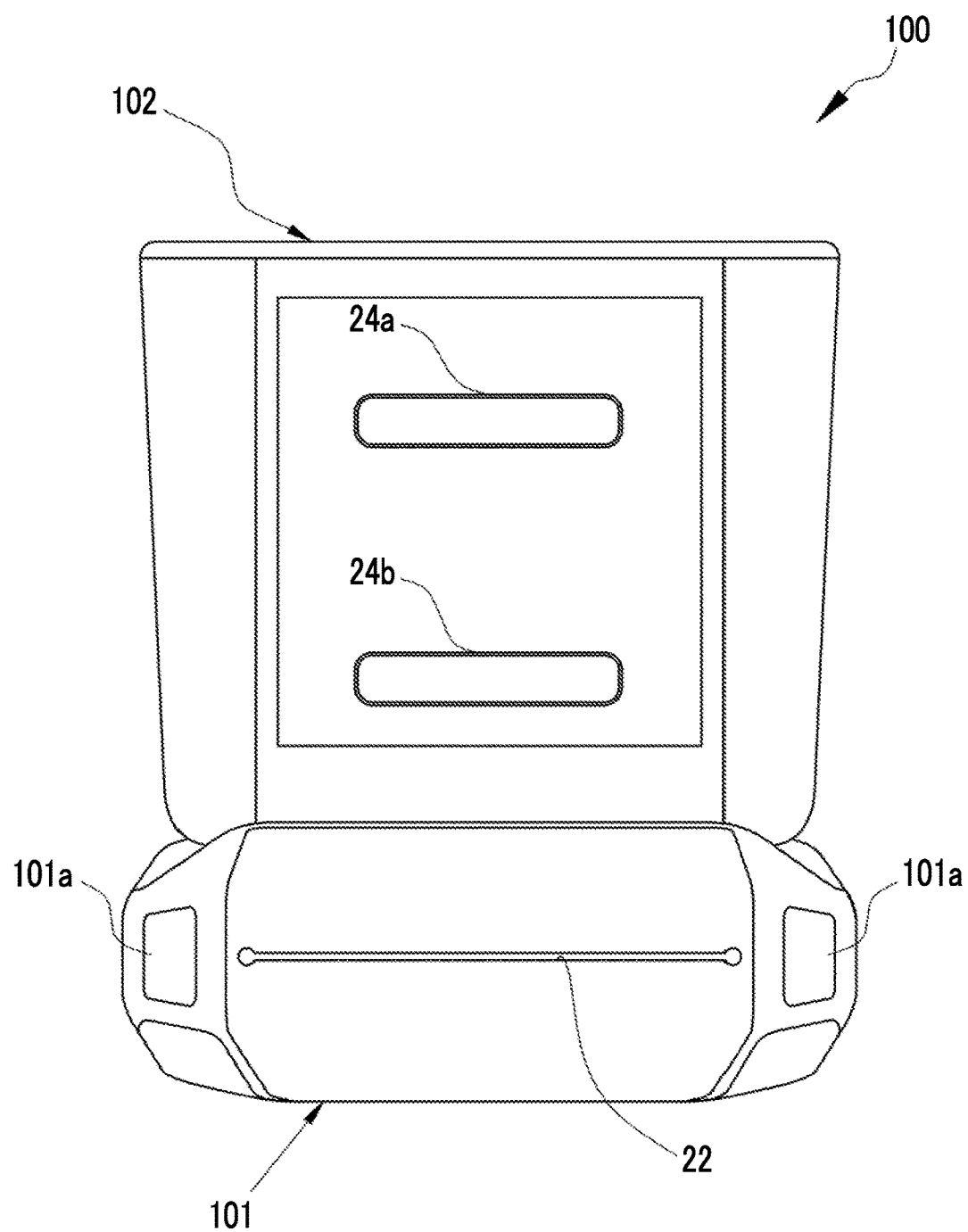
FIG. 37 is a plan view of the printer according to the third embodiment.
Figure 38:
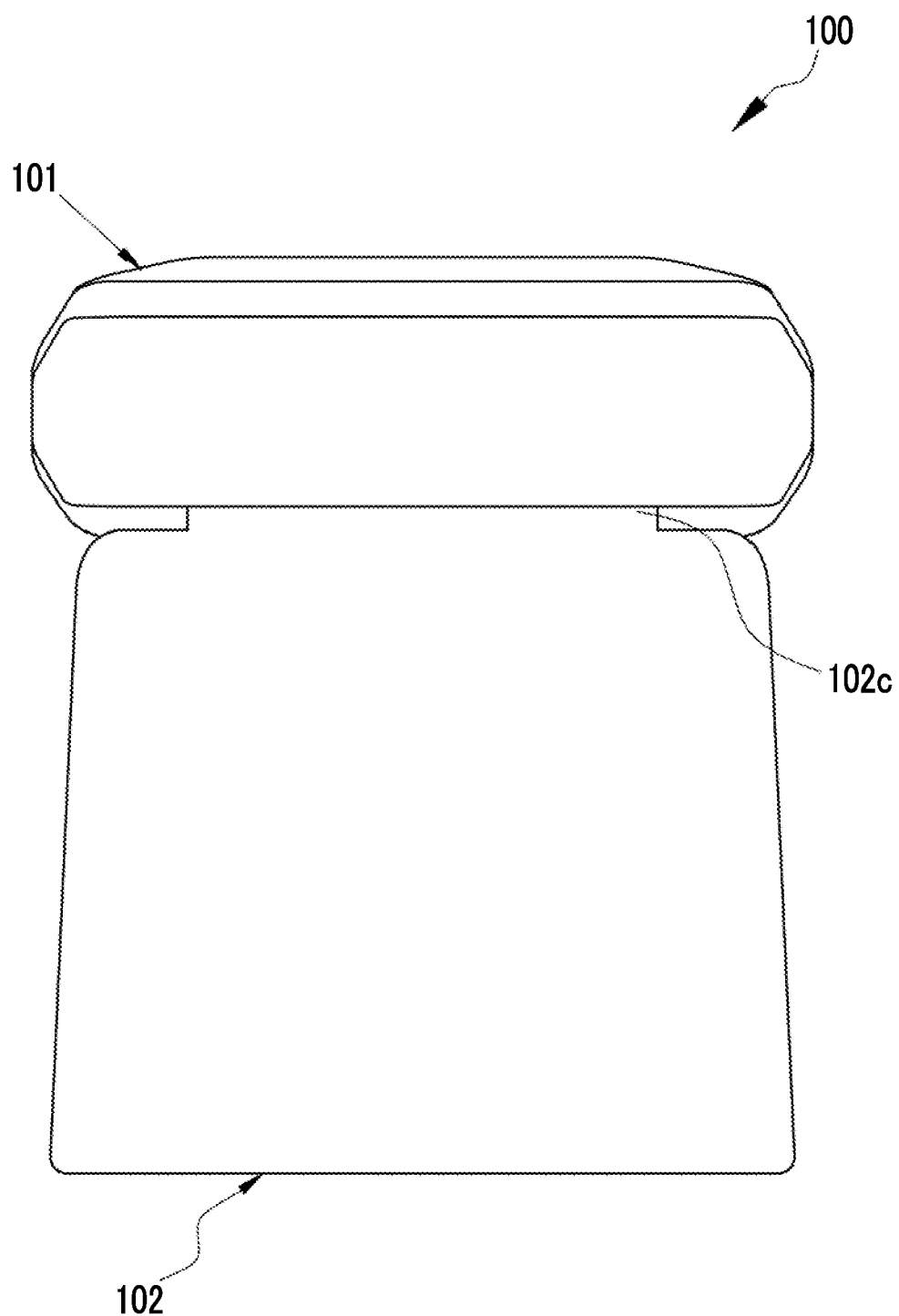
FIG. 38 is a bottom view of the printer according to the third embodiment.
Figure 39:
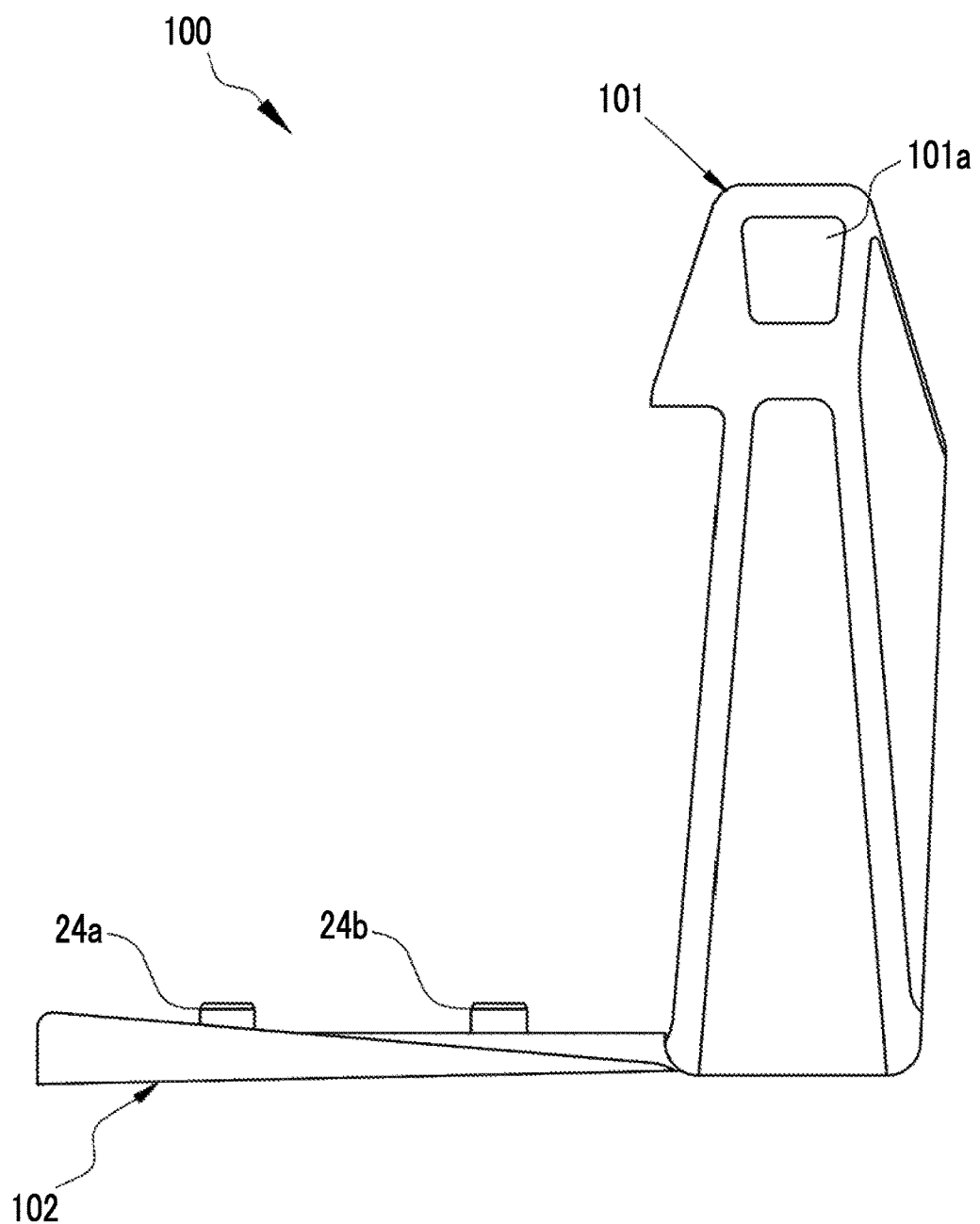
FIG. 39 is a left side view of the printer according to the third embodiment.
Figure 40:
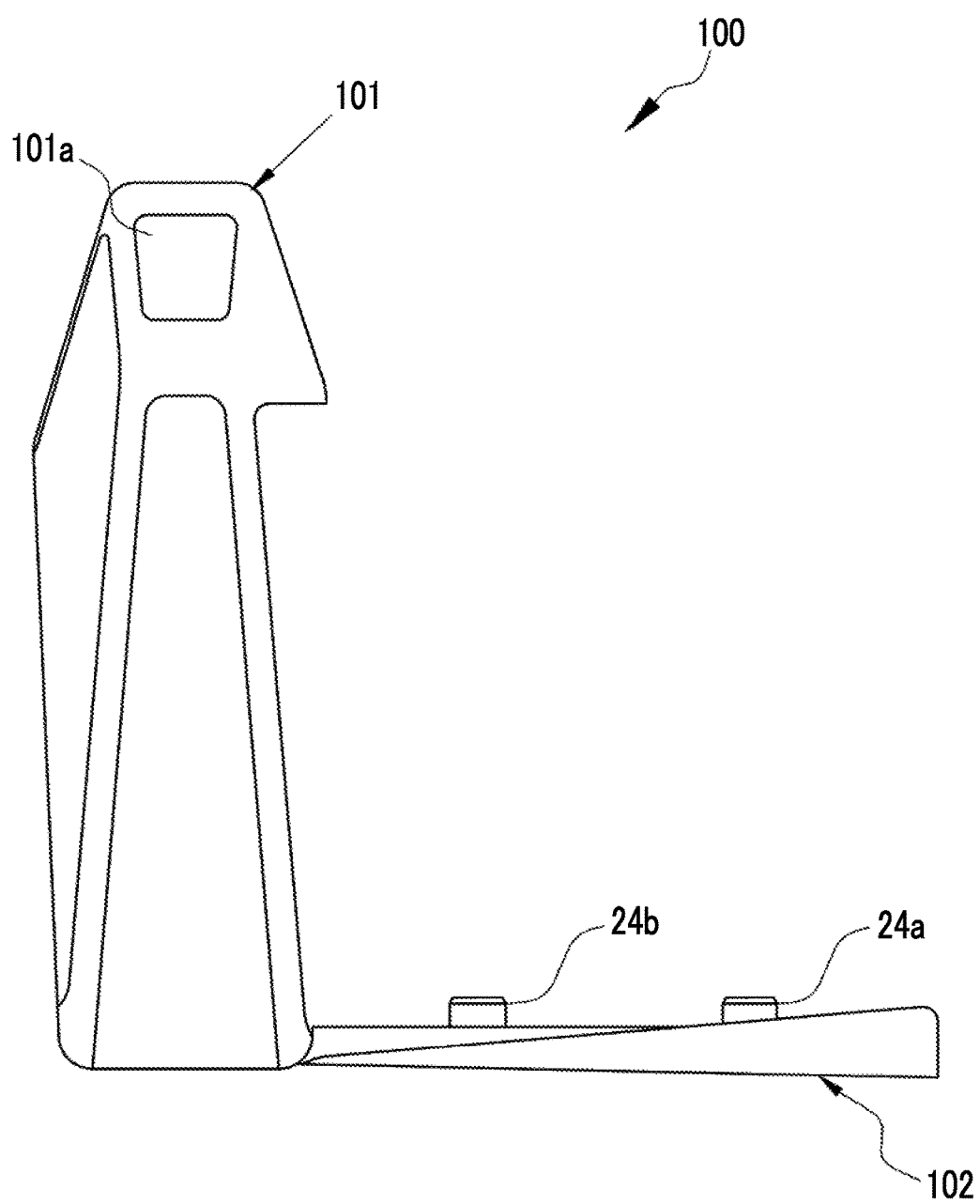
FIG. 40 is a right side view of the printer according to the third embodiment.

As shown in FIG. 30, a press surface 88a is formed at one end portion of the press member 88. The press surface 88a is formed in a smooth curved surface shape. A rotational shaft 88b is formed at the other end portion of the press member 88. An engagement hole 89a is formed in the holding frame 89. The rotational shaft 88b engages with the engagement hole 89a so as to move rotationally.

The pair of press members 88 faces each other such that the positions of the press surface 88a and the rotational shaft 88b are opposite to each other, and are held by the holding frame 89. For example, the holding frame 89 is fixed to the loading cover 82 through screwing.

The springs 91 are torsion coil springs, and are attached between the press members 88 and the holding frame 89. The springs 91 bias the press members 88 such that the press surfaces 88a move rotationally around the rotational shafts 88b upwards in the diagram. Accordingly, the press surfaces 88a press the film unit press plate 28.

Third Embodiment

A third embodiment is acquired by applying the present invention to a printer. Similarly to the first and second embodiments, a printer according to the third embodiment and the subsequent embodiments is a printer in which the instant film pack 26 is loaded into the film pack room, the image data items are received from an electronic device such as a smartphone through wireless communication, and an image is printed on the film unit 29 based on the received image data items. The same components as those used in the embodiments will be assigned the same references, and thus, the description thereof will be omitted.

As shown in FIGS. 31 to 40, a printer 100 includes the same printer unit 13 as that of the first embodiment, and is provided at a main body 101. A loading cover 102 is attached to a rear surface of the main body 101 through a hinge portion 102c. The hinge portion 102c supports the loading cover 102 such that the loading cover is capable of moving rotationally between an opened position and a closed position. The loading cover 102 opens a film pack room 103 within the main body 101 in the opened position. The loading cover 102 covers the film pack room 103 in the closed position. The same instant film pack 26 as that of the first embodiment is loaded into the film pack room 103. An operation button 101a is provided at the main body 101. For example, the operation button 101a is a print switch for instructing that a printing process using the printer unit 13 is to be performed.

Figure 41:
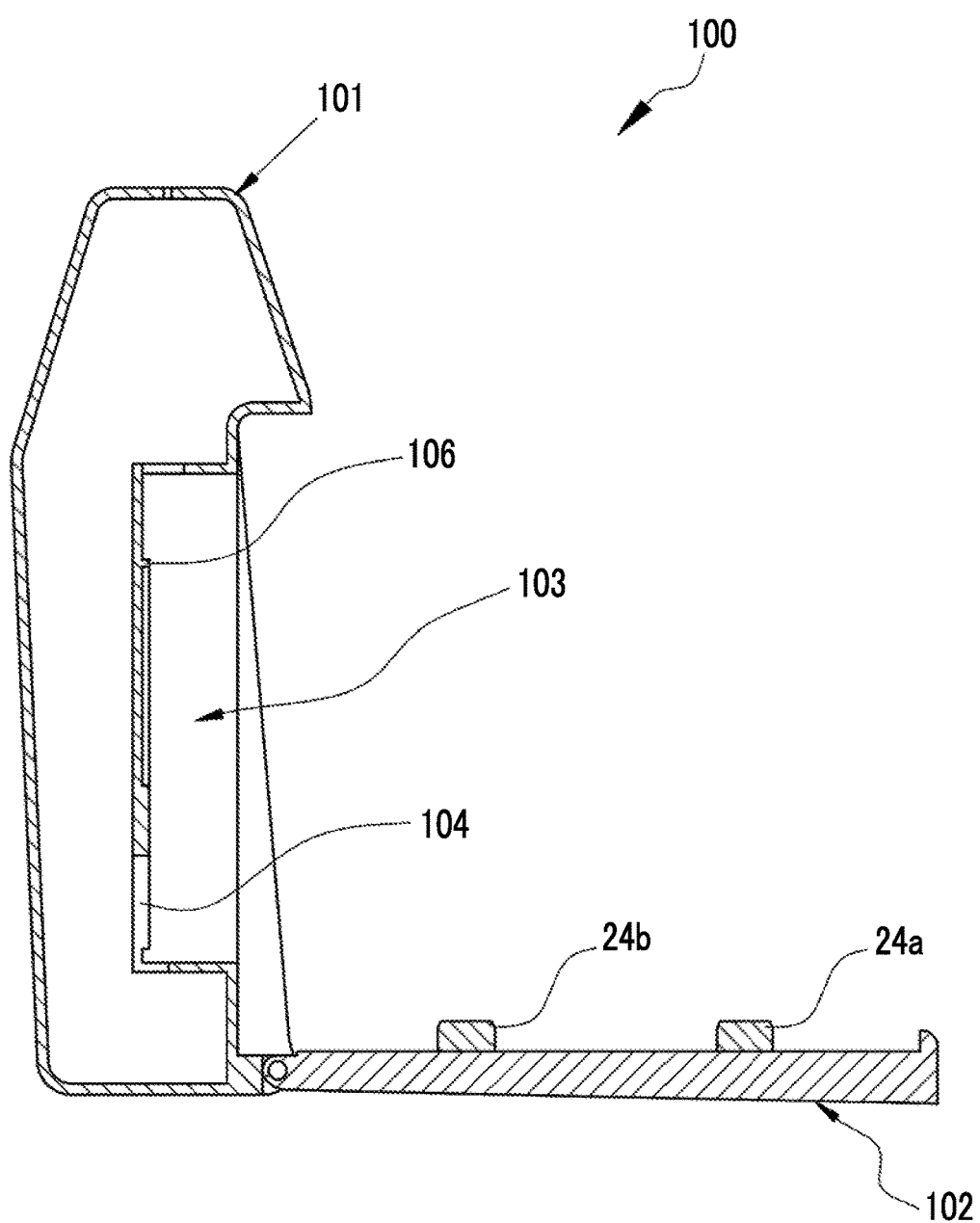
FIG. 41 is a sectional view taken along line XLI-XLI of FIG. 36.
Figure 42:
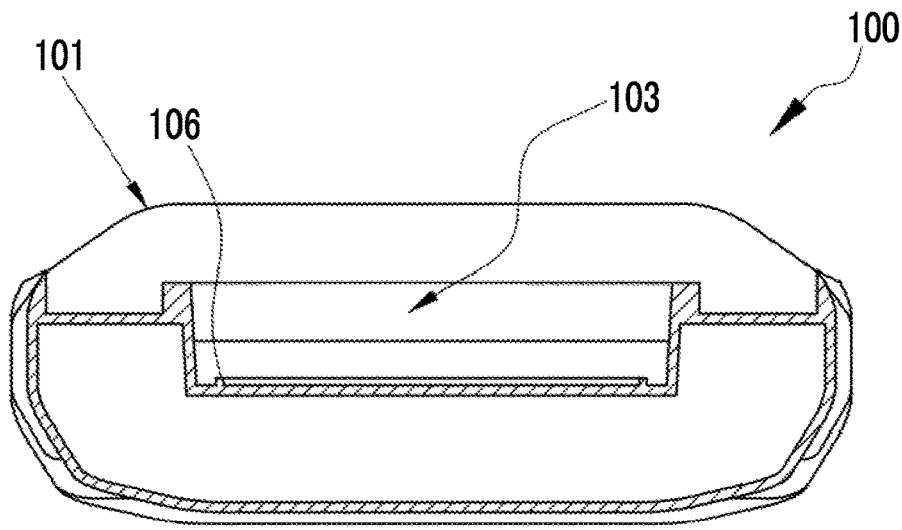
FIG. 42 is a sectional view taken along line XLII-XLII of FIG. 36.
Figure 43:
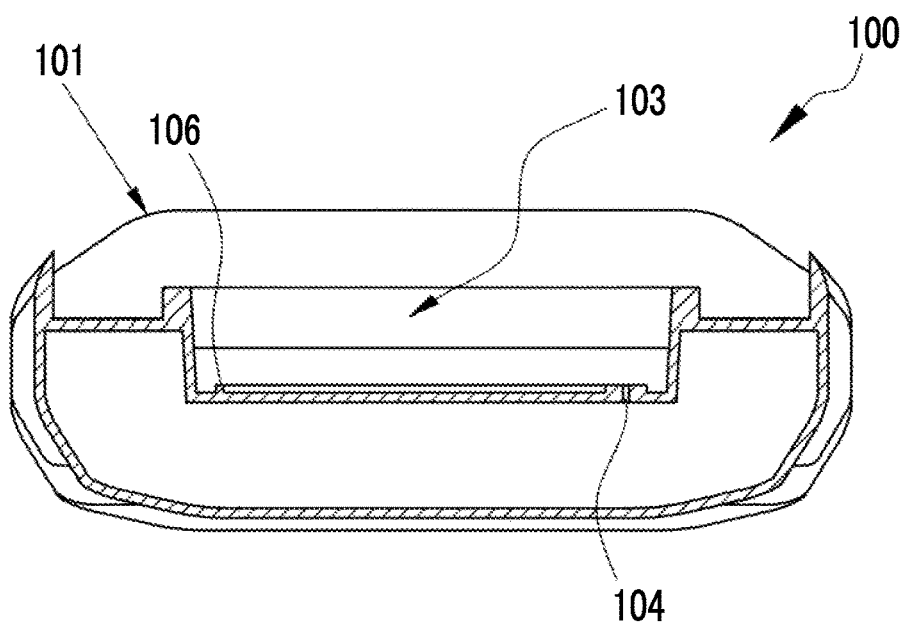
FIG. 43 is a sectional view taken along line XLIII-XLIII of FIG. 36.

As shown in FIGS. 41 to 43, the film pack room 103 includes a cut-off portion 104 and a rectangular frame 106. The cut-off portion 104 is formed in a position facing the cut-off portion 31b of the instant film pack 26, and is continuous with a bottom surface of the film pack room 103. The claw member 57 formed in the main body 101 passes through the cut-off portion 104 and enters the inside of the instant film pack 26, and the film units 29 are discharged to the outside of the instant film pack 26 one by one. The rectangular frame 106 is formed in a position facing the exposure opening 31a of the instant film pack 26.

Fourth Embodiment

In a fourth embodiment, position alignment protrusion portions are formed at the film pack room. In the fourth embodiment, the exterior shape of the printer is the same as the front surface, the side surfaces, the plane, and the bottom surface of the printer according to the third embodiment, and the shape of the rear surface including the inside of the film pack room is different from that of the printer according to the third embodiment. The same components as those used in the embodiments will be assigned the same references, and thus, the description thereof will be omitted.

Figure 44:
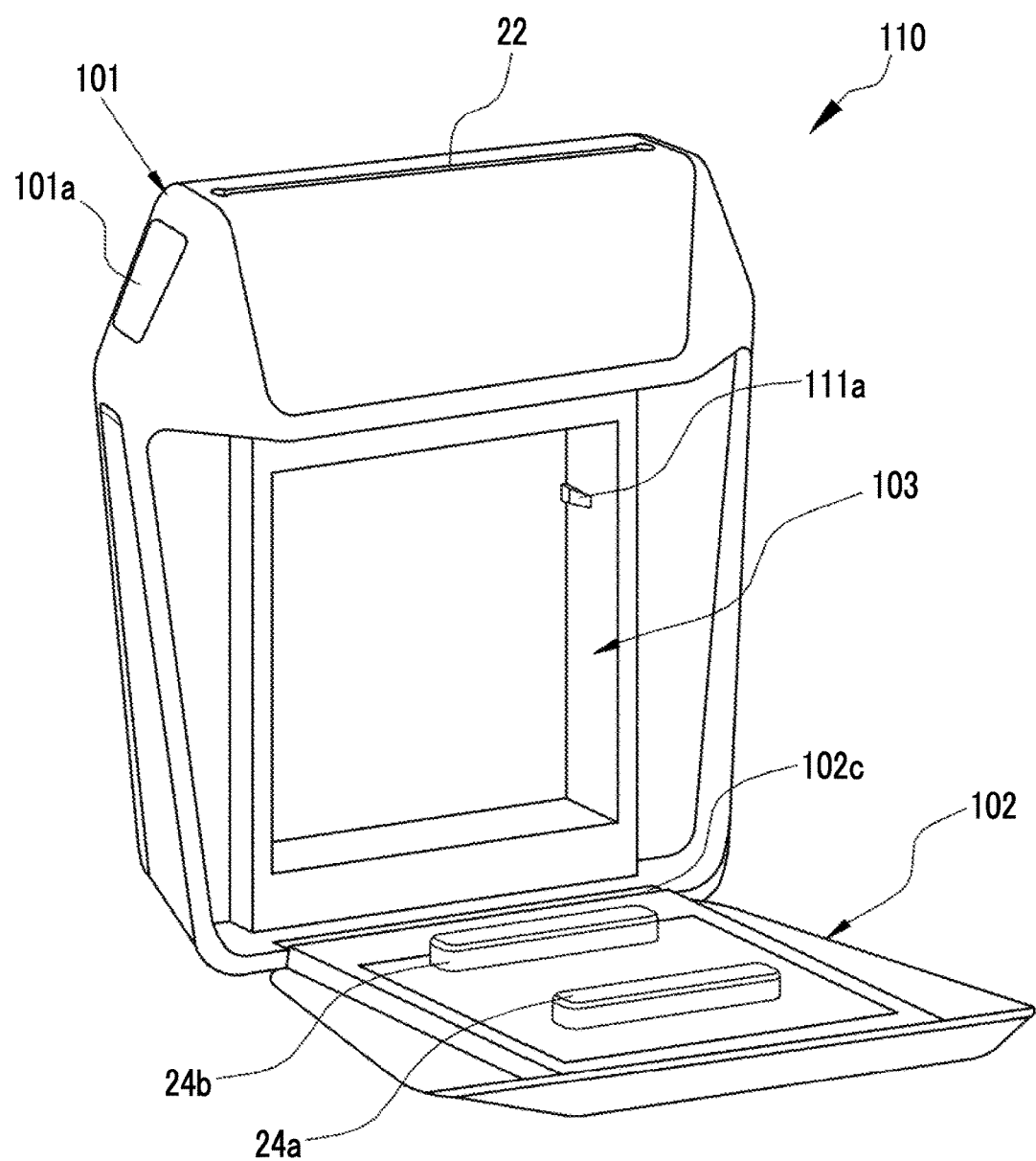
FIG. 44 is a perspective view of an external appearance of a printer according to a fourth embodiment when viewed from a rear surface, a plane, and a right side surface.
Figure 45:
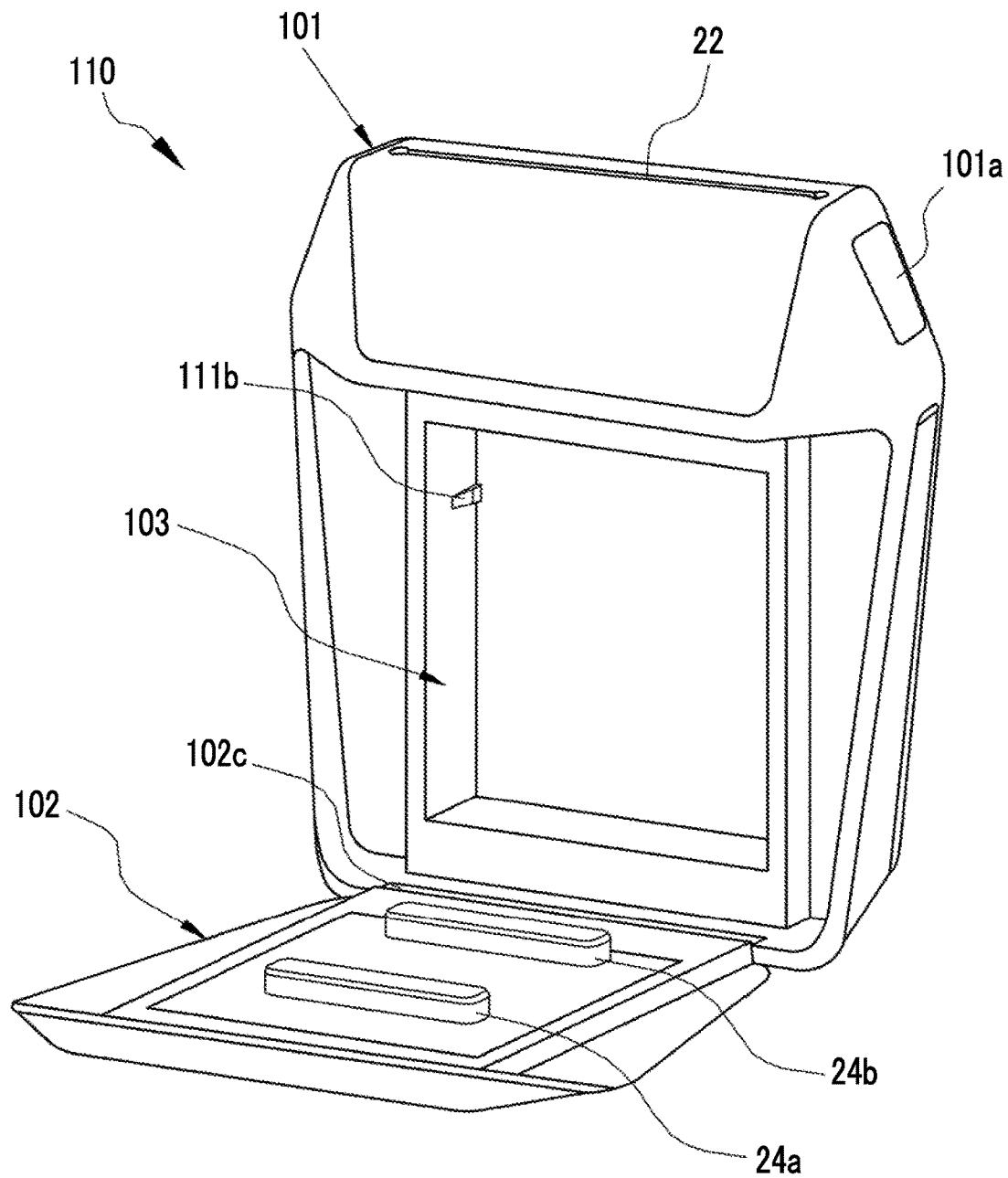
FIG. 45 is a perspective view of the external appearance of the printer according to the fourth embodiment when viewed from a rear surface, a plane, and a left side surface.
Figure 46:
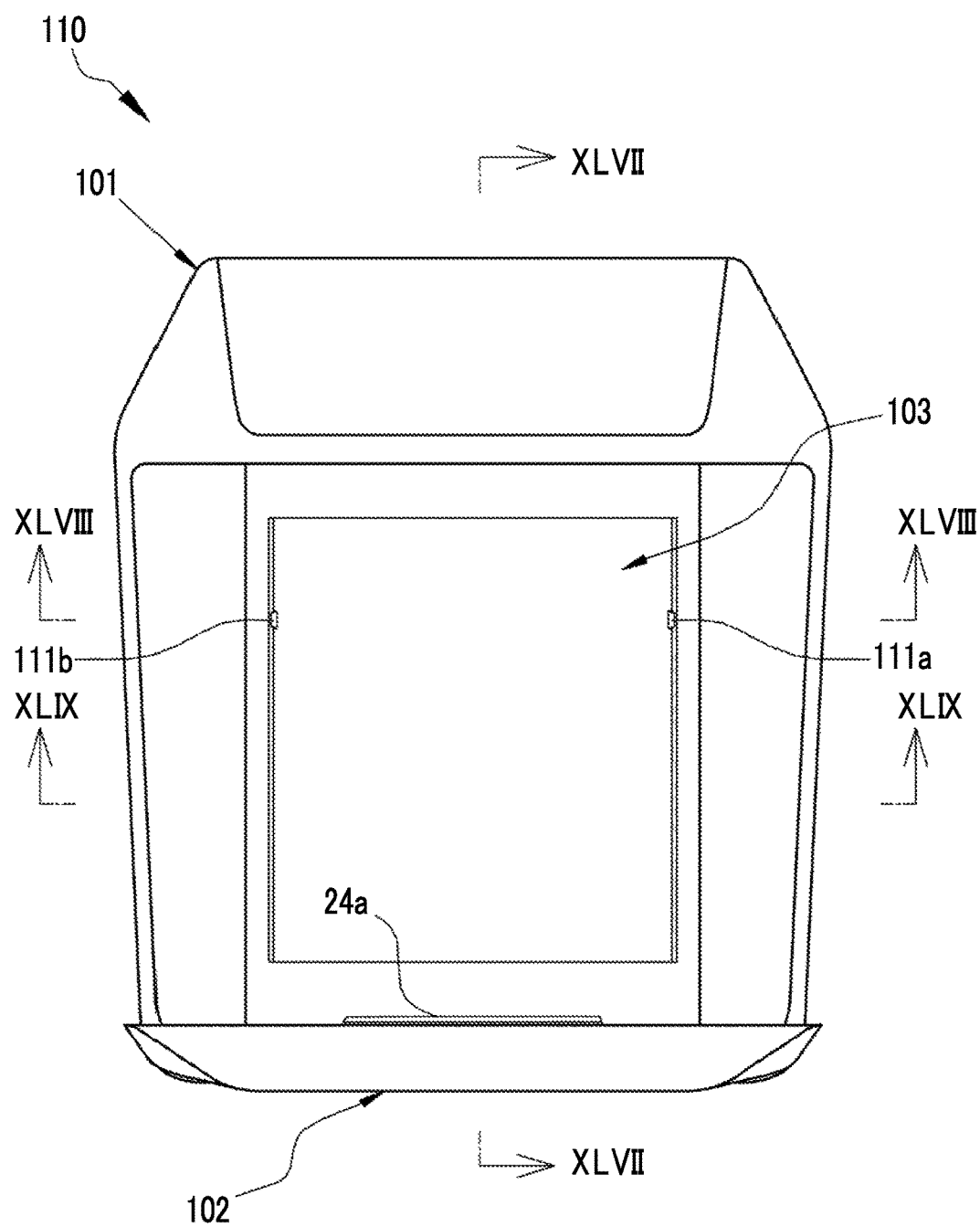
FIG. 46 is a rear view of the printer according to the fourth embodiment.
Figure 47:
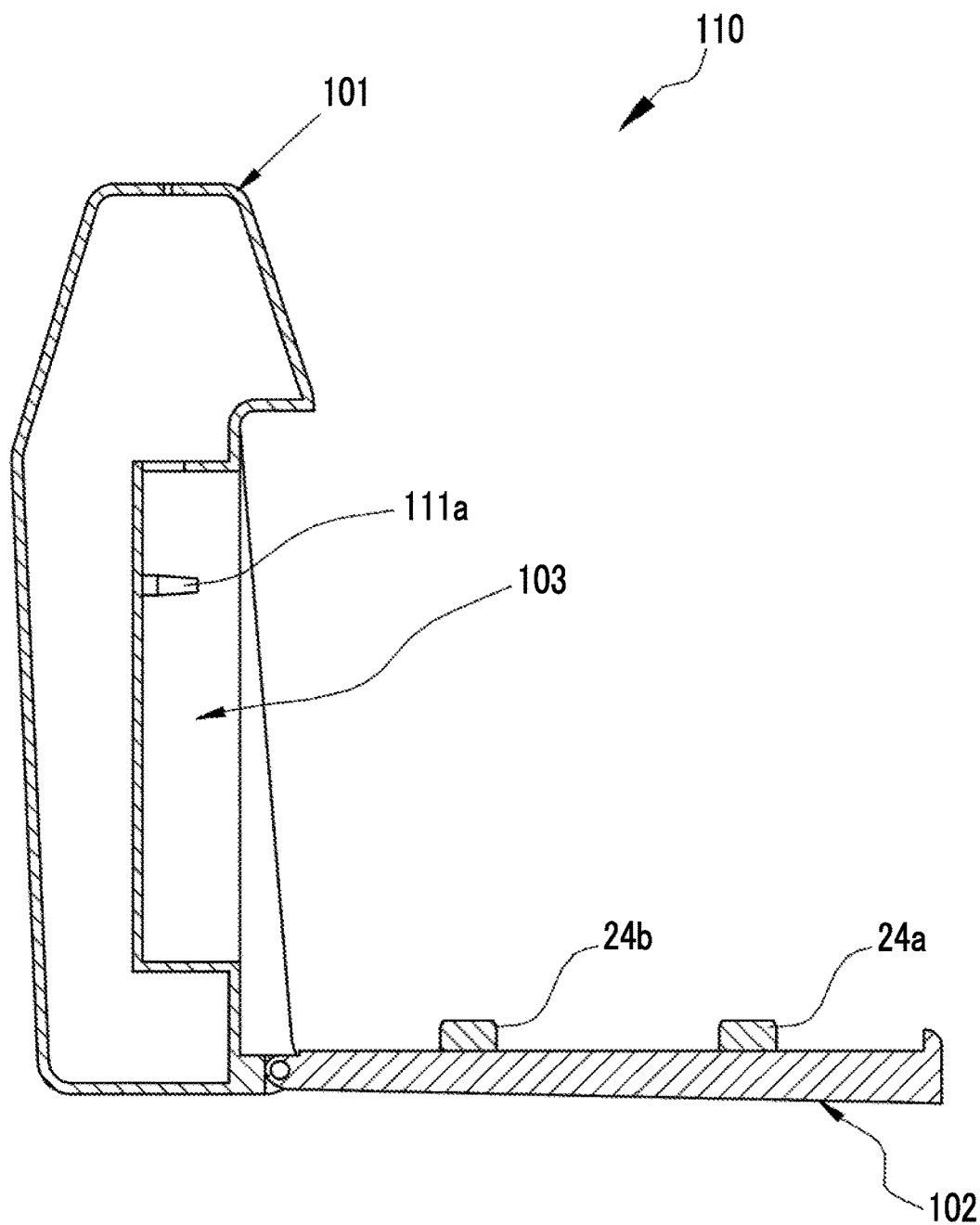
FIG. 47 is a sectional view taken along line XLVII-XLVII of FIG. 46.
Figure 48:
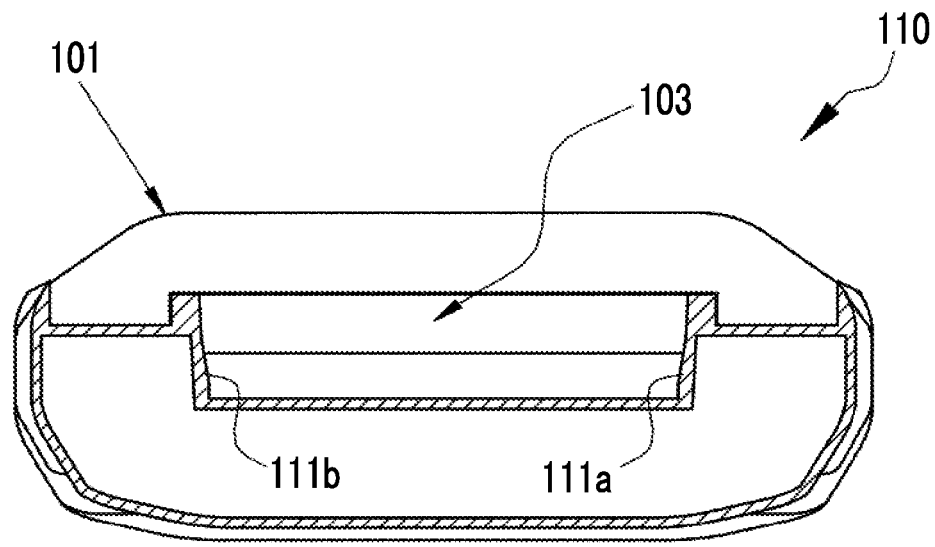
FIG. 48 is a sectional view taken along line XLVIII-XLVIII of FIG. 46.
Figure 49:
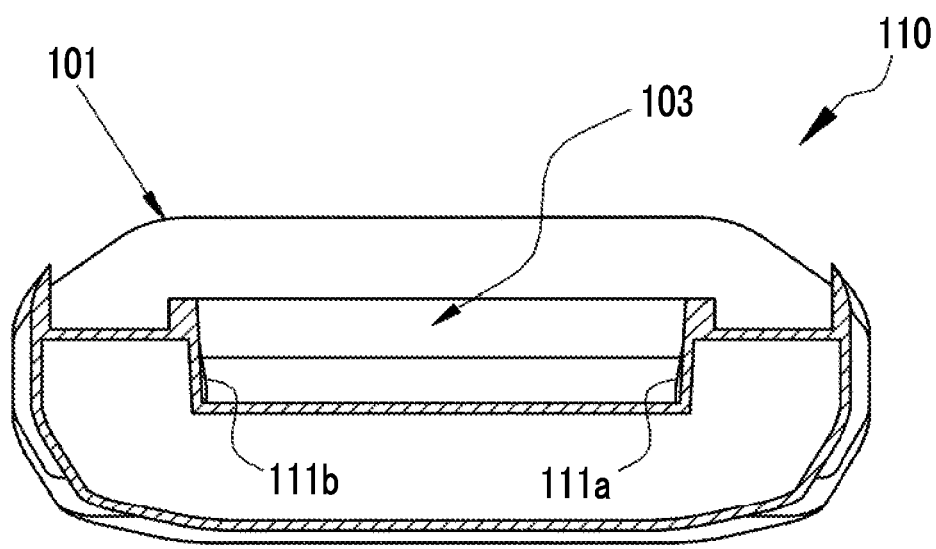
FIG. 49 is a sectional view taken along line XLIX-XLIX of FIG. 46.

As shown in FIGS. 44 to 46, in a printer 110, a pair of position alignment protrusion portions 111a and 111b are formed on both side surfaces of the film pack room 103. As shown in FIGS. 47 to 49, the position alignment protrusion portions 111a and 111b are formed in the same wedge shape as those of the position alignment protrusion portions 84a to 84c according to the second embodiment, and prevent the instant film pack 26 from being loaded in a reverse direction. Although not shown, the cut-off portion 104 into which the claw member 57 is inserted and the rectangular frame 106 are also formed at the film pack room 103 in the present embodiment.

Fifth Embodiment

In a fifth embodiment, reversal loading prevention cut-off portions and position alignment protrusion portions are formed at the film pack room. In the fifth embodiment, the exterior shape of the printer is the same as the front surface, the side surfaces, the plane, and the bottom surface of the printer according to the third embodiment, and the shape of the rear surface including the inside of the film pack room is different from that of the printer according to the third embodiment. The same components as those used in the embodiments will be assigned the same references, and thus, the description thereof will be omitted.

Figure 50:
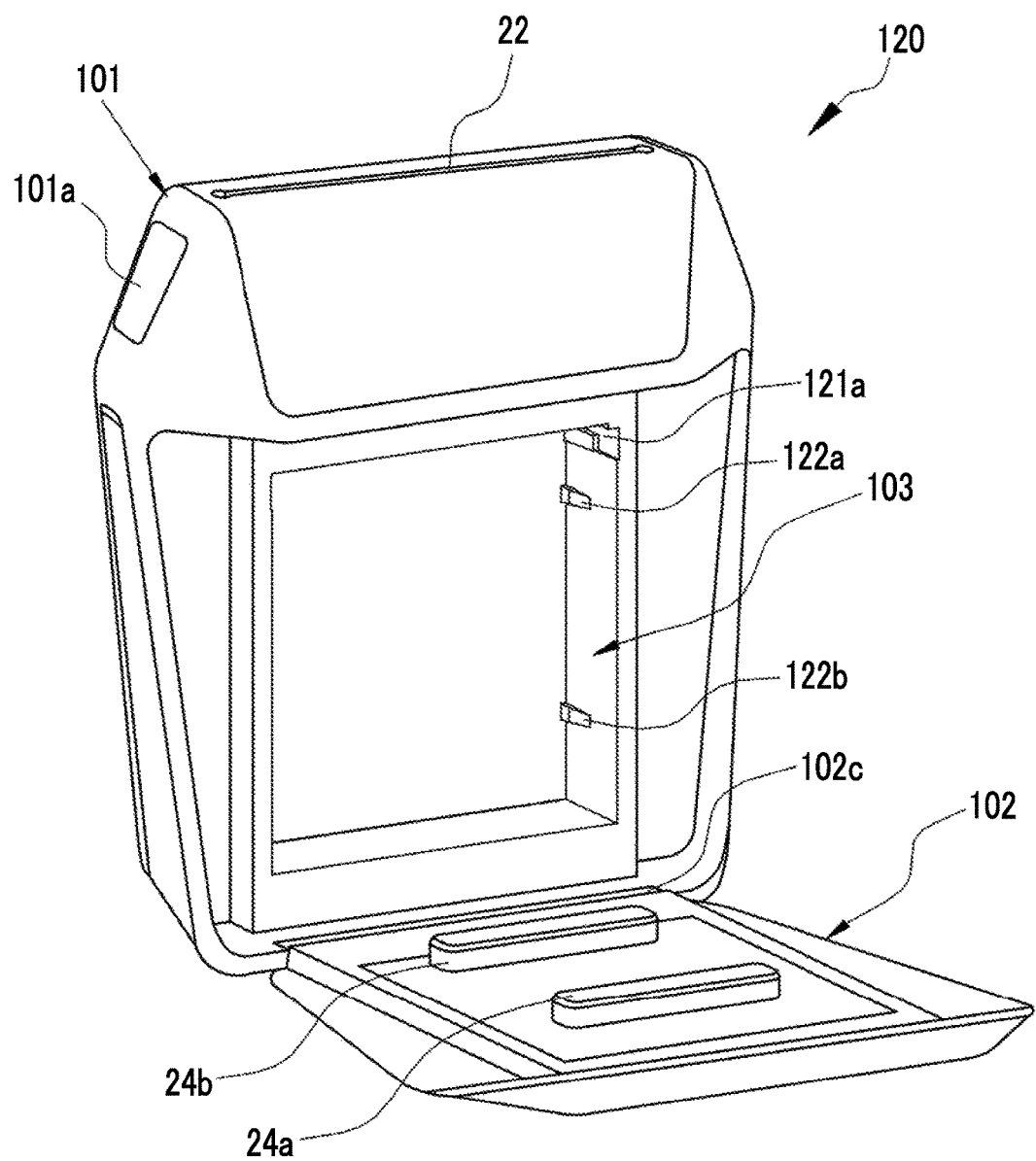
FIG. 50 is a perspective view of an external appearance of a printer according to a fifth embodiment when viewed from a rear surface, a plane, and a right side surface.
Figure 51:
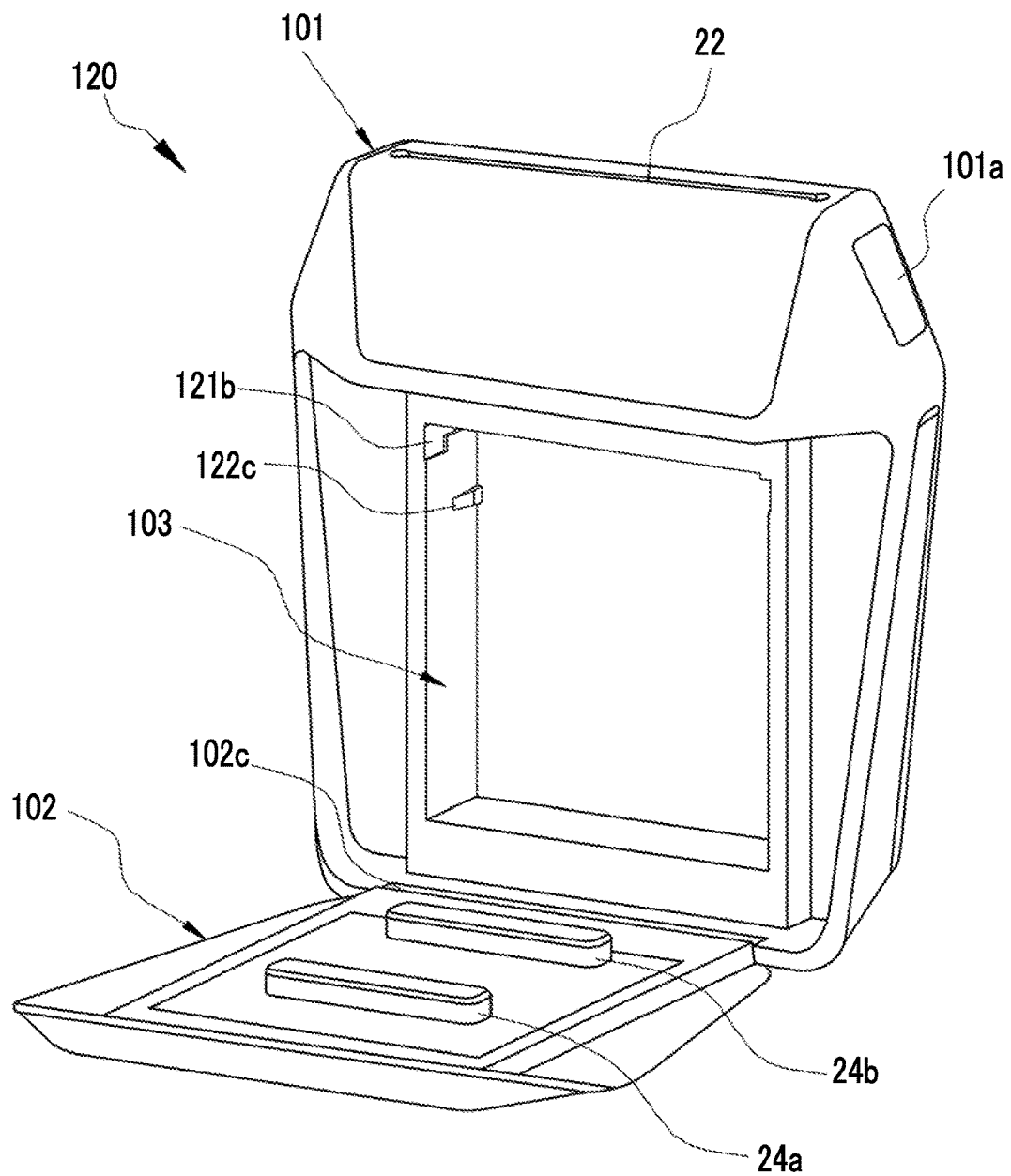
FIG. 51 is a perspective view of the external appearance of the printer according to the fifth embodiment when viewed from a rear surface, a plane, and a left side surface.
Figure 52:
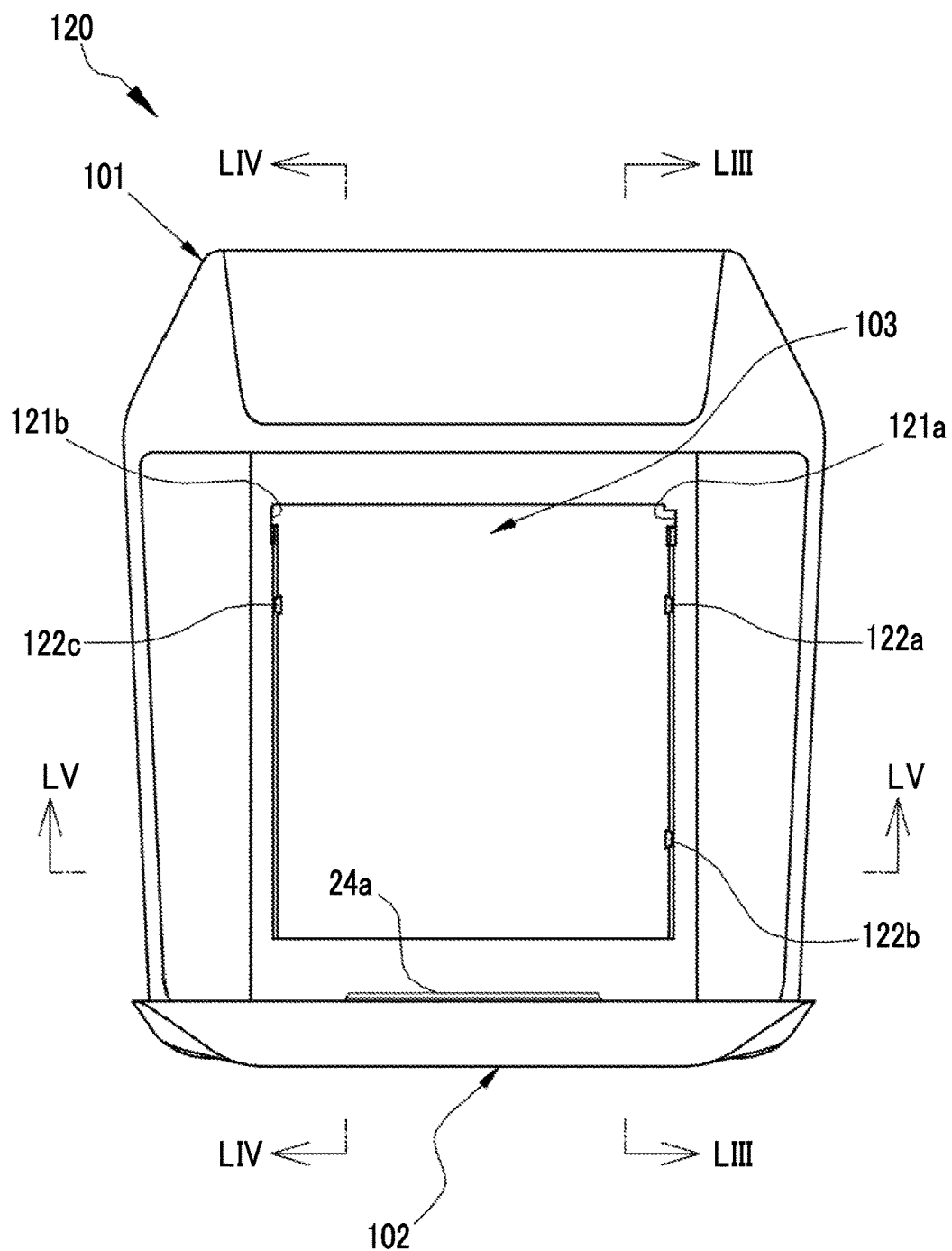
FIG. 52 is a rear view of the printer according to the fifth embodiment.
Figure 53:
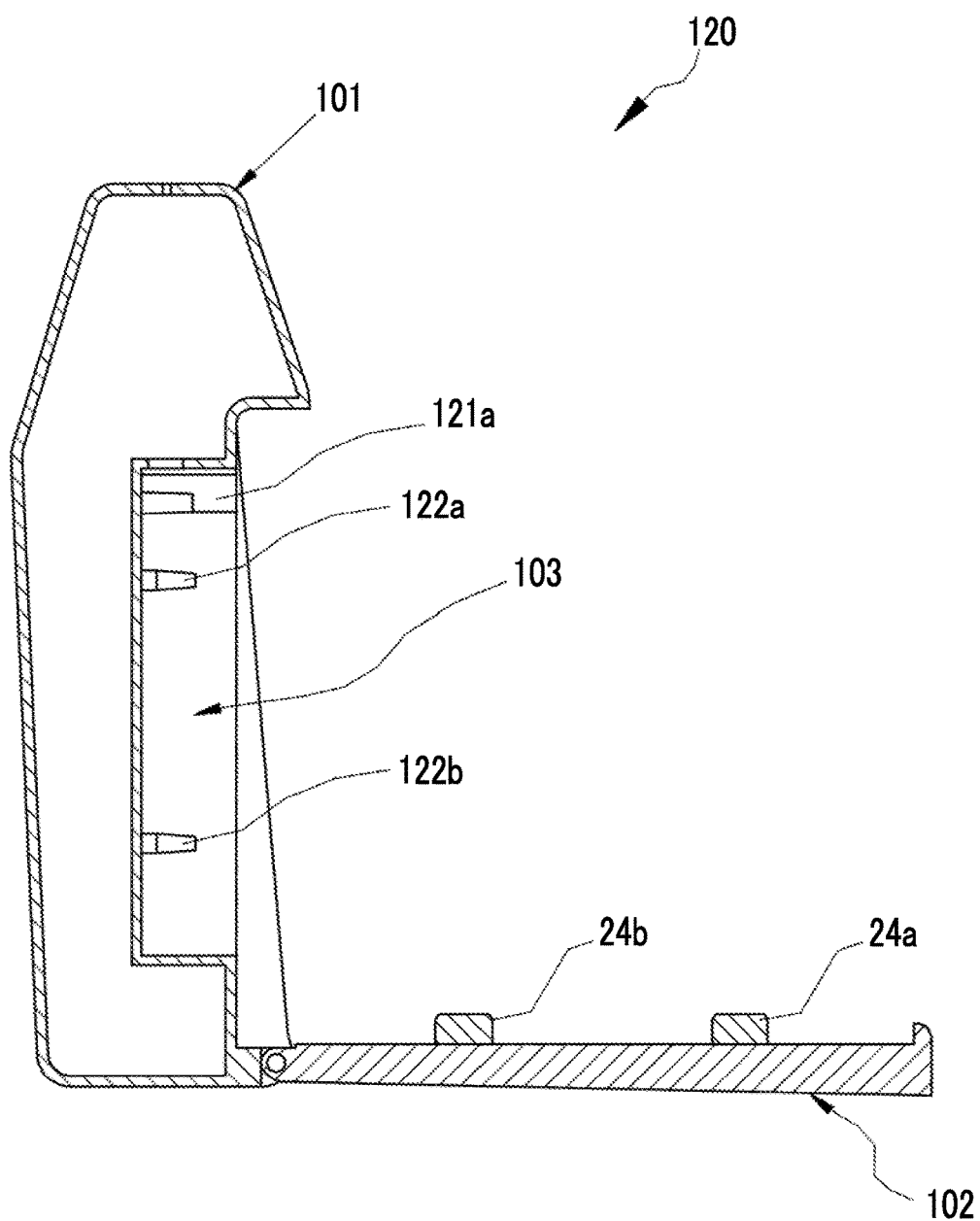
FIG. 53 is a sectional view taken along line LIII-LIII of FIG. 52.
Figure 54:
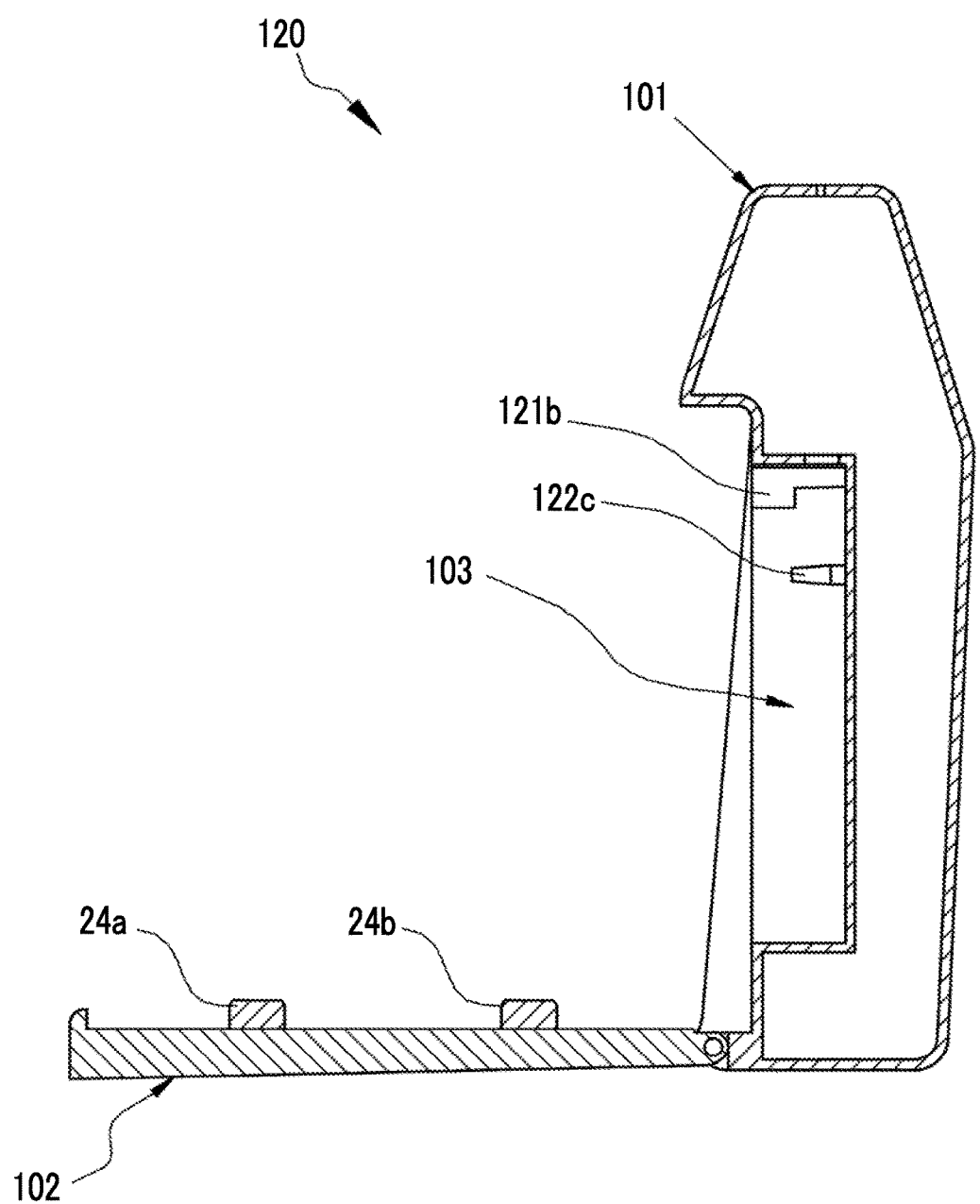
FIG. 54 is a sectional view taken along line LIV-LIV of FIG. 52.

As shown in FIGS. 50 to 52, in a printer 120, reversal loading prevention cut-off portions 121a and 121b are formed on both side surfaces of the film pack room 103. As shown in FIGS. 53 and 54, the reversal loading prevention cut-off portions 121a and 121b are formed in L shapes. Similarly to the reversal loading prevention cut-off portions 85a and 85b according to the second embodiment, the reversal loading prevention cut-off portions 121a and 121b prevent the instant film pack 26 from being loaded in a reverse direction.

Figure 55:
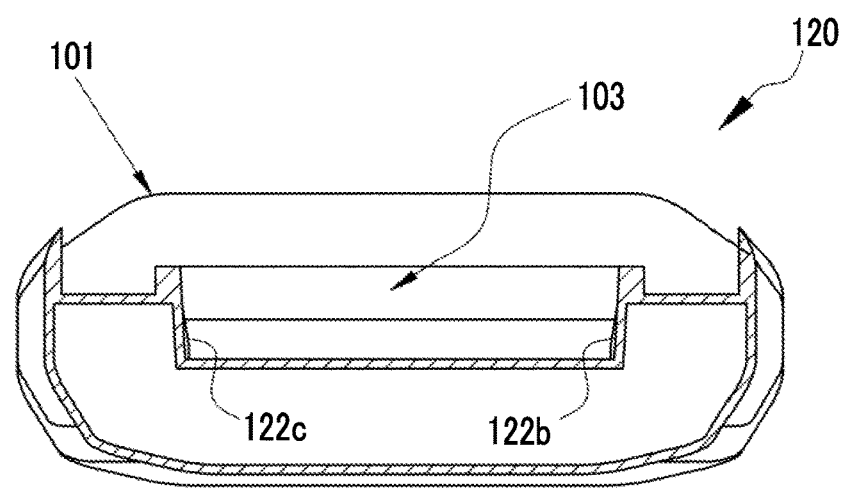
FIG. 55 is a sectional view taken along line LV-LV of FIG. 52.
Figure 56:
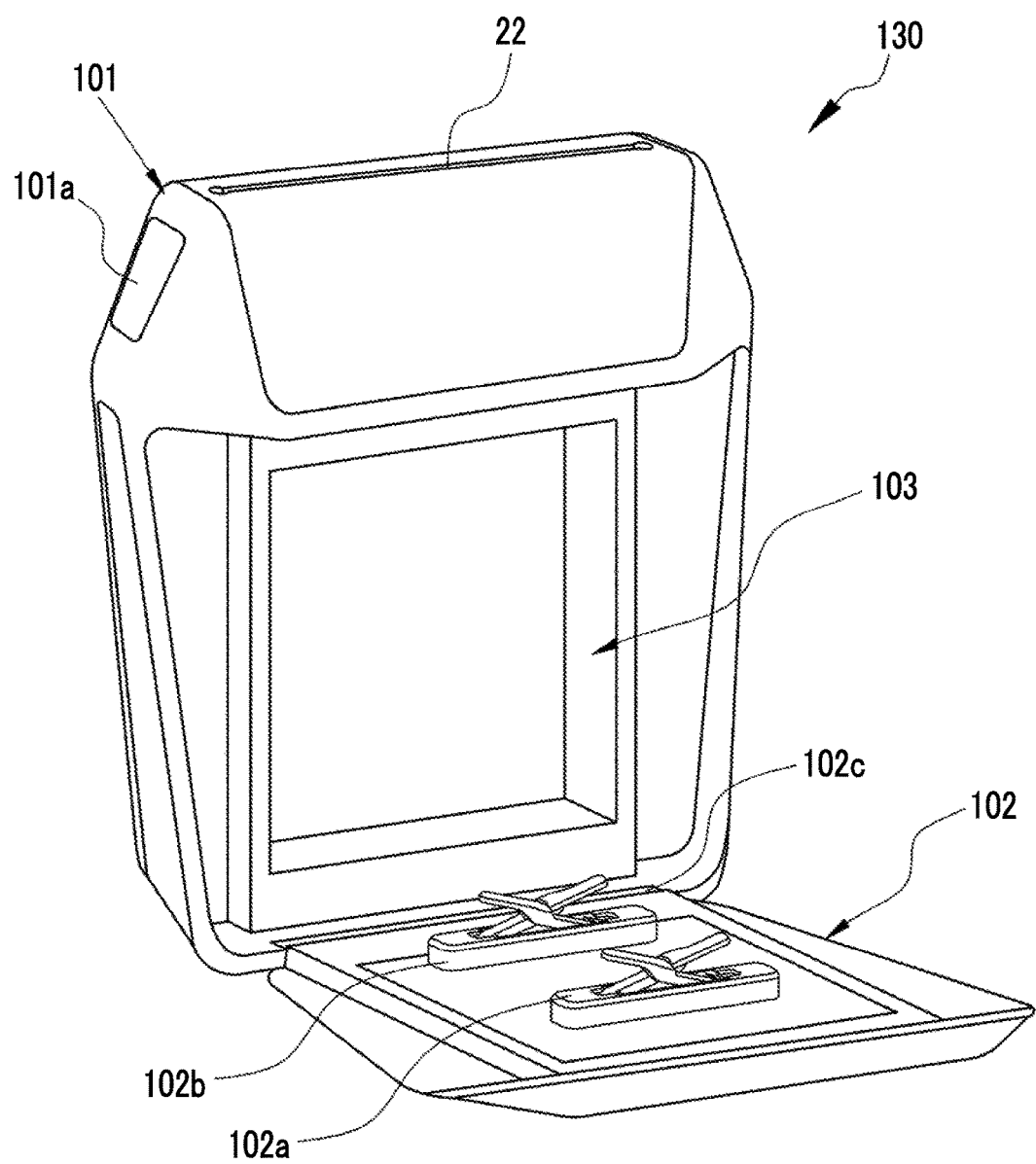
FIG. 56 is a perspective view of an external appearance of a printer according to a sixth embodiment when viewed from a rear surface, a plane, and a right side surface.
Figure 57:
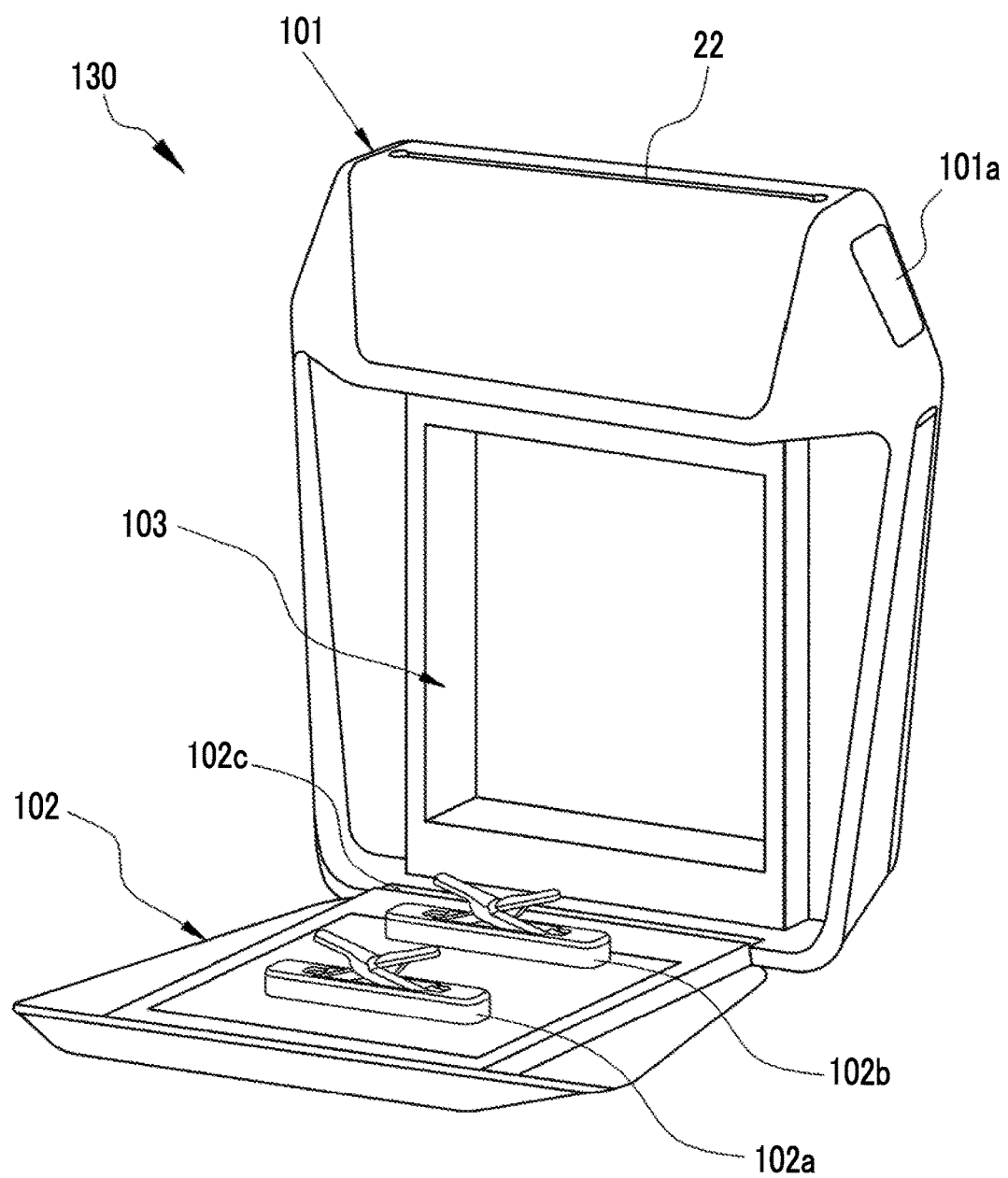
FIG. 57 is a perspective view of the external appearance of the printer according to the sixth embodiment when viewed from a rear surface, a plane, and a left side surface.
Figure 58:
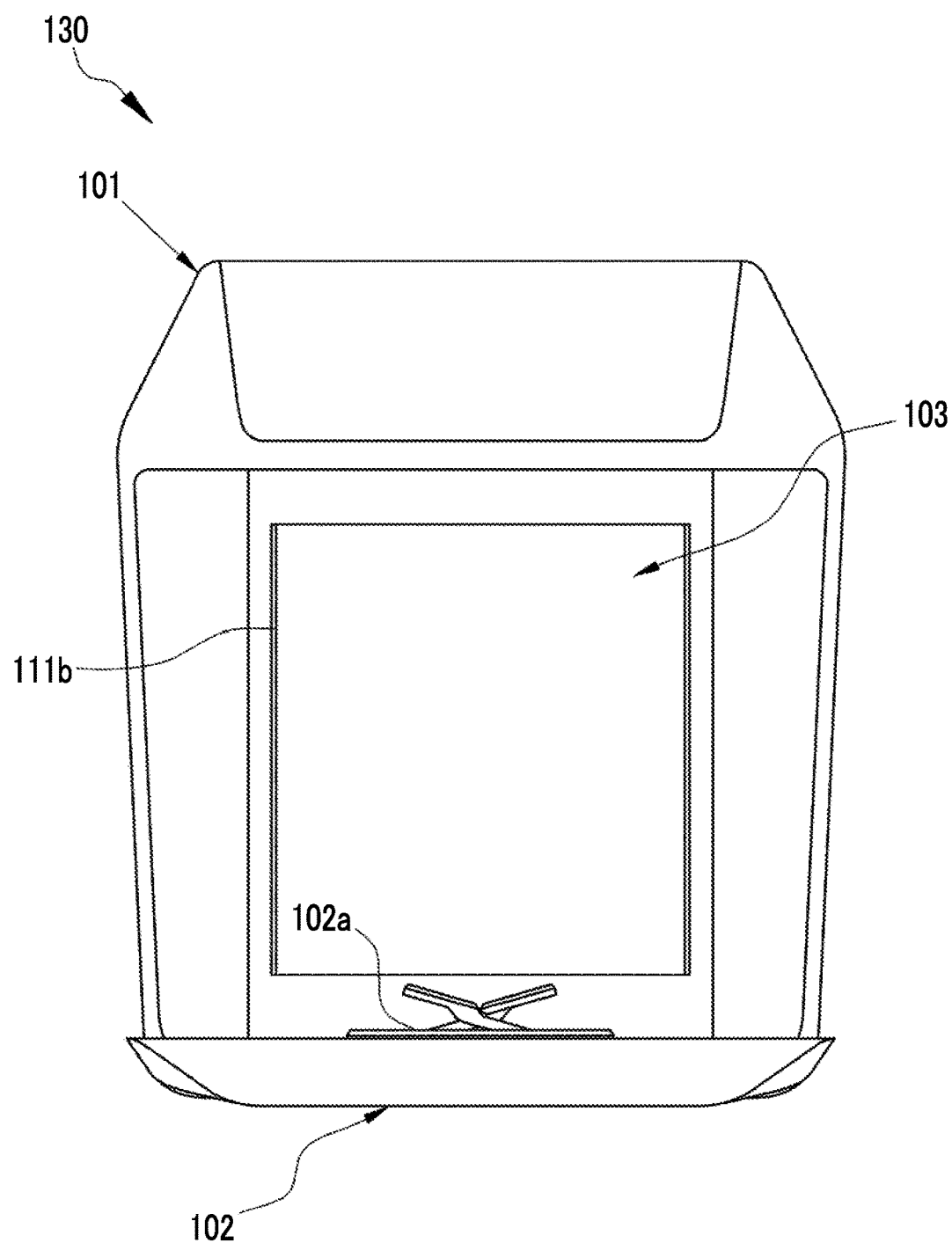
FIG. 58 is a rear view of the printer according to the sixth embodiment.
Figure 59:
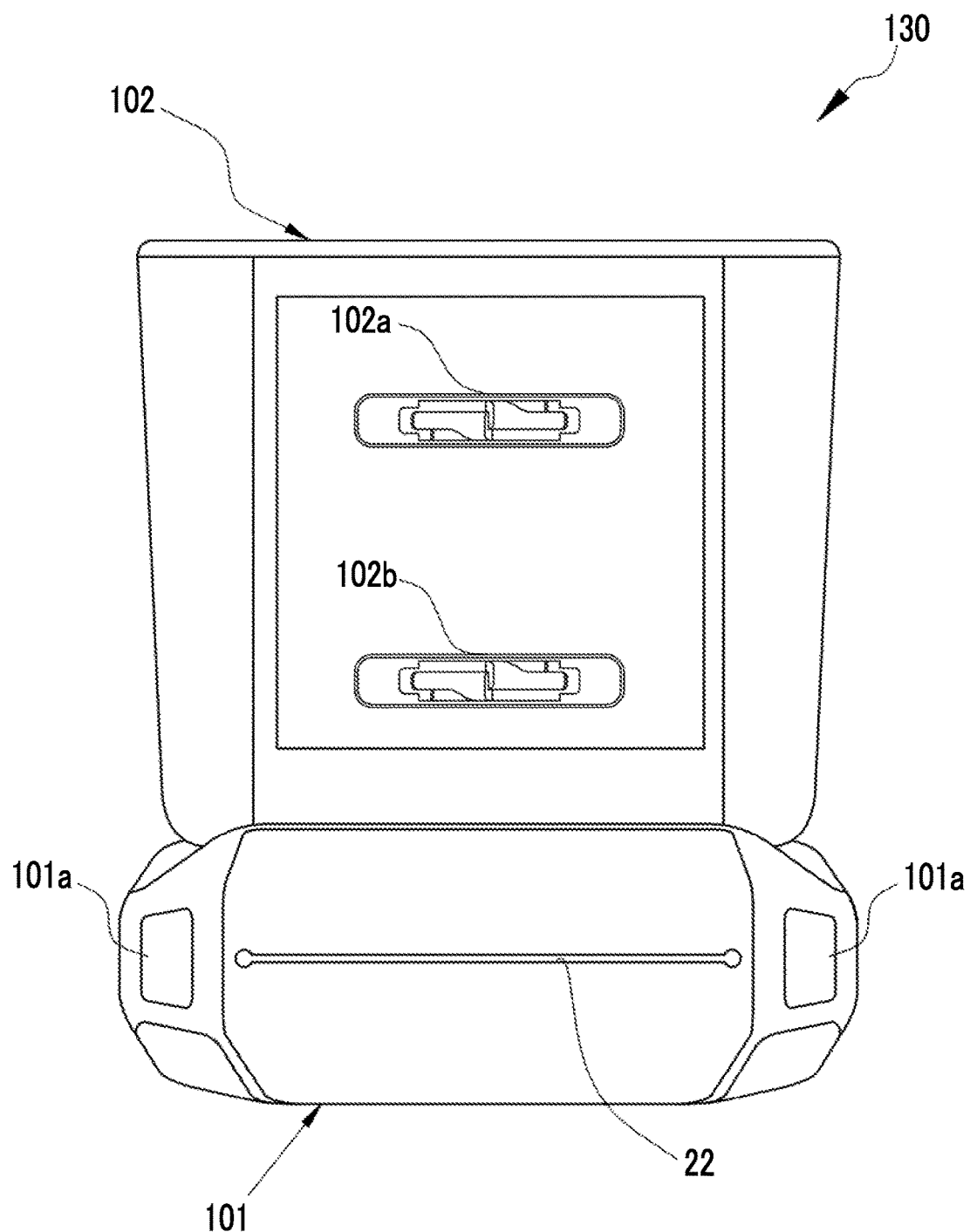
FIG. 59 is a plan view of the printer according to the sixth embodiment.
Figure 60:
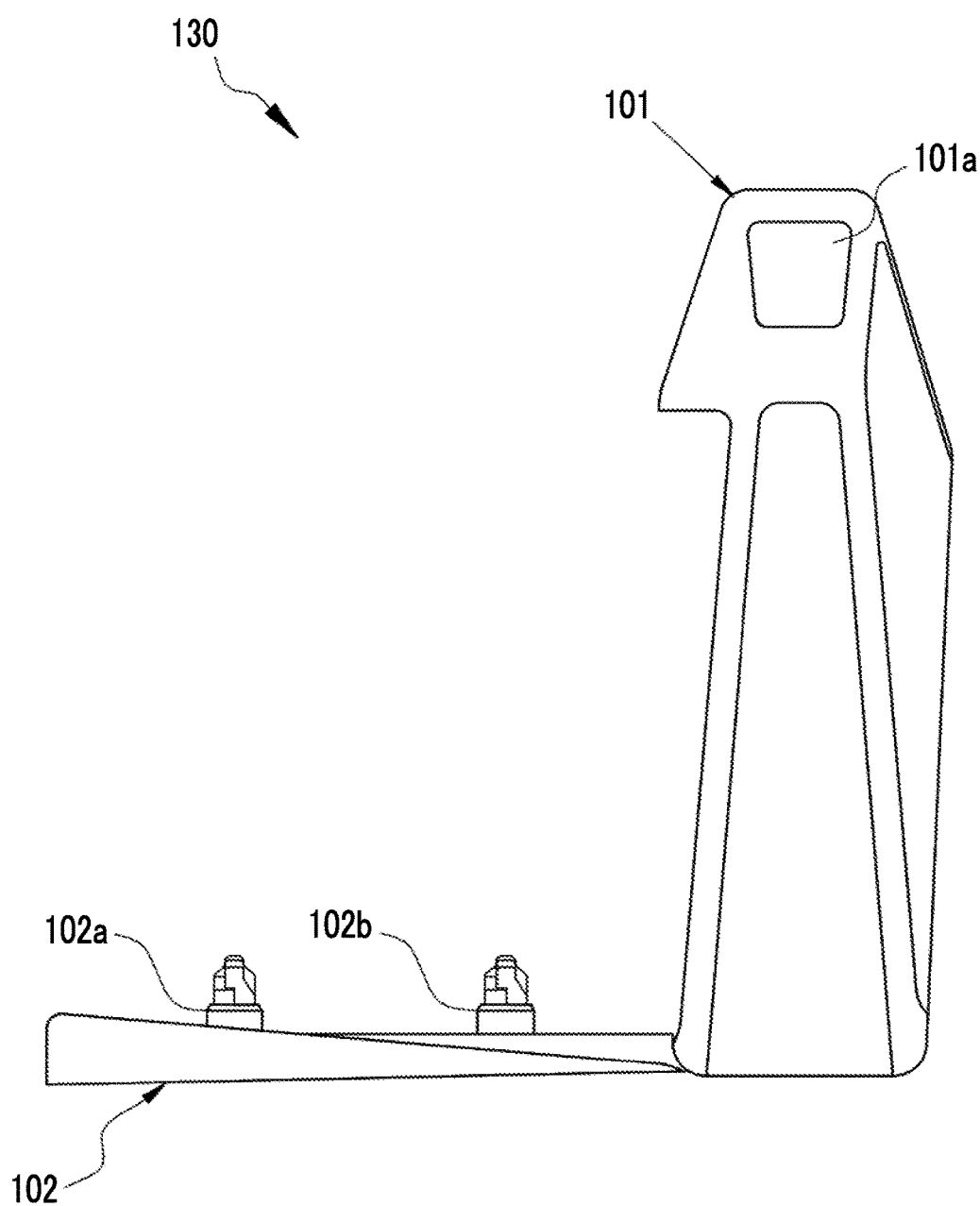
FIG. 60 is a left side view of the printer according to the sixth embodiment.
Figure 61:
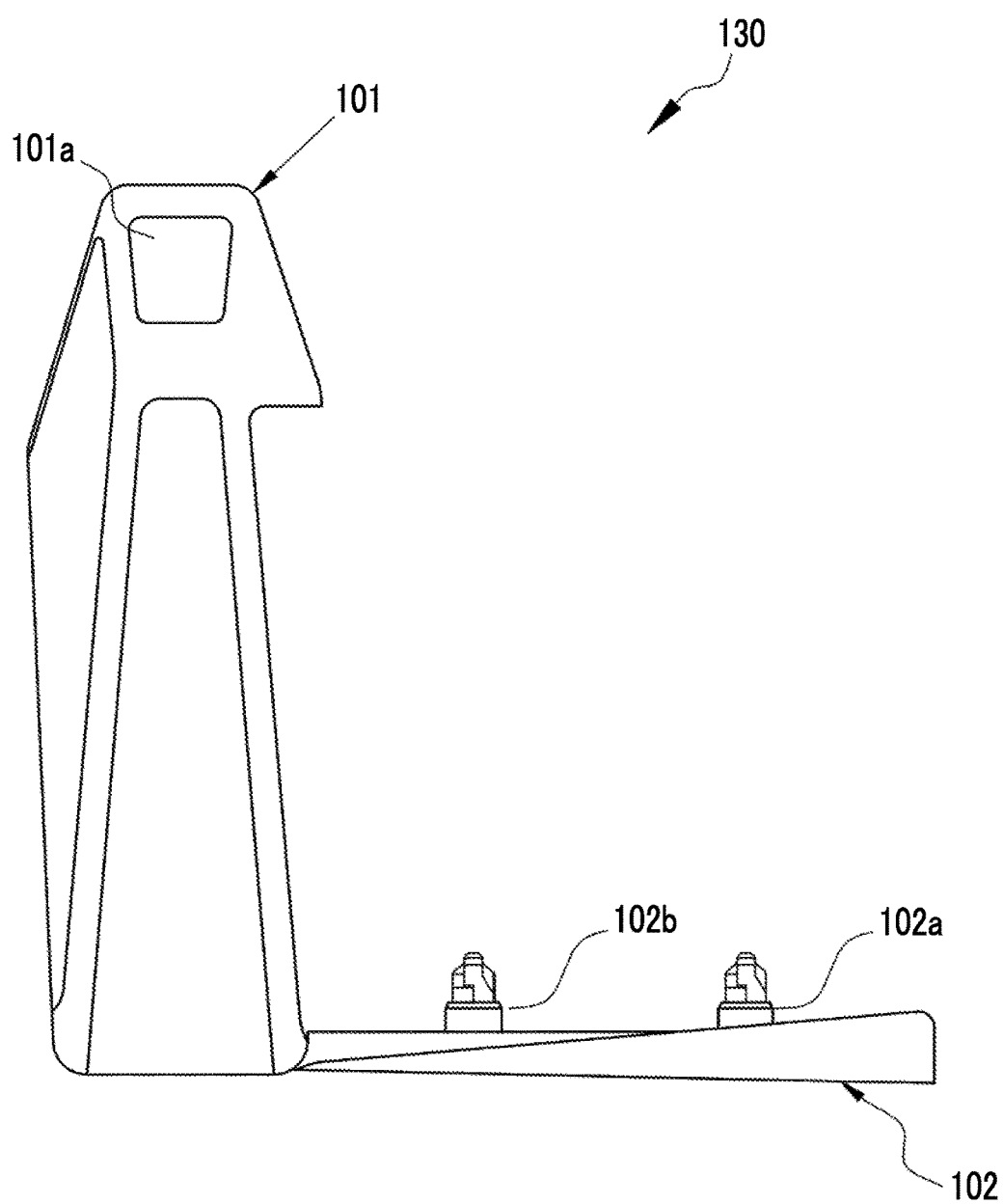
FIG. 61 is a right side view of the printer according to the sixth embodiment.

As shown in FIGS. 53 to 55, position alignment protrusion portions 122a to 122c are formed on both side surfaces of the film pack room 103. The position alignment protrusion portions 122a to 122c are formed in the same wedge shape as those of the position alignment protrusion portions 84a to 84c according to the second embodiment, and prevent the instant film pack 26 from being loaded in a reverse direction. Although not shown, the cut-off portion 104 into which the claw member 57 is inserted and the rectangular frame 106 are also formed at the film pack room 103 in the present embodiment.

Sixth Embodiment

In a sixth embodiment, reversal loading prevention cut-off portions and position alignment protrusion portions are formed at the film pack room. In the sixth embodiment, the exterior shape of the printer is the same as the front surface and the bottom surface of the printer according to the third embodiment, and the shapes of the rear surface, the side surfaces, and the plane including the inside of the loading cover are different from those of the printer according to the third embodiment. The same components as those used in the embodiments will be assigned the same references, and thus, the description thereof will be omitted.

As shown in FIGS. 56 to 61, in a printer 130, a pair of film holding portions 102a and 102b is formed on an inner surface of the loading cover 102. The film holding portions 102a and 102b have the same configurations as those of the film holding portions 82a and 82b according to the second embodiment. That is, in a case where the instant film pack 26 is loaded into the film pack room 103 and the loading cover 24 is positioned in the closed position, the film holding portions 102a and 102b pass through the opening 32a, are inserted into the instant film pack 26, and press the film unit press plate 28. Accordingly, the film unit 29 within the instant film pack 26 is pressed in a laminated direction. Although not shown, the cut-off portion 104 into which the claw member 57 is inserted, the rectangular frame 106, the reversal loading prevention cut-off portions, and the position alignment protrusion portions may also be formed at the film pack room 103 in the present embodiment.

EXPLANATION OF REFERENCES

10: digital camera with printer
11: camera body
12: imaging unit
13: printer unit
15: imaging window
16A: release switch
16B: release switch
17: rear display unit
18: operation unit
18a: menu switch
18b: print switch
19: imaging optical system
20: solid-state imaging device
22: film ejection port
24: loading cover
24a, 24b: press member
24c: hinge portion
25: film pack room
26: instant film pack
26a: protrusion portion
27: case
28: film unit press plate
28a, 28b: sheet
28c, 28e: opening
28d, 28f: hole
28g, 28h: lower end portion
29: film unit
29a: exposure surface
29b: side edge portion
30: film cover
30a: cover member
30b: accompanying prevention rib
30c: outer light shielding rib
30d: inner light shielding rib
30e: light shielding film
30f: side edge portion
30g: groove
31: case member
31a: exposure opening
31b: cut-off portion
31c: discharge port
31d: light shielding seal
31e: light shielding groove
32: cover
32a: opening
32b: unit support protrusion
32c: caulking pin
32d: support piece
33: mask sheet
33a: screen opening
34: photosensitive sheet
35: cover sheet
36: developer pod
37: trap portion
38: developer
39: gap
40: positive image observation surface
41: tilt surface
42: outer edge
43: part
44: packaging material
46, 47, 48: middle seal
49: weak seal
51: exposure head
52: developer spreading device
53: transport roller pair
54: spreading roller pair
56: spreading control member
56a: support member
56b: end surface
57: claw member
58: ejection guide
58a: end surface
61: capstan roller
61a: roller member
61b: rotational shaft
61c: inner edge
62: pinch roller
62a: roller member
62b: rotational shaft
63, 64: spreading roller
66, 67: spring
68: guide passage
68a: tilt surface
68b: proximal end surface
69: spreading control member
69a: end surface
80: digital camera with printer
81: camera body
82: loading cover
82a, 82b: film holding portion
82c: hinge portion
83: film pack room
84a: position alignment protrusion portion
84b: position alignment protrusion portion
85a, 85b: reversal loading prevention cut-off portion
87: cut-off portion
88: press member
88a: press surface
88b: rotational shaft
89: holding frame
89a: engagement hole
91: spring
100: printer
101: main body
101a: operation button
102: loading cover
102a, 102b: film holding portion
102c: hinge portion
103: film pack room
104: cut-off portion
106: frame
110: printer
111a, 111b: position alignment protrusion portion
120: printer
121a, 121b: reversal loading prevention cut-off portion
122a: position alignment protrusion portion
130: printer
201: film cover
D1: width
L1: first distance
L2: second distance
P: exposure position
W1, W2, W3: width
α: tilt angle

What is claimed is:
1. A developer spreading device comprising:
a film pack room into which an instant film pack is loaded, the instant film pack including a plurality of film units each having a developer pod containing a developer, a case which includes an exposure opening and a slit-shaped discharge port and accommodates the plurality of film units laminated on top of each other, and a film cover which lighttightly blocks the exposure opening by covering an exposure surface of the film unit and is ejected through the discharge port;

a transport roller pair that transports the film unit or the film cover discharged through the discharge port while pinching both side edge portions of the film unit or the film cover; and a spreading roller pair that is disposed on a downstream side of the transport roller pair in a transport direction perpendicular to a width direction of the exposure surface, and spreads the developer into the film unit by crushing the developer pod, wherein the case includes a pair of light shielding grooves formed in both sides of the exposure opening and an inner wall surface facing the film cover, the film cover includes a pair of light shielding ribs which is inserted into the pair of light shielding grooves and extends in a discharge direction in a case where the film cover is discharged through the discharge port, and the transport roller pair includes a capstan roller that includes a pair of roller members and a rotational shaft which holds the roller members, and a first distance which is a space between inner edges of the pair of roller members is greater than a second distance which is a space between outer edges of the pair of light shielding ribs.

2. The developer spreading device according to claim 1, wherein the first distance is greater than a width of the exposure surface.

3. The developer spreading device according to claim 2, wherein the roller members pinch both the side edge portions of the film cover in the width direction of the exposure surface by 0.5 mm or more.

4. The developer spreading device according to claim 2, wherein the pair of roller members pinches portions of both the side edge portions of the film unit which are positioned outside the developer pod in the width direction of the exposure surface.

5. The developer spreading device according to claim 1, wherein a plurality of protrusions is formed on a circumferential surface of the roller member.

6. A printer comprising:

the developer spreading device according to claim 1; and an exposure head that is disposed on an upstream side of the developer spreading device in the transport direction, and irradiates the exposure surface of the film unit transported by the transport roller pair with line-shaped print light parallel to the width direction of the exposure surface.

7. A digital camera with a printer comprising:

the printer according to claim 6; and an imaging unit that includes an imaging optical system, captures a subject image, and outputs image data to the printer.

* * * * *